United States Patent
Kumagawa et al.

(10) Patent No.: US 7,499,115 B2
(45) Date of Patent: Mar. 3, 2009

(54) DISPLAY AND ITS DRIVING METHOD

(75) Inventors: Katsuhiko Kumagawa, Neyagawa (JP);
Hiroyuki Yamakita, Osaka (JP);
Masanori Kimura, Daito (JP); Akio Takimoto, Neyagawa (JP)

(73) Assignee: Panasonic Corporation, Osaka (JP)

( * ) Notice: Subject to any disclaimer, the term of this patent is extended or adjusted under 35 U.S.C. 154(b) by 871 days.

(21) Appl. No.: 10/398,385

(22) PCT Filed: Oct. 4, 2001

(86) PCT No.: PCT/JP01/08749

§ 371 (c)(1),
(2), (4) Date: Oct. 7, 2003

(87) PCT Pub. No.: WO02/29483

PCT Pub. Date: Apr. 11, 2002

(65) Prior Publication Data

US 2004/0109122 A1    Jun. 10, 2004

(30) Foreign Application Priority Data

Oct. 4, 2000   (JP) ............................. 2000-304557
Oct. 13, 2000  (JP) ............................. 2000-313155

(51) Int. Cl.
*G02F 1/141* (2006.01)
*G02F 1/133* (2006.01)
*G02F 1/1343* (2006.01)

(52) U.S. Cl. ................ 349/37; 349/33; 349/141; 345/94; 345/95; 345/96

(58) Field of Classification Search ............ 349/37, 349/141; 345/94, 95, 96
See application file for complete search history.

(56) References Cited

U.S. PATENT DOCUMENTS 5,686,932 A * 11/1997 Tomita ..................... 345/94

(Continued)

FOREIGN PATENT DOCUMENTS

JP   09-189897   7/1997

(Continued)

*Primary Examiner*—Michael H Caley
(74) *Attorney, Agent, or Firm*—McDermott Will & Emery LLP

(57) ABSTRACT

An array substrate (10) is provided with a pixel electrode (3) disposed in a region defined by two adjacent gate wirings (1) and two adjacent source wirings (2), a switching element (5) for switching a voltage applied to the pixel electrode (3) from the source wiring (2) based on a signal voltage supplied from the gate wiring (1), a common wiring (8) arranged between the two adjacent gate wirings (1) and a common electrode (4) being electrically connected to the common wiring (8) and generating an electric field between the pixel electrode (3) whereto a voltage is applied, wherein the pixel electrode (1) comprises a first pixel electrode (1a) and a second pixel electrode (2a), and the opposing electrode (2) comprises a first opposing electrode (1b) and a second opposing electrode (2b), wherein a first region generates an electric field between the first pixel electrode (1a) and the first opposing electrode (2a) whose light transmittance is lower than that of the first pixel electrode (1a) and a second region generates an electric field between the second pixel electrode (1b) and the second opposing electrode (2b) whose light transmittance is higher than that of the second pixel electrode (1b) are formed.

2 Claims, 43 Drawing Sheets

U.S. PATENT DOCUMENTS

| | | | |
|---|---|---|---|
| 5,748,169 A * | 5/1998 | Okumura et al. | 345/100 |
| 5,959,599 A | 9/1999 | Hirakata | |
| 6,532,053 B2 * | 3/2003 | Ohta et al. | 349/141 |
| 2002/0047972 A1 | 4/2002 | Kim et al. | |

FOREIGN PATENT DOCUMENTS

| | | |
|---|---|---|
| JP | 10-10556 | 1/1998 |
| JP | 11-161246 | 6/1999 |
| JP | 11-337975 | 12/1999 |
| JP | P2000-147459 | 5/2000 |
| WO | WO 99/21161 | 4/1999 |

* cited by examiner

|   | PQ | QP | PQ | QP |   |
|---|----|----|----|----|---|
|   | QP | PQ | QP | PQ |   |
|   | PQ | QP | PQ | QP |   |
|   | QP | PQ | QP | PQ |   |
|   | PQ | QP | PQ | QP |   |
|   | QP | PQ | QP | PQ |   |
|   | PQ | QP | PQ | QP |   |
|   | QP | PQ | QP | PQ |   |

(b)

|   | PQ | QP | PQ | QP |   |
|---|----|----|----|----|---|
|   | PQ | QP | PQ | QP |   |
|   | PQ | QP | PQ | QP |   |
|   | PQ | QP | PQ | QP |   |
|   | PQ | QP | PQ | QP |   |
|   | PQ | QP | PQ | QP |   |
|   | PQ | QP | PQ | QP |   |
|   | PQ | QP | PQ | QP |   |

Fig.13

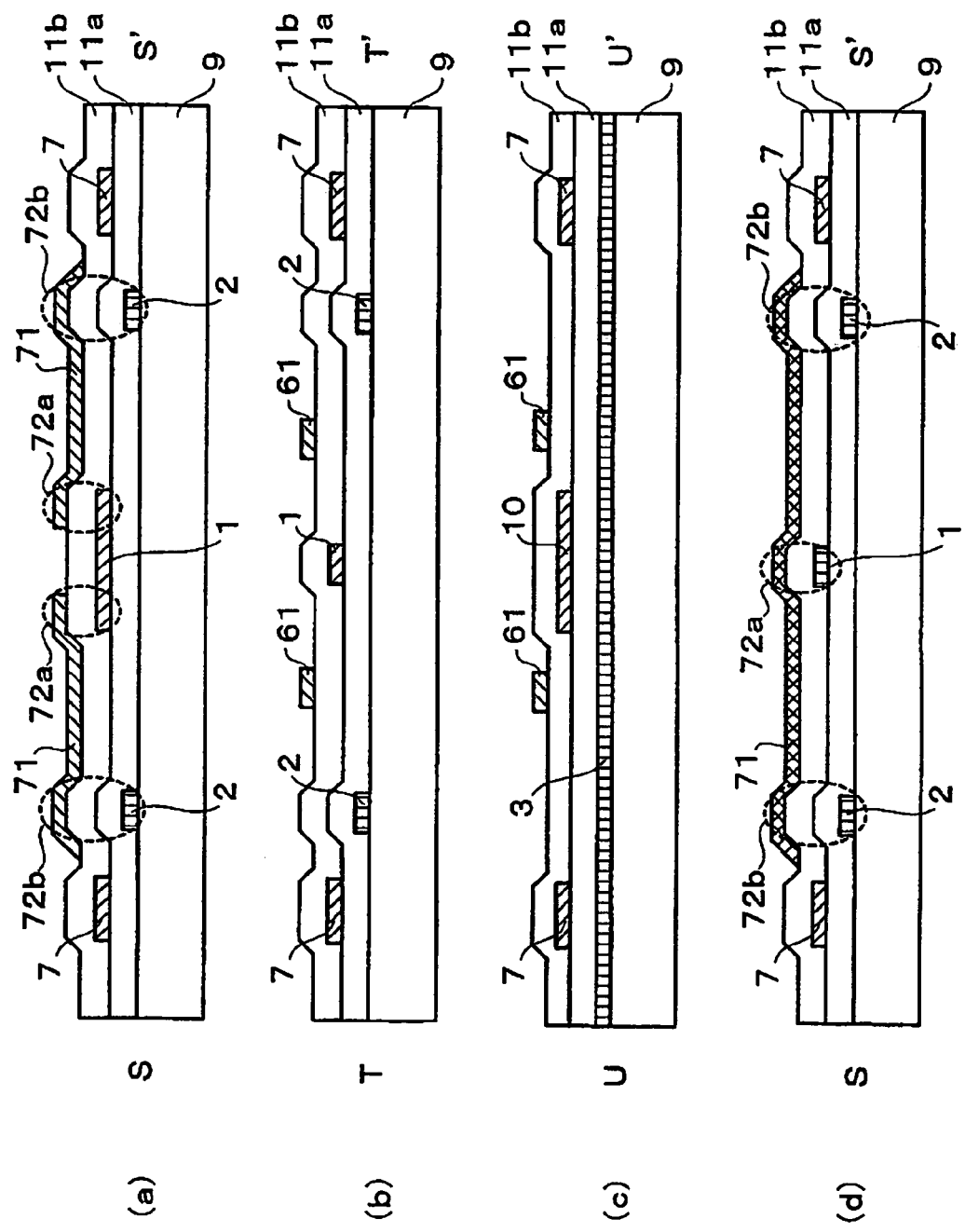

Fig.33
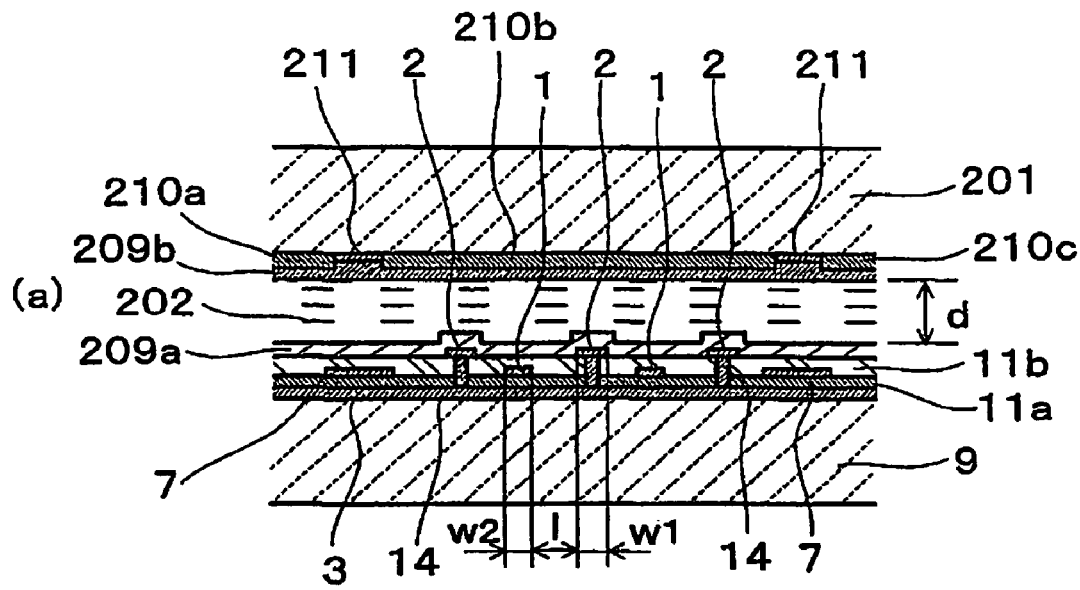
(a)
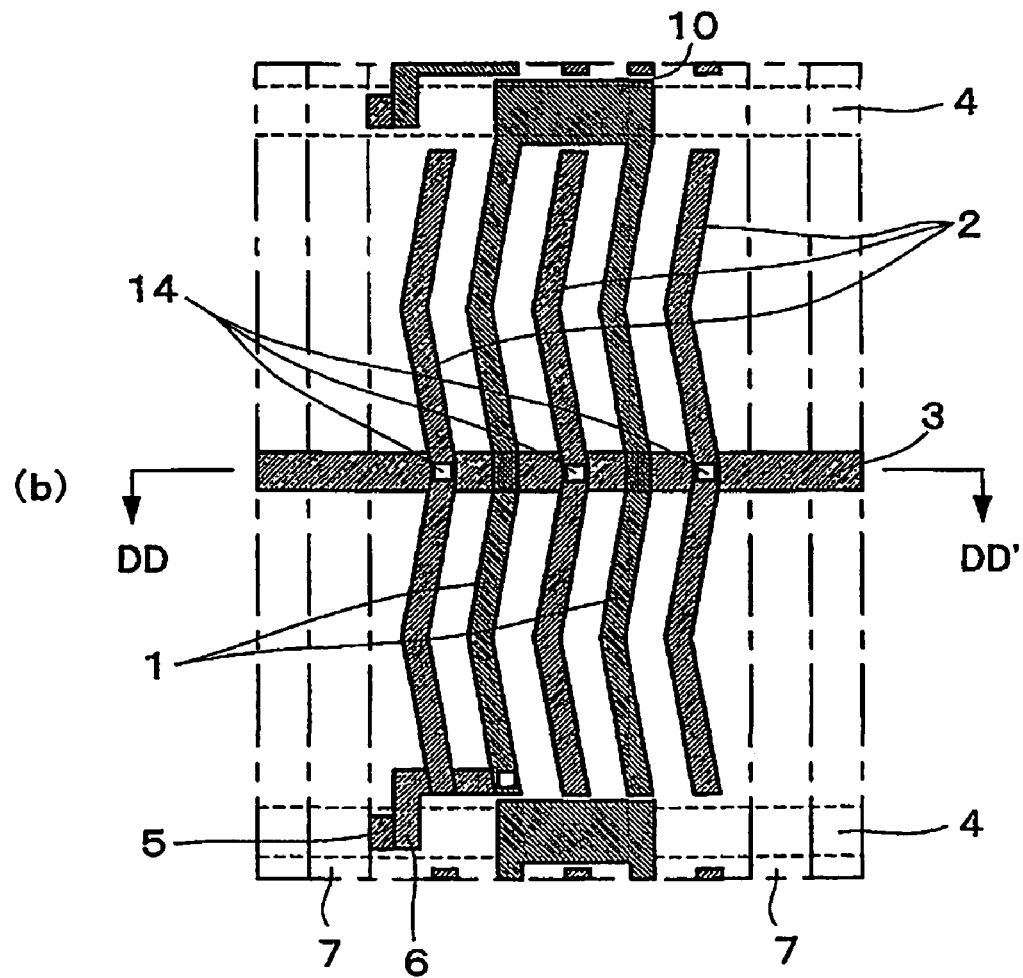
(b)

Fig.35
(a)
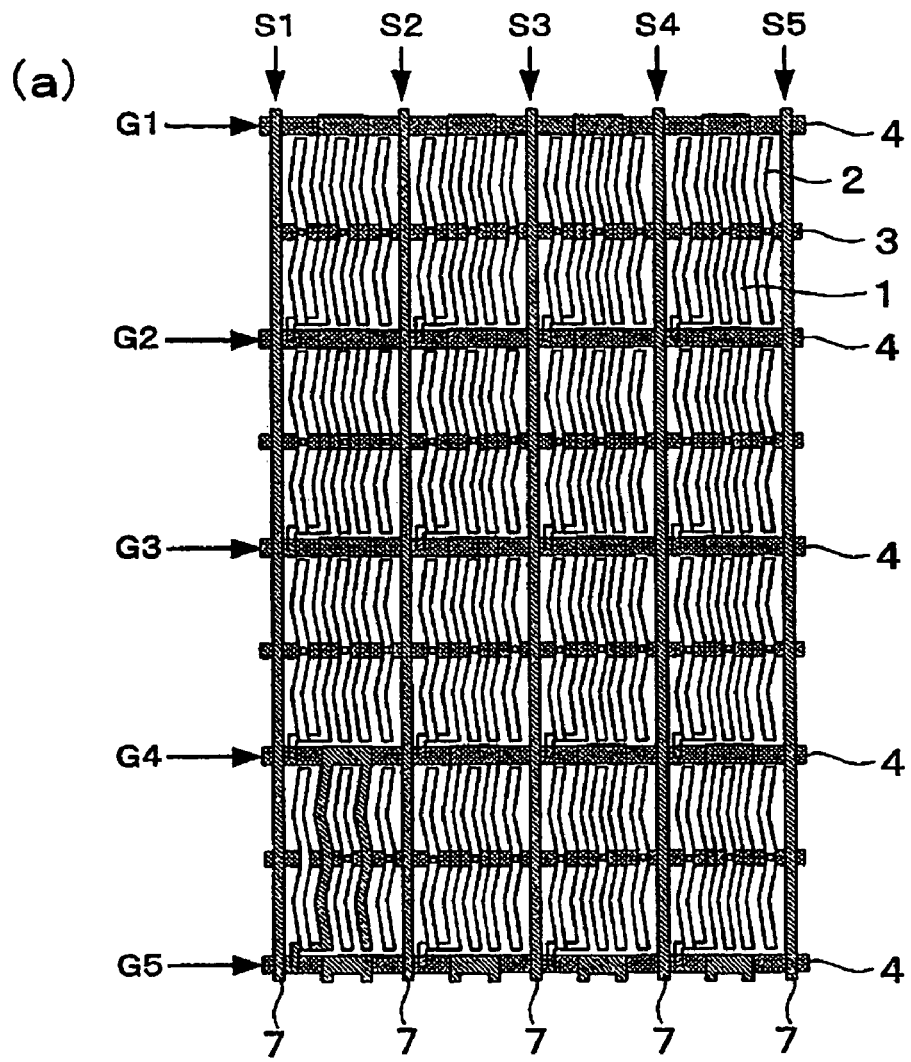
(b)
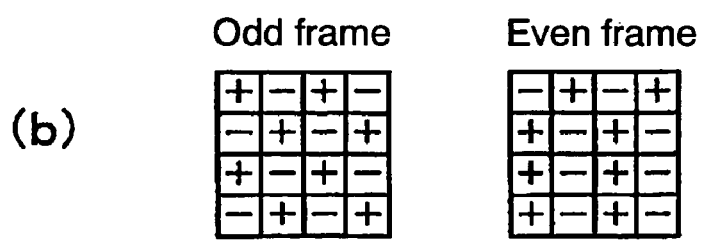
(c)
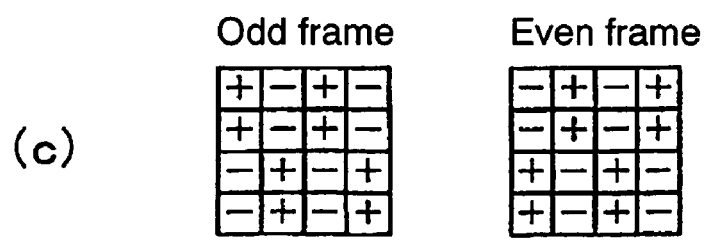

Fig.36
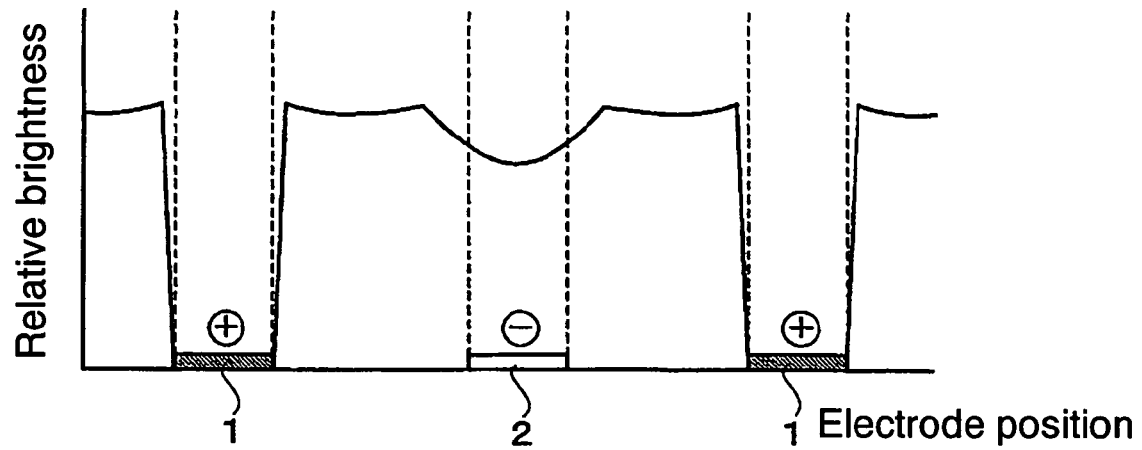
(a) Positive voltage applied
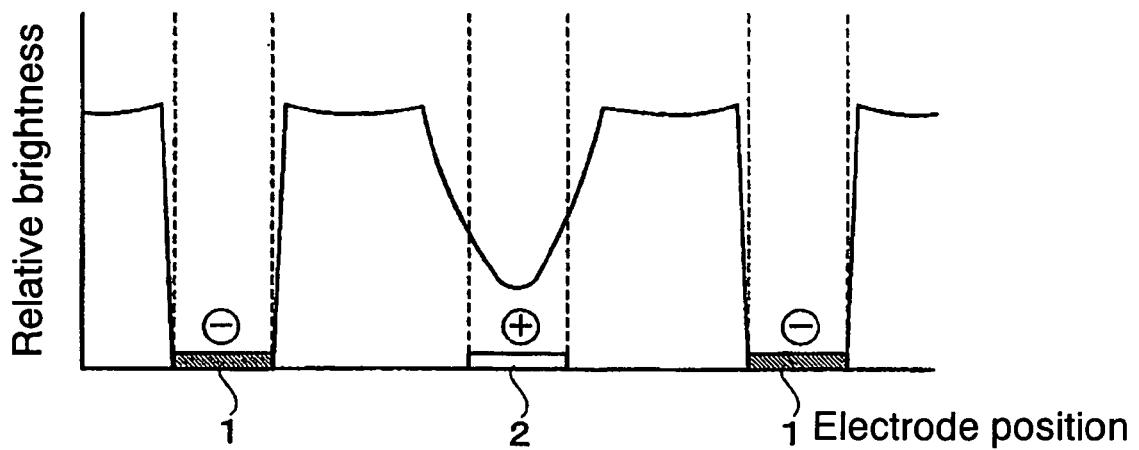
(b) Negative voltage applied Fig.40
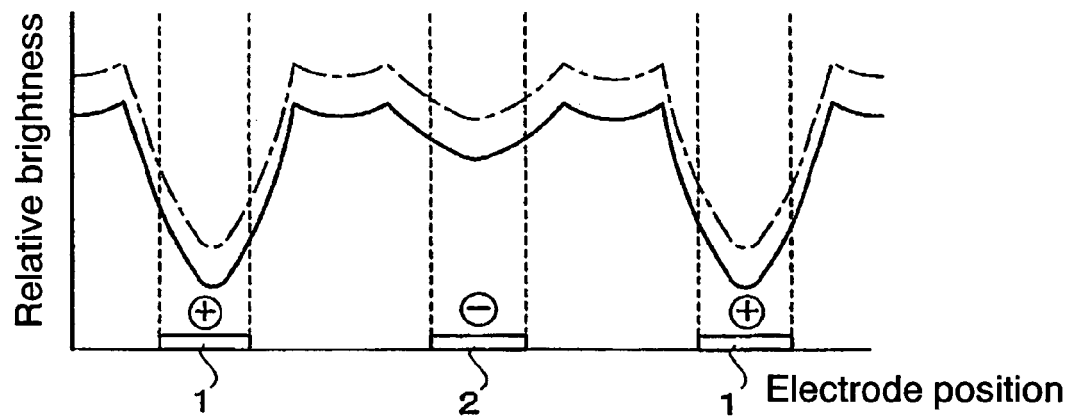
(a) Positive voltage applied
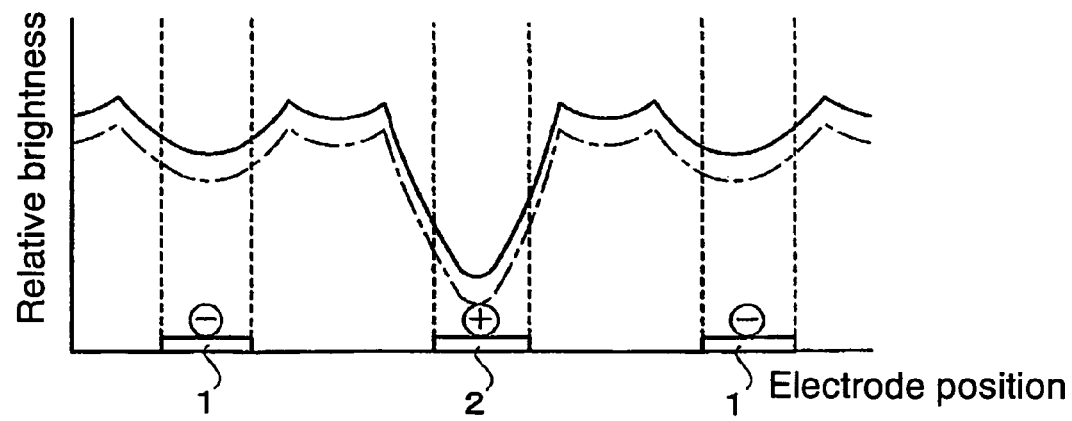
(b) Positive voltage applied

Fig.43
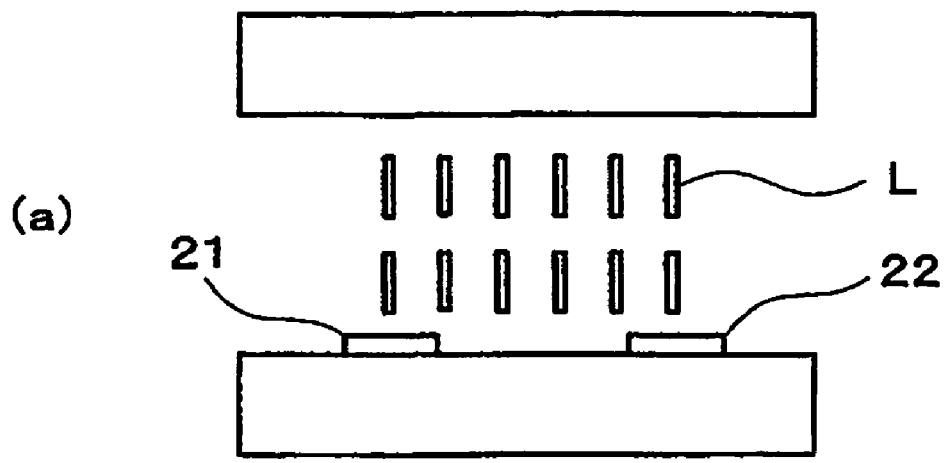
(a)
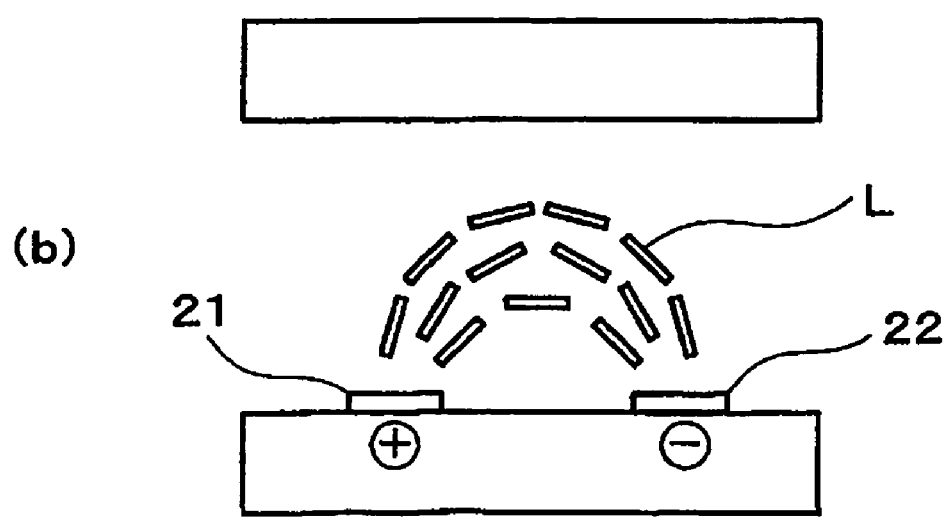
(b)

Fig.45
(a) 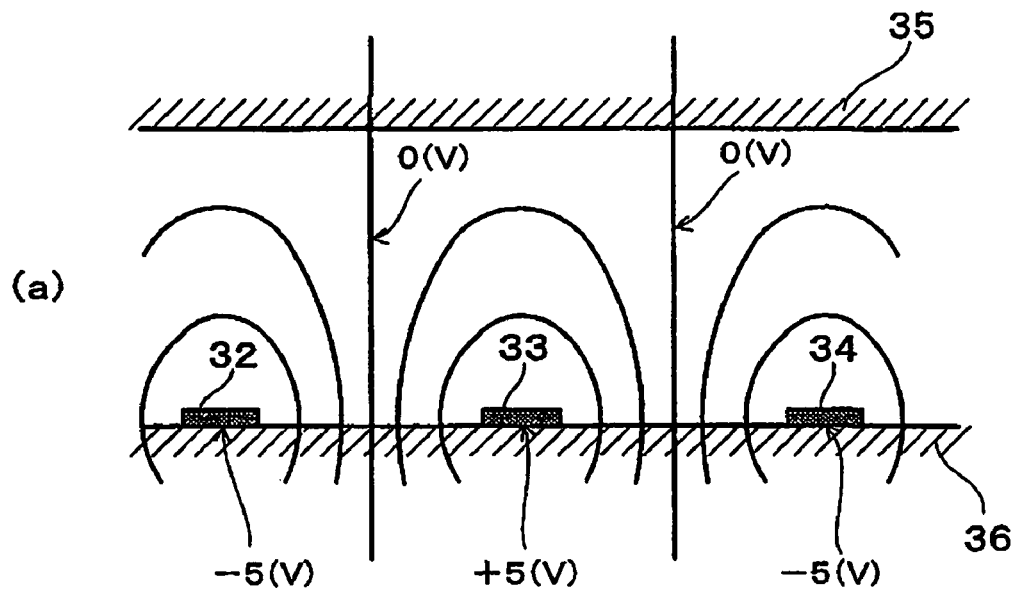
(b) 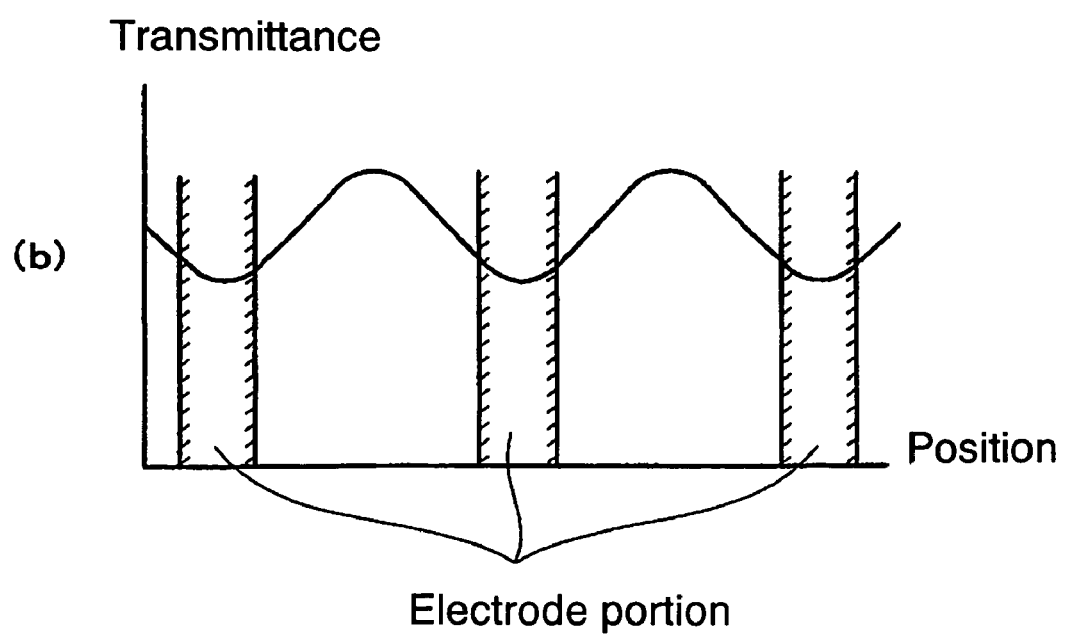

Fig.46
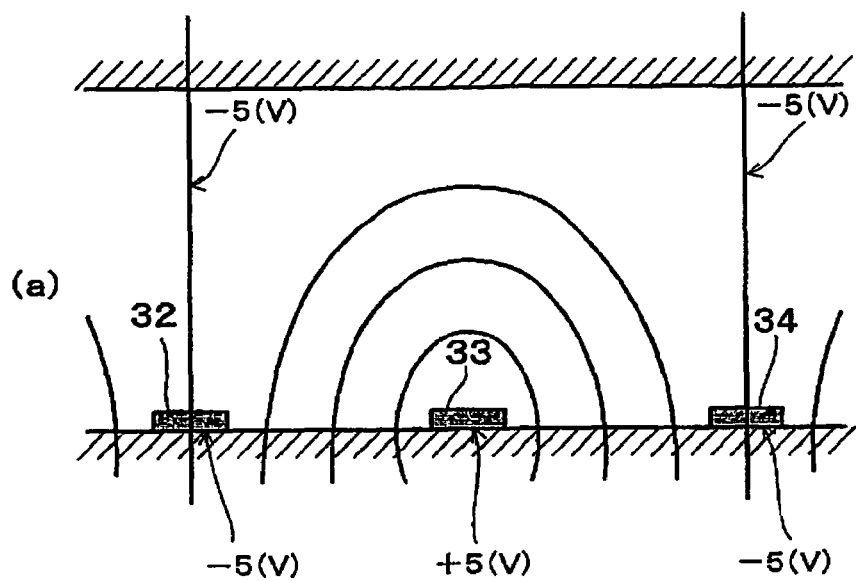
(a)
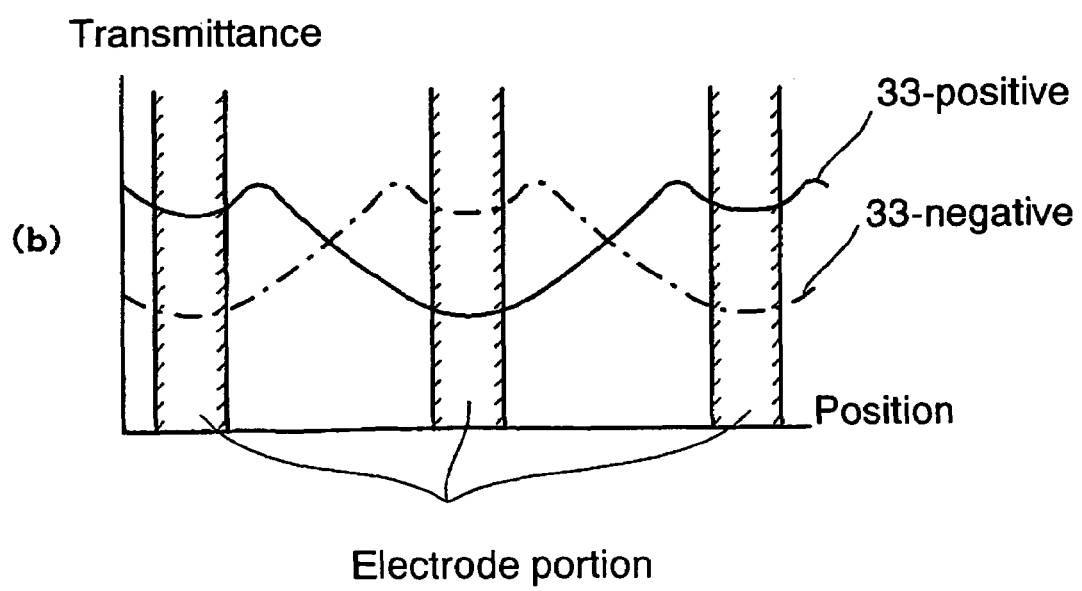
(b)
Electrode portion

DISPLAY AND ITS DRIVING METHOD

TECHNICAL FIELD

The present invention relates to display devices such as liquid crystal display devices, etc., and driving methods thereof.

BACKGROUND ART

Liquid crystal display devices are in wide use as thin and light flat displays for use in various electronic machines. There are several display schemes used in liquid crystal display devices. Among those, a scheme known as IPS (In-Plane Switching), in which an electric field is applied to liquid crystal in parallel to a substrate for obtaining a wide viewing angle, is suitably used for monitor displays for use in personal computers, liquid crystal TV sets or the like because of its excellent image properties.

Liquid crystal display devices using IPS are disclosed in Japanese Unexamined Patent Publication No. 10-10556, for example. A plan view of a pixel portion thereof is shown in FIG. 47. Such a liquid crystal display device comprises an array substrate and an opposing substrate parallel to each other, and liquid crystal held between the array substrate and the opposing substrate. As shown in FIG. 47, in the array substrate, gate wirings 101 feeding scanning signals and source wirings 102 feeding image signals are arranged so as to intersect at approximately right angles. Nearby each intersection of the gate wiring 101 and the source wiring 102, a thin-film transistor (TFT) 104 having a semiconductor layer is formed as a switching element. To the source wiring 102, a comb-like pixel electrode 115 is connected via the TFT 104. Opposing electrodes 116 functioning as a standard potential are arranged so as to mesh with the pixel electrode 115. The opposing electrodes 116 are electrically connected to a common wiring 103 parallel to the gate wiring 101 through a contact hole 108. At the intersection of the common wiring 103 and the pixel electrode 115, with an insulating layer (not shown) in between, a storage capacitor region 107 is formed.

According to such a liquid crystal display device, an electric field substantially parallel to the substrates is generated by the difference between the voltage applied to the pixel electrode 115 and that of the opposing electrode 116, to which a standard potential is applied, and thereby the liquid crystal (not shown) held between the electrodes is driven. By storing electric charge in the storage capacitor region 107 while the TFT 104 is in an on-status, the liquid crystal remains actuated while the TFT 104 is in an off-status.

In prior art IPS style liquid crystal display devices, pixel electrodes and opposing electrodes are generally made of aluminum or the like metals. Therefore, the pixel electrodes and opposing electrodes do not transmit light, leading to the drawback of an unsatisfactory pixel aperture ratio. Japanese Unexamined Patent Publication No. 10-10556 proposes a way to enhance the aperture ratio by forming either or both of the pixel electrode 115 and the opposing electrode 116 out of a transparent conductive film.

In the case where both the pixel electrode 115 and the opposing electrode 116 are made of transparent electrodes, it is preferable that both the electrodes be formed as a same layer in order to avoid a more complicated production process and increased manufacturing costs. However, this arrangement may lower the manufacturing yield by causing short-circuits between the pixel electrode 115 and the opposing electrode 116. Therefore, it is more practical that either the pixel electrode or the opposing electrode be made of a transparent electrode.

However, forming only one of the pixel electrode and the opposing electrode out of a transparent electrode and forming the other out of metal or a like material may cause flicker due to the difference in the optical properties of the two materials.

In order to apply a sufficient voltage to liquid crystal molecules while preventing decomposition or deterioration thereof, liquid crystal display devices are driven by the alternating current drive method, where an electric potential alternately positive and negative relative to that of the opposing electrode is applied to the pixel electrode at a regular interval (for example, once every sixtieth seconds). When the alternating current drive method is employed in a liquid crystal display device in which only one of the pixel electrode and the opposing electrode is a transparent electrode, its transmittance changes cyclically between the period when an electric potential positive relative to that of the opposing electrode (positive frame) is applied to the pixel electrode and the period when an electric potential negative relative to that of the opposing electrode (negative frame) is applied to the pixel electrode, causing observable differences in brightness.

DISCLOSURE OF THE INVENTION

The present invention aims to overcome the drawbacks described above. An object of the invention is to prevent flicker of a display device in which an electro-optic material is driven by applying a voltage between two electrodes having different transmittances.

The inventors conducted research into the causes of the flicker described above and found that the following two factors greatly affect the occurrence of flicker. A first factor is the flexoelectric effect. The flexoelectric effect is a polarization phenomenon brought about by splay deformation (orientation deformation) of liquid crystal. Regarding the relationship between the flexoelectric effect and IPS, "Manuscripts of Lectures at the 1999 Japanese Liquid Crystal Conference" (page 514, lecture number 3D06) explains the occurrence of domain reversal in connection with the positive and negative electrodes and rubbing direction.

How the flexoelectric effect influences flicker will be explained below with reference to FIGS. 44(a), 44(b), 44(c) and 44(d). In FIG. 44(a), when a positive voltage is applied to an electrode 21 and a negative voltage is applied to an electrode 22 in a liquid crystal display device using IPS or the like where a lateral electric field is applied, a solid line 26 represents a line of electric force, when the shape effect of the liquid crystal molecules is left out of consideration. On the electrodes 21 and 22, the lines of electric force splay out. In this figure, 23 represents a liquid crystal layer, 24 represents an opposing substrate, and 25 represents an array substrate. Liquid crystal display devices are driven by the alternating current drive method. Therefore, the direction of the electric field reverses, for example, once every sixtieth of seconds.

FIG. 44(b) shows an array of liquid crystal molecules 27 formed out of this splay electric field. To the end of each of the liquid crystal molecules, a cyano group, a fluorine atom or the like is introduced to give dielectric anisotropy. These parts function as negative electrodes of a dipole moment and compose the larger part of the molecular skeleton. As shown in an enlarged view of FIG. 44(b) (in the circle), the molecule has a wedge-like shape opening to the negative electrode side. Because of the shape effect (excluded volume effect), when a splay shape alternating electric field is applied to the liquid crystal molecules, they will tend to be arranged so as to direct the narrower end of the wedge to the electrode side and the wider end to the center of the liquid crystal layer. The liquid crystal molecules 27 are uniformly aligned as described above and this generates an electric field 28 attributable to the liquid crystal molecules. This phenomenon is known as the flexoelectric effect.

FIG. 44(c) illustrates a composite electric field 29 shown by broken lines which is generated by the original electric field 26 and the electric field 28 attributable to the flexoelectric effect in the liquid crystal molecules. The composite electric field 29 exhibits a stronger vertical electric field on the positive electrode 21 side and a weaker vertical electric field on the negative electrode 22 side.

As a result, its distribution of transmittance varies depending on the polarity (i.e., positive or negative) of the applied voltage. FIG. 44(d) shows the transmittance distribution when both electrodes 21 and 22 are transparent. Here, the solid line shows the transmittance distribution when the electrode 21 has a positive electric potential (positive frame), and the dash-and-dot line shows the transmittance distribution when the electrode 21 has a negative electric potential (negative frame). Both electrodes are symmetric with respect to a longitudinal axis passing through the midpoint thereof. Therefore, when both electrodes 21 and 22 are transparent or both electrodes 21 and 22 have opaque properties, very little variance in the transmittance between the positive and negative frames is observed. When one of the electrodes transmits light and the other blocks light or the transmittances of the two electrodes 21 and 22 are significantly different, the transmittance of the pixel differs between the positive and negative frames due to the difference of their optical contribution ratios, causing flicker.

A second main factor causing flicker is influence by a peripheral electric potential. FIG. 45(a) shows equipotential lines when, out of the three electrodes 32, 33 and 34 disposed on an array substrate 36, a voltage of −5 volts (V) is applied to the end electrodes 32 and 34 and a voltage of +5 V is applied to the middle electrode 33. When the electric potential of the interface of opposing substrate 35 is assumed to be the average of the two voltages (i.e. 0 V), equipotential lines of 0 V exist on the lines normal to the substrate passing through points equidistant to any two adjacent electrodes among 32, 33 and 34. Therefore, when the flexoelectric effect is left out of consideration, the three electrodes 32, 33 and 34 are equivalent. Therefore, when the electrode 33 has a positive electric potential and when it has a negative electric potential, its transmittance distribution is shown by the solid line in FIG. 45(b), and this enables the transmittance of the pixel to remain stable, even when some of the plurality of electrodes 32, 33 and 34 is/are made transparent, resulting in no occurrence of flicker.

However, in an IPS style liquid crystal display device, there is no electrode on the surface of the opposing substrate and this makes it difficult to form a desirable electric potential on the interface 35. Therefore, if the electric potential of the interface 35 of the opposing substrate is assumed to be −5 V, in cases where the electrode 33 has a positive electric potential, as shown in FIG. 46(a), equipotential lines of −5 V form above electrodes 32 and 34 along the direction normal to the substrate. In this case, the transmittance distribution is as shown by the solid line in FIG. 46(b), i.e., the transmittances on the end of electrodes (negative electrodes) 32 and 34 are higher than that on the middle electrode (positive electrode) 33. On the other hand, when the electrode 33 has a negative electric potential, as shown by the broken line in FIG. 46(b), the transmittances on the end electrodes (positive electrodes) 32 and 34 become lower than that on the middle electrode (negative electrode) 33. Therefore, when some of the plurality of electrodes 32, 33 and 34 is/are made transparent, frames where the transparent electrode(s) have a negative electric potential become brighter than frames where the transparent electrode(s) have a positive electric potential, causing flicker.

Taking these phenomena, which are key causes of flicker, into consideration, transmittances of individual pixels in prior art display devices are not even but exhibit a certain distribution, i.e., the transmittance distribution varies between when a pixel electrode has a positive electric potential relative to the opposing electrode (positive frame) and when the pixel electrode has a negative electric potential relative to the opposing electrode (negative frame). Therefore, for example, when the pixel electrode is made of a transparent material and the opposing electrode is made of an opaque material, the transmittance of the pixel electrode in either the positive or negative frame becomes higher than that of the other frame. On the other hand, the opposing electrode does not transmit light and therefore the transmittance of the opposing electrode does not change between a positive frame and a negative frame. As a result, the transmittance variance between frames of the pixel electrode is observed as a variance in the brightness of the whole pixel.

Such a flicker phenomenon is not limited to IPS style liquid crystal display devices but occurs when display devices comprising two electrodes having different light transmittances are driven by the alternating current drive method.

To achieve the above object, the display device of the invention comprises an array substrate, an opposing substrate facing the array substrate and an electro-optic substance held between the array substrate and the opposing substrate. The array substrate is provided with a plurality of gate wirings and a plurality of source wirings intersecting each other, a pixel electrode disposed in each region defined by two adjacent gate wirings and two adjacent source wirings, a switching element for switching a voltage applied to the pixel electrode from the source wiring based on a signal voltage supplied from the gate wiring, a common wiring formed between the two adjacent gate wirings and an opposing electrode being electrically connected to the common wiring and generating an electric field for driving the electro-optic substance between the opposing electrode and the pixel electrode whereto a voltage is applied. The pixel electrode comprises a first pixel electrode and a second pixel electrode, and the opposing electrode comprises a first opposing electrode and a second opposing electrode. A first region is formed in which an electric field is generated between the first pixel electrode and the first opposing electrode whose light transmittance is lower than that of the first pixel electrode. A second region is also formed in which an electric field is generated between the second pixel electrode and the second opposing electrode whose light transmittance is higher than that of the second pixel electrode. According to this display device, flicker can be reduced because the flicker polarities caused by the variance in transmittance between the pixel electrode and the opposing electrode can be cancelled between the first region and the second.

In the display device, it is preferable that the first region and the second region be adjacent to each other.

It is preferable that a voltage is applied to the first pixel electrode and the second pixel electrode from the same source wiring based on the signal voltage supplied from the same gate wiring. This makes the polarities of a voltage applied to the first pixel electrode and second pixel electrode the same and reliably cancel flicker polarity.

Preferably, the first region and the second region be disposed in the same dot. This makes it possible to locate the interface of the first region and the second region on the common electrode. It is also possible to connect the first pixel electrode to the second pixel electrode and the first opposing electrode to the second opposing electrode respectively through contact holes formed in the insulating layers held in between. Thereby, formation of contact hole in aperture of the display region for connecting different electrode materials (material transformation) becomes unnecessary, enhancing a high aperture ratio. It is also possible to arrange the source wiring between the first region and the second region. A preferable arrangement is such that the switching elements each correspond to the first pixel electrode and second pixel electrode, respectively. This arrangement reduces a defective ratio of the dot. Furthermore, when a plurality of the first regions and a plurality of the second regions are formed, it is preferable that groups of two consecutively identical regions be alternately arranged along the gate wiring and the interface of the that groups of two adjacent first regions and the second regions be located on the pixel electrode or the opposing electrode. This allows any two adjacent regions to share the pixel electrode or the opposing electrode, enhancing the aperture ratio.

When a plurality of the first regions and a plurality of the second regions are formed, it is preferable that the first regions and the second regions are arranged in a manner such that the flicker polarity cyclically changes along both the gate wiring and the source wiring based on the prescribed voltage polarity applied to the first pixel electrode and the second pixel electrode. This reduces flicker and achieves a uniform display without suffering from vertical or horizontal strips while in operation. In this case, it is preferable that the flicker polarities be inverted at every dot along both the gate wiring and the source wiring. When a checkerboard pattern or the like is displayed, it is preferable the flicker polarities be inverted at every plurality of dots along both the gate wiring and the source wiring.

It is also possible to arrange the first region and the second region in such a manner that each region corresponds to a dot or a pixel comprising three dots of red, green and blue. In both arrangements, flicker reduction can be achieved in a smaller region.

When storage capacitor electrodes electrically connected to the first pixel electrode and the second pixel electrode are formed and each of them is arranged in the first region and the second region, the two storage capacitor electrodes are disposed on the common electrode or the gate wiring with insulating layers in between to form storage capacitor regions. In this case, it is preferable that the capacities of the two storage capacitor regions be made substantially the same. This can be achieved by forming the two storage capacitor electrodes out of the same material and making their surface areas substantially the same.

The first pixel electrode and the second opposing electrode can be made of transparent materials and the first opposing electrode and the second pixel electrode can be made of an opaque material.

It is preferable that the area of the pixel electrode in the aperture of the first region and the area of the opposing electrode in the aperture of the second region be made substantially the same, reliably canceling flicker polarities and enhancing the flicker reduction effect. In this case, it is desirable that the transmittances of the first pixel electrode and the second opposing electrode be approximately the same. Such an arrangement readily be achieved by covering some portion of the first opposing electrode or the second pixel electrode with an opaque layer formed on the opposing substrate for blocking some portion of the array substrate from light.

It is preferable that a driving voltage having the same polarity is applied to the first region and the second region.

It is also preferable that first region and the second region have substantially the same absolute value of bright difference between the case where the pixel electrode has a positive electric potential relative to the opposing electrode and the case where the pixel electrode has a negative electric potential relative to the opposing electrode.

An object of the invention is also achieved by a display device comprises an array substrate, an opposing substrate facing the array substrate and an electro-optic substance held between the array substrate and the opposing substrate. The array substrate is provided with a plurality of gate wirings and a plurality of source wirings intersecting each other, a pixel electrode disposed in each region defined by two adjacent gate wirings and two adjacent source wirings, a switching element for switching a voltage applied to the pixel electrode from the source wiring based on a signal voltage supplied from the gate wiring, a common wiring formed between the two adjacent gate wirings, an opposing electrode being electrically connected to the common wiring and generating an electric field for driving the electro-optic substance between the opposing electrode and the pixel electrode whereto a voltage is applied and an intermediate electrode disposed between the pixel electrode and the opposing electrode. The intermediate electrode has a transmittance either higher or lower than both the pixel electrode and the opposing electrode.

In this display device, it is preferable that the pixel electrode and the opposing electrode be formed out of the same material, and the intervals between the pixel electrode and the intermediate electrode and between the intermediate electrode and the opposing electrode be substantially the same.

It is preferable that the intermediate electrode be resistively connected to the pixel electrode and the opposing electrode or conduct capacity coupling can be performed.

It is also preferable that the electric potential of the intermediate electrode becomes the average value of the electric potential of the pixel electrode whereto a voltage is applied and the electric potential of the opposing electrode which functions as a standard electric potential.

In the display device described above, it is preferable that the electro-optic substance be liquid crystal and the voltage applied to the pixel electrode be an alternating voltage.

An object of the invention can be achieved by applying a drive method for use in a display device comprising an array substrate, an opposing substrate facing the array substrate and an electro-optic substance held between the array substrate and the opposing substrate. The array substrate is provided with a plurality of gate wirings and a plurality of source wirings intersecting each other, a pixel electrode disposed in each region defined by two adjacent gate wirings and two adjacent source wirings, a switching element for switching a voltage applied to the pixel electrode from the source wiring based on a signal voltage supplied from the gate wiring, a common wiring formed between the two adjacent gate wirings and an opposing electrode being electrically connected to the common wiring and generating an electric field for driving the electro-optic substance between the opposing electrode and the pixel electrode whereto a voltage is applied. The pixel electrode and the opposing electrode are made of the materials having different transmittances. In this drive method, the voltage applied to the pixel electrode is inverted every predetermined adjacent regions.

In this drive method, the flicker polarities can be canceled between the two adjacent regions, reducing flicker.

It is preferable that the predetermined regions be adjacent to each other in two directions along the gate wiring and the source wiring.

It is also preferable that each predetermined region correspond to a dot or two dots adjacent in a direction either along the gate wiring or the source wiring.

The predetermined region can correspond to a pixel composed of three dots of red, green and blue or two adjacent pixels each composed of three dots of red, green and blue, wherein the any two adjacent pixels are adjacent to each other in a direction either along the gate wiring or the source wiring.

An object of the invention can be achieved by applying a drive method for use in a display device comprising an array substrate, an opposing substrate facing the array substrate and an electro-optic substance held between the array substrate and the opposing substrate. The array substrate is provided with a plurality of gate wirings and a plurality of source wirings intersecting each other, a pixel electrode disposed in each region defined by two adjacent gate wirings and two adjacent source wirings, a switching element for switching a voltage applied to the pixel electrode from the source wiring based on a signal voltage supplied from the gate wiring, a common wiring formed between the two adjacent gate wirings and an opposing electrode being electrically connected to the common wiring and generating an electric field for driving the electro-optic substance between the opposing electrode and the pixel electrode whereto a voltage is applied. The pixel electrode and the opposing electrode are made of the materials having different transmittances. The voltage applied to the pixel electrode is inverted by increasing or decreasing the volume of prescribed brightness compensation voltage.

This method for driving a display device makes the brightness differences approximately the same when the polarity of a voltage applied to the pixel electrode is inverted, reducing flicker.

When both the pixel electrode and the opposing electrode are formed out of transparent electric conductors, this method for driving a display device can be applied to the case where the total area of the pixel electrode and the total area of the opposing electrode occupying the transparent portions in the regions are different from each other.

An object of the invention can be achieved by applying a drive method for use in a display device comprising an array substrate, an opposing substrate facing the array substrate and an electro-optic substance held between the array substrate and the opposing substrate. The array substrate is provided with a plurality of gate wirings and a plurality of source wirings intersecting each other, a pixel electrode disposed in each region defined by two adjacent gate wirings and two adjacent source wirings, a switching element for switching a voltage applied to the pixel electrode from the source wiring based on a signal voltage supplied from the gate wiring, a common wiring formed between the two adjacent gate wirings and an opposing electrode being electrically connected to the common wiring and generating an electric field for driving the electro-optic substance between the opposing electrode and the pixel electrode whereto a voltage is applied. The pixel electrode comprises a first pixel electrode and a second pixel electrode, and the opposing electrode comprises a first opposing electrode and a second opposing electrode. A plurality of first regions generating an electric field between the first pixel electrode and the first opposing electrode whose light transmittance is lower than that of the first pixel electrode are formed; and a plurality of second regions generating an electric field between the second pixel electrode and the second opposing electrode whose light transmittance is lower than that of the second pixel electrode are formed. A voltage applied to the first pixel electrode and the second pixel electrode is inverted based on the arrangement cycles of the first region and the second region so as to flicker polarities periodically change along both the gate wiring and the source wiring.

This drive method can cancel flicker and prevent vertical or horizontal strips from appearing on a display during operation.

It is preferable that the flicker polarities are inverted at every dot or every plurality of dots along both or either of the gate wiring and the source wiring.

In the drive method, it is preferable that the driving frequency of the voltage applied to the pixel electrode be 60 Hz or higher for cancel apparent flicker.

BRIEF DESCRIPTION OF THE DRAWINGS

FIGS. 12(a) and 12(b) schematically illustrate arrays of dots.

FIGS. 13(a), 13(b), 13(c), 13(d), 13(e) and 13(f) schematically illustrate several methods for inverting a driving voltage.

FIGS. 20(a), 20(b), 20(c), and 20(d) are plan views of FIG. 19.

FIGS. 31(a), 31(b), 31(c), 31(d), 31(e) and 31(f) schematically show the polarities of drive waveforms on odd frames, dot structure and flicker polarities of a display device according to Embodiment 14 of the invention.

FIGS. 32(a), 32(b), 32(c) and 32(d) schematically show the polarities of drive waveforms on odd frames, dot structure and flicker polarities of a display device according to Embodiment 15 of the invention.

FIGS. 33(a) and 33(b) are sectional view and plan view of a display device according to Embodiment 16 of the invention.

FIG. 35(a). is a plan view showing a 4×4 dot section of pixels and FIGS. 35(b) and 35(c) are schematic diagrams showing writing polarities to the pixels of a display device according to Embodiment 16 of the invention.

FIGS. 36(a) and 36(b) show light transmittance properties of a pixel portion in a display device according to Embodiment 16 of the invention.

FIGS. 40(a) and 40(b) show light transmittance properties of a pixel portion in a display device according to Embodiment 17 of the invention.

FIGS. 43(a) and 43(b) show operation of a display device according to another embodiment of the invention.

FIGS. 45(a) and 45(b), and

FIGS. 46(a) and (b) illustrate a second factor causing flicker.

BEST MODE FOR CARRYING OUT THE INVENTION

Embodiments of the present invention will be described below with reference to the drawings.

Embodiment 1

Figure 1:
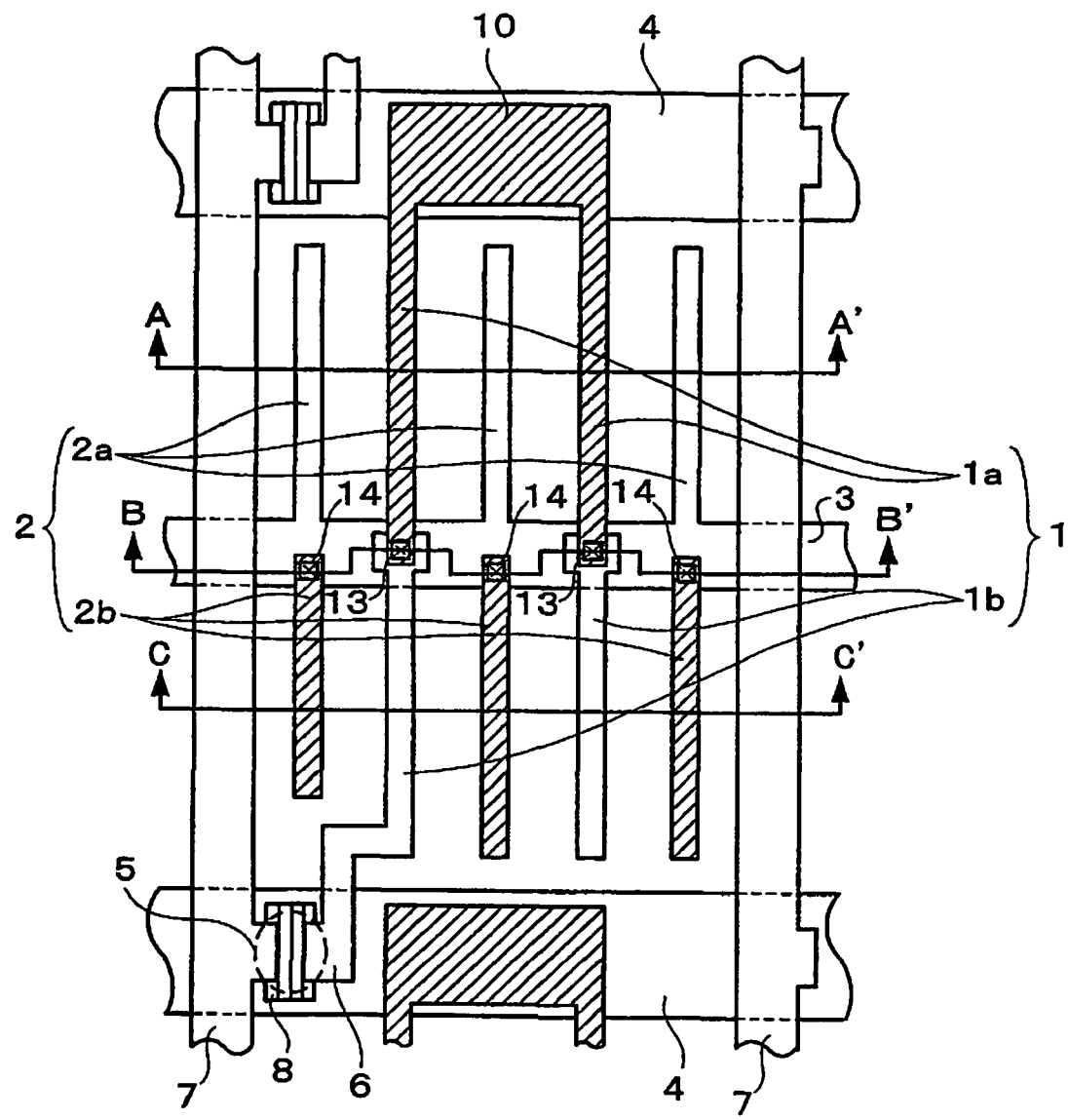
FIG. 1 is a plan view showing a structure of one dot serving as a minimal display unit of an array substrate in a display device according to Embodiment 1 of the present invention.

FIG. 1 is a plan view showing a structure of one dot serving as a minimal display unit of an array substrate in a display device according to Embodiment 1 of the invention. FIGS. 2(a), 2(b) and 2(c) are sectional views of FIG. 1 taken along the lines A-A', B-B' and C-C', respectively. In FIG. 1, gate wirings 4 feeding scanning signals and source wirings 7 feeding image signals are arranged so as to intersect at approximately right angles. Nearby each intersection of the gate wiring 4 and the source wiring 7, a thin-film transistor (TFT) 5 is formed as a switching element. The TFT 5 formed on the gate wiring 4 with an insulating layer in between comprises a semiconductor layer 8 made of amorphous silicon. On the two sides of the semiconductor layer 8, a projecting part of the source wiring 7 and a drain electrode 6 are arranged facing each other.

To the source wiring 7, a pixel electrode 1 is connected via the drain electrode 6 of the TFT 5. An opposing electrode 2 functioning as a standard potential is arranged so as to face the pixel electrode 1. The opposing electrode 2 is disposed between the two gate wirings 4, 4 in a parallel manner, and electrically connected to a common wiring 3 which supplies a prescribed electric potential (opposing voltage) to the opposing electrode 2.

The pixel electrode 1 comprises a first pixel electrode 1a made of a transparent electric conductor disposed in the upper half of the dot and a second pixel electrode 1b made of a metal material disposed in the lower half of the dot. The opposing electrode 2 comprises a first opposing electrode 2a made of a metal material which is disposed in the upper half of the dot so as to face the first pixel electrode 1a and a second opposing electrode 2b made of a transparent electric conductor disposed in the lower half of the dot so as to face the second pixel electrode 1b.

On the gate wiring 4, a storage capacitor region 10 connected to the first pixel electrode 1a is formed with an insulating layer in between.

As shown in FIGS. 1, 2(a), 2(b) and 2(c), on an array substrate 9, the gate wiring 4, the first opposing electrode 2a and a common wiring 3a are formed out of a first metal layer (ex. a three-layered structure comprising titanium, aluminum and titanium). There upon, with an insulating layer 11a in between, the source wiring 7, the drain electrode 6 and the second pixel electrode 1b are formed out of a second metal layer (ex. a three-layered structure comprising titanium, aluminum and titanium). There upon, with an insulating layer 11b in between, the first pixel electrode 1a and the second opposing electrode 2b are formed out of a transparent electric conductor layer (ex. Indium-Tin-Oxide (ITO)). The semiconductor layer 8 is formed between the first metal layer and the second metal layer and subjected to patterning. Both of the metal layers can be a uniform layer instead of a multilayer. For example, they can be formed of chromium, aluminum, tantalum or the like. It is also possible to use an alloy of molybdenum and tungsten, an alloy of molybdenum and tantalum or like alloys. Particularly, using silver alloys (ex. an alloy of silver, palladium and copper) is advantageous in that it lowers the wiring resistance and simplifies the manufacturing process. Tin oxide and like oxides, organic conductive films as well as ITO can be used for forming the transparent electric conductor layer.

The first pixel electrode 1a and the second pixel electrode 1b are connected to each other through a contact hole 13 formed in the insulating layer 11b. The first opposing electrode 2a is connected to the common wiring 3 formed on the same layer, and the second opposing electrode 2b is connected to a common wiring through a contact hole 14 formed in the insulating layers 11a, 11b. The number of contact holes and layer transformations (connections between different layers) are adjusted based on the shape and the number of electrodes.

Between the array substrate 9 and the opposing substrate (not shown) structured as described above, liquid crystal (not shown) is sealed in. Thus, a display device can be obtained.

The operation of the display device is described below. When an on-status voltage is applied to the gate wiring 4, a channel is formed on the semiconductor layer 8 and the gap between the source wiring 7 and the drain electrode 6 becomes conductive. Then, the drain electrode 6 and the pixel electrode 1 are charged to have the same electric potential as that of the source wiring 7. Thereby, a difference appears between the voltage fed to the pixel electrode 1 and that of the opposing electrode 2, to which a standard electric potential is applied. This generates electric fields substantially parallel to the substrates between the first pixel electrode 1a and the first opposing electrode 2a and between the second pixel electrode 1b and the second opposing electrode 2b and applied to the liquid crystal held between each of the electrodes.

When an off-status voltage is applied to the gate wiring 4, channel formation is not achieved in the semiconductor layer 8, and therefore there is no electrical continuity between the source wiring 7 and the drain electrode 6 and the electric charges charged in the drain electrode 6 and the pixel electrode 1 are retained. A storage capacitor electrode 10 forms a storage capacitor region between the gate wiring 4 and stabilizes the operation of the display device by compensating for or alleviating the potential difference due to leakage of electric charge from the pixel electrode 1. Operation observed in one dot is explained above. In a display device as a whole, a prescribed electric potential is sent to each of the dots arranged in a matrix while scanning the gate wirings one by one and applying to the source wiring a signal voltage appropriate to the dot scanned.

Figure 2:
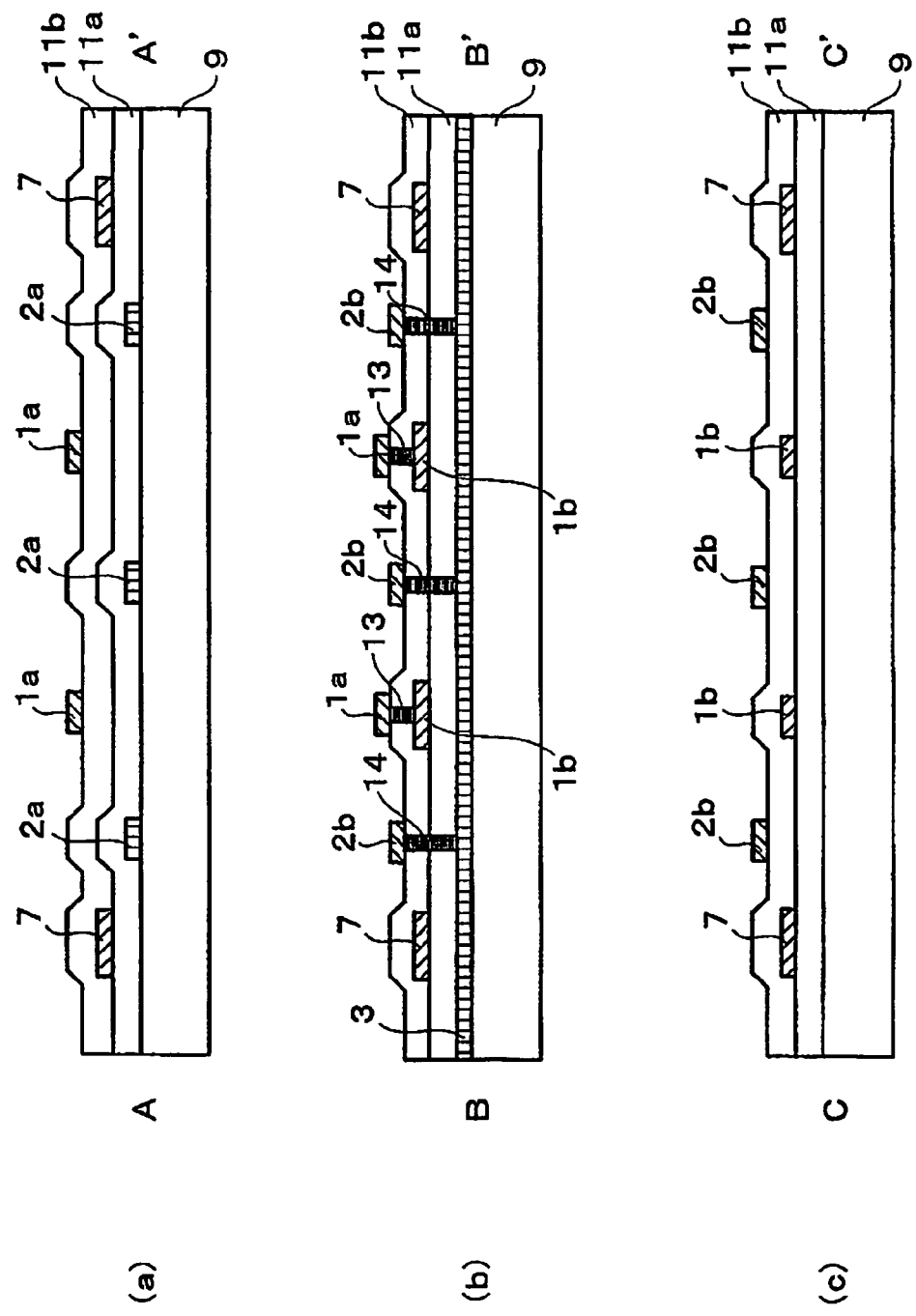
FIGS. 2(a), 2(b) and 2(c) are sectional views of FIG. 1.

Operation of a display device according to the present embodiment will be described below in more detail with reference to FIGS. 3 and 4. The structure shown in FIGS. 3 and 4 is the same as that shown in FIG. 2, and therefore the reference symbols used in FIG. 2 are omitted in FIGS. 3 and 4 unless needed for explanation.

The signal voltage of each dot alternates in every frame in a manner such that the electric potential of the pixel electrode 1 assumes a positive or negative value relative to the opposing electrode 2. FIG. 3 shows the condition where the gate voltage is at the off-level (Vg(OFF)) after creating a positive electric potential in the pixel electrode 1 in the first frame. FIG. 4 shows the condition where the gate voltage is at the off-level after recording a negative electric potential into the pixel electrode in the second frame. The display device, while the first and the second frames are being alternately repeated, is driven by the alternating current drive method. To simplify the explanation, the electric potential of the opposing electrode 2 is made a constant ground potential; however, if modulation in accordance with the polarity of the pixel electric potential is added to the opposing voltage and the gate voltage, the amplitude of the signal voltage can be reduced.

Figure 3:
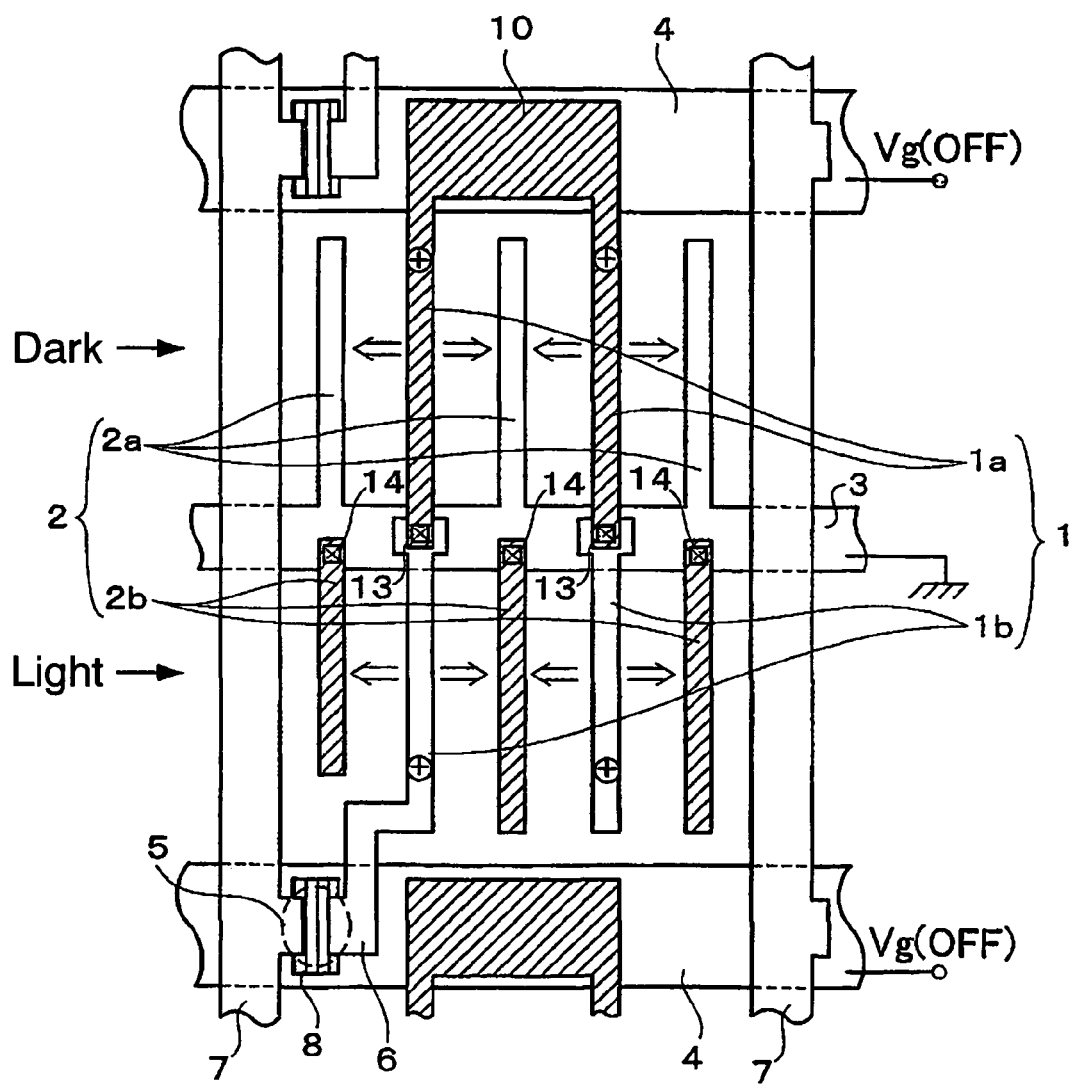
FIGS. 3 and 4 illustrate operations of the structure shown in FIG. 1.

As shown in FIG. 3, in the first frame, the first pixel electrode 1a and the second pixel electrode 1b have a positive electric potential and the first opposing electrode 2a and the second opposing electrode 2b have a ground potential, generating an electric field as shown by the arrows in the figure. Therefore, in the upper half of the dot, an electric field is generated from the transparent first pixel electrode 1a to the opaque first opposing electrode 2a and the transparent electrode (the shadowed portion of the figure) has a relatively positive electric potential; however, in the lower half of the dot, an electric field is generated from the opaque second pixel electrode 1b to the transparent second opposing electrode 2b and the transparent electrode (shadowed portion of the figure) has a relatively negative electric potential.

Figure 4:
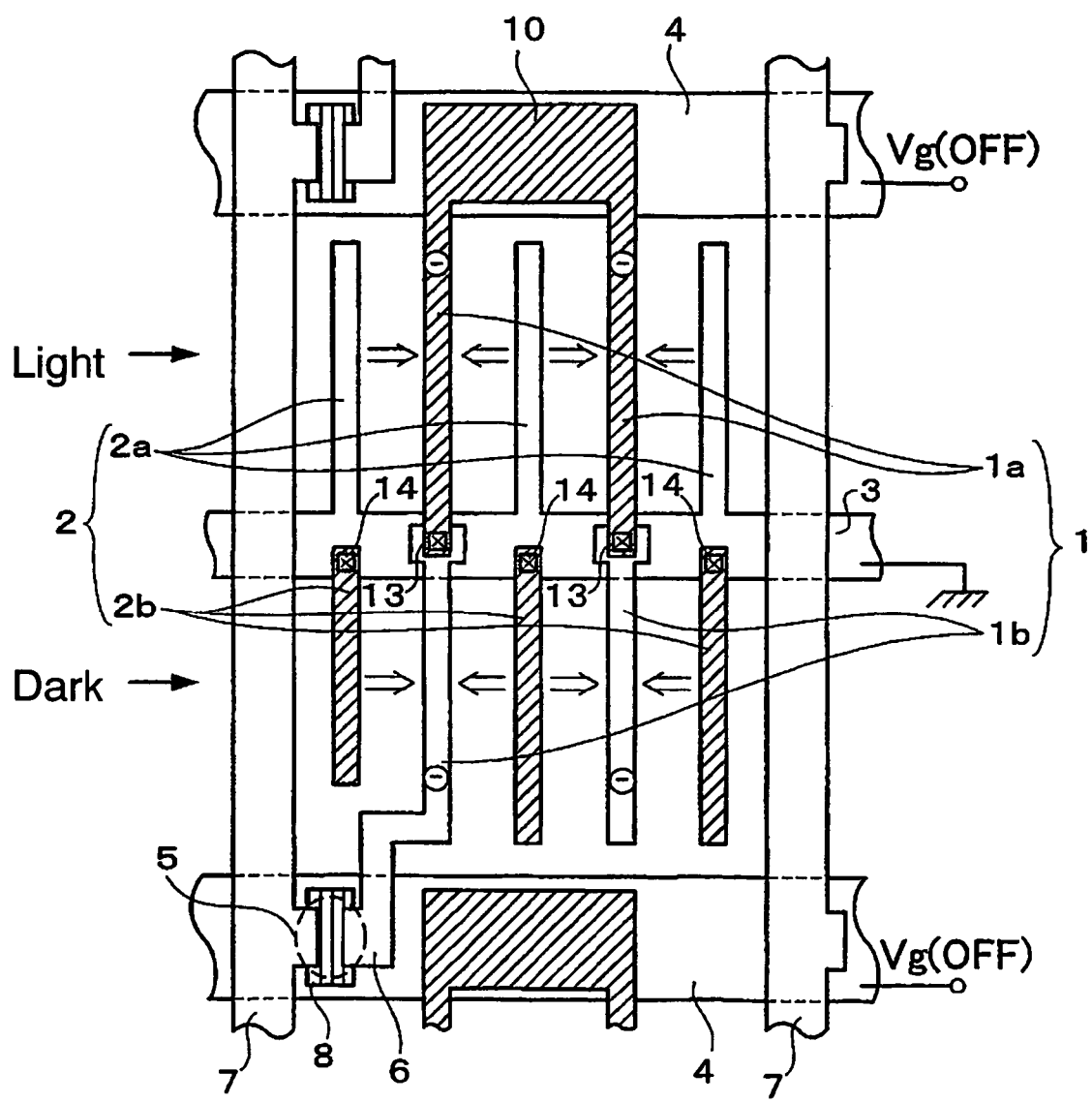

On the other hand, as shown in FIG. 4, in the second frame, the first pixel electrode 1a and the second pixel electrode 1b have a negative electric potential and the first opposing electrode 2a and the second opposing electrode 2b have a ground potential, generating an electric field as shown by the arrows in the figure. Therefore, in the upper half of the dot, an electric field is generated from the opaque first opposing electrode 2a to the transparent first pixel electrode 1a and the transparent electrode (shadowed portion of the figure) has a relatively negative electric potential; however, in the lower half of the dot, an electric field is generated from the transparent second opposing electrode 2b to the opaque second pixel electrode 1b and the transparent electrode (shadowed portion of the figure) has a relatively positive electric potential.

The light passing through spaces or transparent electrodes (shadowed portion of the figure) in a dot, becomes brighter in portions where, among the pixel electrode 1 and the opposing electrode 2, the transparent electrode has a negative electric potential relative to the opaque electrode compared to portions where the transparent electrode has a positive electric potential relative to the opaque electrode. Therefore, in the first frame shown in FIG. 3, the lower half of the dot is brighter and, in the second frame shown in FIG. 4, the upper half of the dot becomes brighter. As described above, either the upper half or the lower half of the dot alternately becomes brighter, and therefore the contrast within a dot is canceled from frame to frame and the flicker phenomenon does not occur.

In the present embodiment, since the partition line which divides the dot into the upper and lower portions exists on the common wiring 3, two regions having opposite flicker polarities (light or dark polarity) can be formed in a single display unit without an additional electrode layer or switching element. Therefore, the embodiment has the advantage that flicker can be reduced or eliminated without increased production costs caused by a more complicated manufacturing process or lowered aperture ratio due to formation of a switching element.

In addition, the layer transformation and the material transformation (connections between different layers and materials) of the first and second pixel electrodes 1a, 1b and the first and second opposing electrodes 2a, 2b occur above the common wiring 3, and therefore there is no need to form contact holes 13, 14 in the aperture portion of the display region to make the connections, improving the aperture ratio. Furthermore, in the structure where the common wiring 3 is disposed near the center of the display unit as in the present embodiment, if the connections between the electrode materials are made above the common wiring 3, the areas of the two regions having different flicker polarities can be made almost equal, and a great reduction of flicker can be achieved by a simple structure. Generally speaking, the above-mentioned improvement in the aperture ratio can be achieved if the connections between the electrode materials are made above the common wiring or the gate wiring.

Embodiment 2

Figure 5:
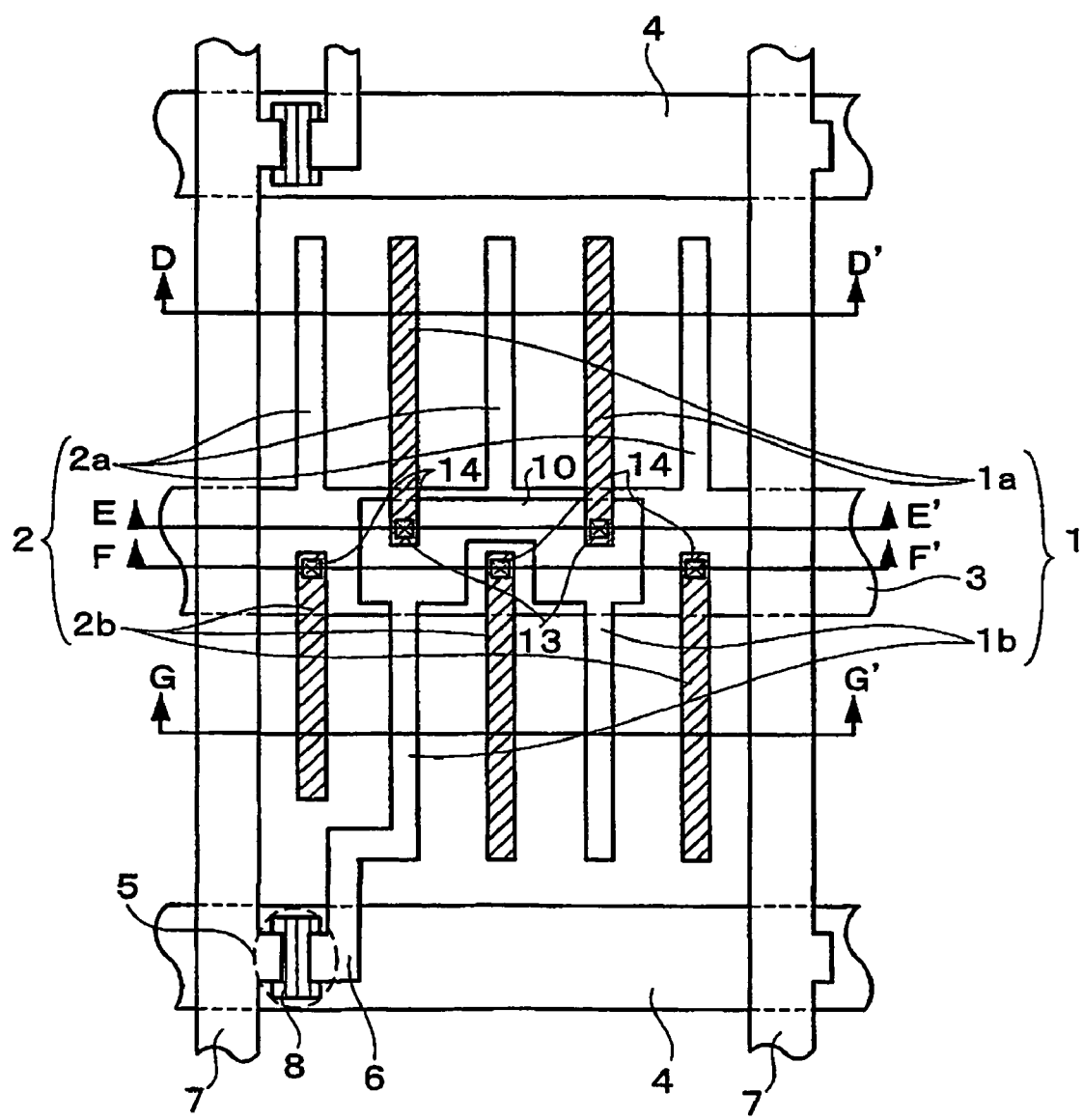
FIG. 5 is a plan view showing a structure of one dot serving as a minimal display unit of an array substrate in a display device according to Embodiment 2 of the invention.
Figure 6:
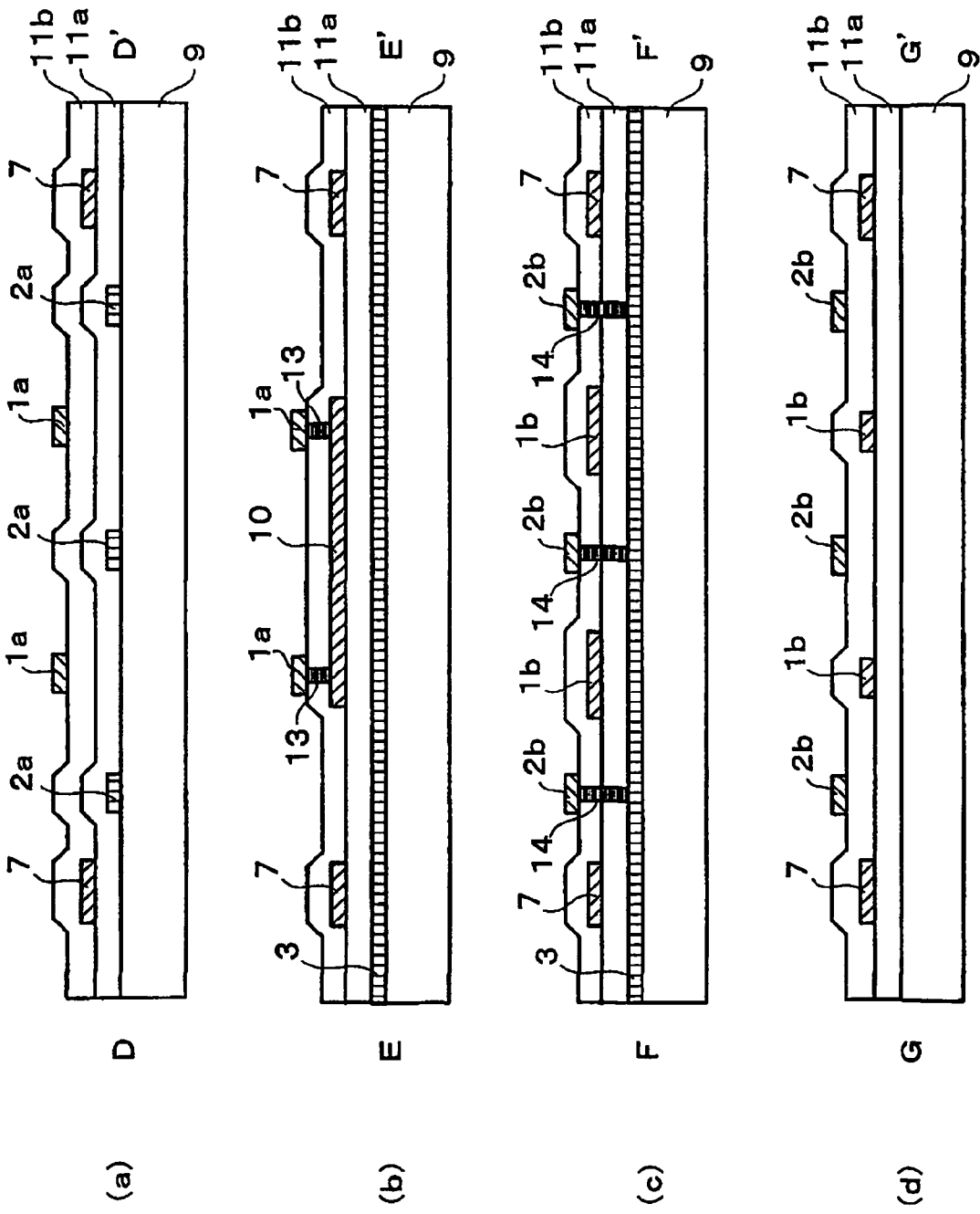
FIGS. 6(a), 6(b), 6(c) and 6(d) are sectional views of FIG. 5.

FIG. 5 is a plan view showing the structure of one dot serving as a minimal display unit of an array substrate in a display device according to Embodiment 2 of the invention and FIGS. 6(*a*), 6(*b*), 6(*c*) and 6(*d*) are sectional views of FIG. 5 taken along the lines D-D', E-E', F-F' and G-G'. In FIG. 5 and FIGS. 6(*a*), 6(*b*), 6(*c*) and 6(*d*), those elements which are identical to the elements of Embodiment 1 shown in FIGS. 1, 2(*a*), 2(*b*), and 2(*c*) are identified with the same numerical symbols, and repetitious explanation will be omitted.

A display device of the present embodiment is different from that of Embodiment 1 in that a storage capacitor electrode 10 is formed on the common wiring 3 instead of on the gate wiring 4 and a storage capacitor region is formed between the common wiring 3 and the storage capacitor electrode 10. This arrangement makes it possible to eliminate an additional capacitor above the gate wiring 4 and achieve an uniform display with a reduced distortion of the scanning voltage even on a wide screen. The principle used to eliminate flicker is the same as that used in Embodiment 1.

In Embodiment 1, the storage capacitor electrode 10 is formed out of the second metal layer in the same layer as the source wiring 7, the drain electrode 6 and the second pixel electrode 1*b* and is connected to the second pixel electrode 1*b*. Via the contact hole 13, the storage capacitor electrode 10 is also connected to the first pixel electrode 1*a* which is formed out of a transparent electric conductor layer with an insulating layer 11*b* in between.

Therefore, as Embodiment 1, the structure of the present embodiment has the following advantages. By dividing the region (dot) constituting display unit into upper and lower portions and connections between the different materials (material transformation) of the pixel electrode 1 and the opposing electrode 2 on the common wiring 3 corresponding to the partition line, it is possible to reduce or eliminate flicker without suffering from increased production costs caused by a more complicated manufacturing process or a lowered aperture ratio attributable to the formation of a switching element. Furthermore, since connections between the electrode materials are made above the wiring, formation of a contact hole in the aperture of the display region for making connections between different materials becomes unnecessary, and this enhances the aperture ratio.

In the following embodiments, the storage capacitor electrode is formed on the common wiring 3 as in the present embodiment; however, it can be formed on the gate wiring 4 as in Embodiment 1.

Embodiment 3

Figure 7:
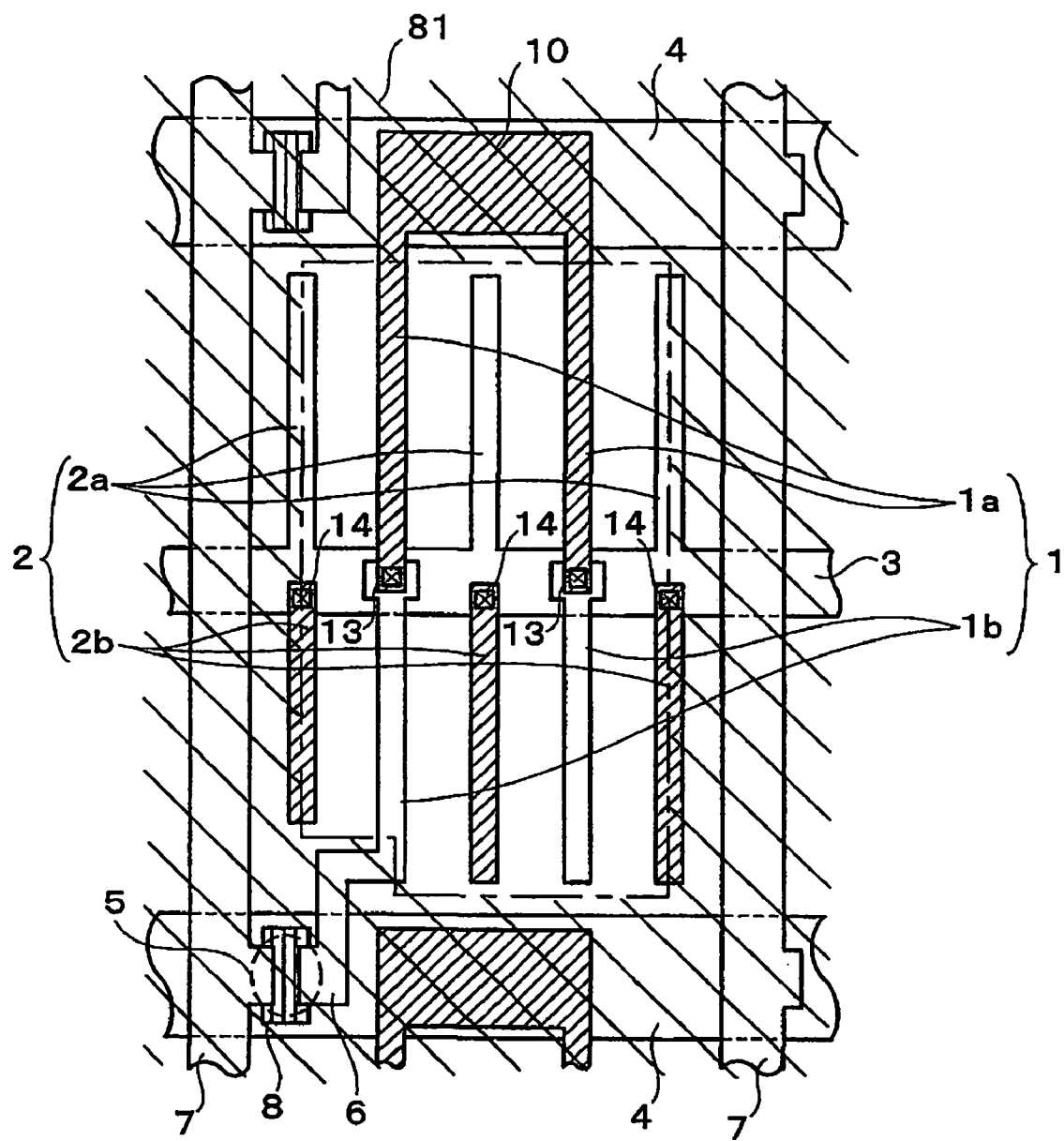
FIG. 7 is a plan view showing a structure of one dot serving as a minimal display unit of an array substrate in a display device according to Embodiment 3 of the invention.

FIG. 7 is a plan view showing the structure of one dot serving as a minimal display unit of an array substrate in a display device according to Embodiment 3 of the invention. In FIG. 7, those elements which are identical to the elements of Embodiment 1 shown in FIG. 1 are identified with the same numerical symbols, and repetitious explanation will be omitted.

In the display device of the present embodiment, the region 81 corresponding to the black matrix formed as an opaque layer on the opposing substrate (not shown) facing the array substrate shown in FIG. 1 is indicated by the region outlined with broken lines and filled by oblique lines. In other words, the region 81 is an area where passing light is blocked, and an aperture is formed in the center of the dot.

The outline of the region 81 runs along the middle of the first opposing electrode 2*a* and the second opposing electrode 2*b* in the longitudinal direction and makes the areas of the transparent electrode disposed in the apertures in the upper and lower halves of a dot (i.e. the first pixel electrode 1*a* and the second opposing electrode 2*b*) equal. As a result, it is possible to reliably cancel the flicker polarities in a dot. This structure is particularly useful when the actual areas of the transparent electrode differ in the upper and lower halves of a dot. In the present embodiment, the areas of the transparent electrode in the apertures in the upper and lower halves of a dot are made equal using a black matrix; however, it is also possible to make the areas of the transparent electrode equal by varying the width of the electrode and adjusting the length of the electrode. The black matrix can be formed on the array substrate side. Furthermore, it is also possible to use a metal layer instead of the black matrix and make it function as an opaque layer by overlaying it on a part of the transparent electrode layer. By forming an opaque layer such as a black matrix or the like on the array substrate side, the effect of any misalignment of the two substrates is eliminated and the accuracy of the position of the opaque layer with respect to the electrode is enhanced. This enhances the ability to eliminate flicker. More preferably, flicker can be reliably prevented by utilizing the results of experiments or simulations and adjusting the width of the opaque layer and electrode and the length of the electrode in a manner such that the effective areas of the transparent electrode affecting the transmittance in the upper and lower halves of a dot becomes equal. This arrangement can be employed not only in a display device of Embodiment 1 but also in display devices of other embodiments.

Embodiment 4

Figure 8:
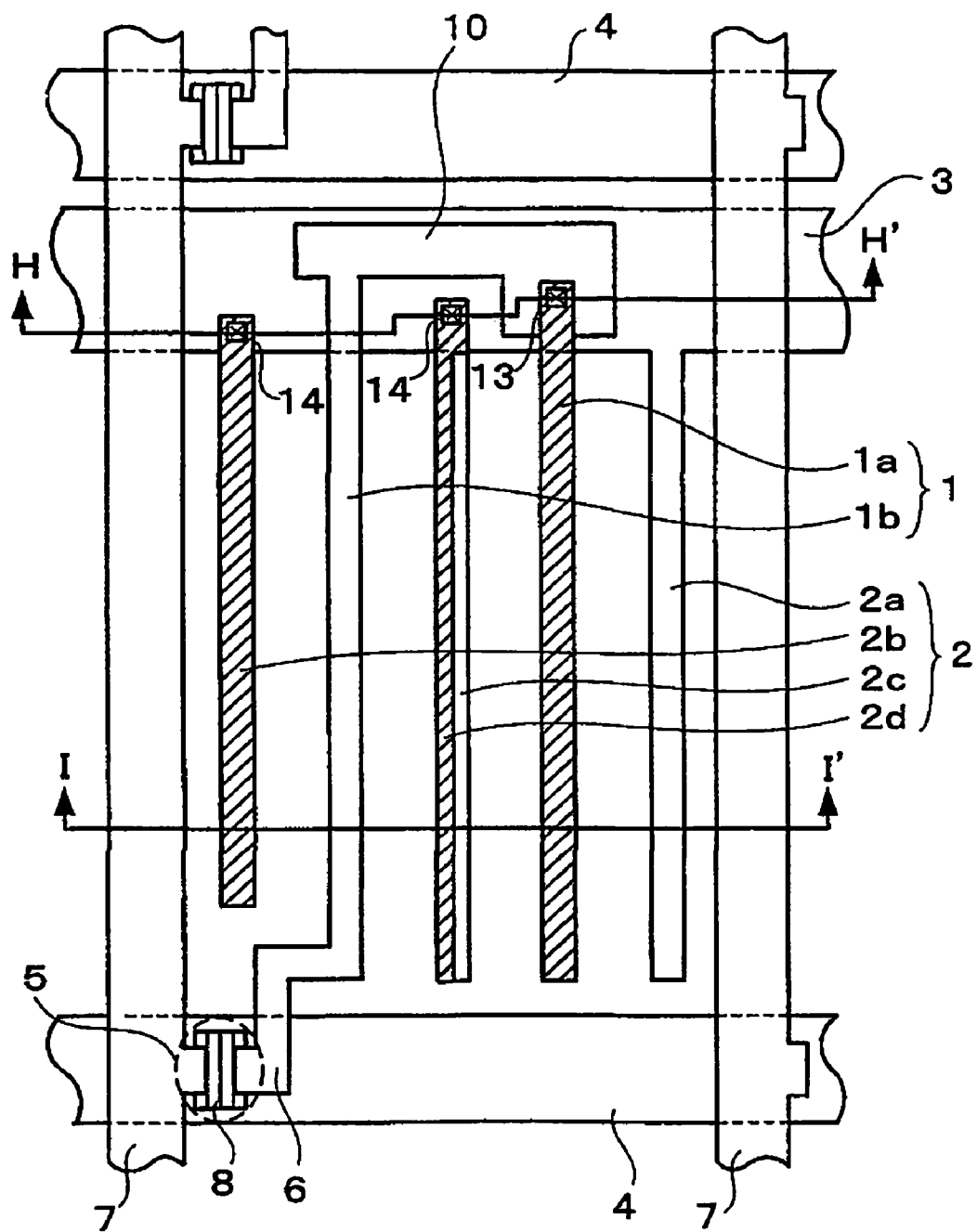
FIG. 8 is a plan view showing a structure of one dot serving as a minimal display unit of an array substrate in a display device according to Embodiment 4 of the invention.
Figure 9:
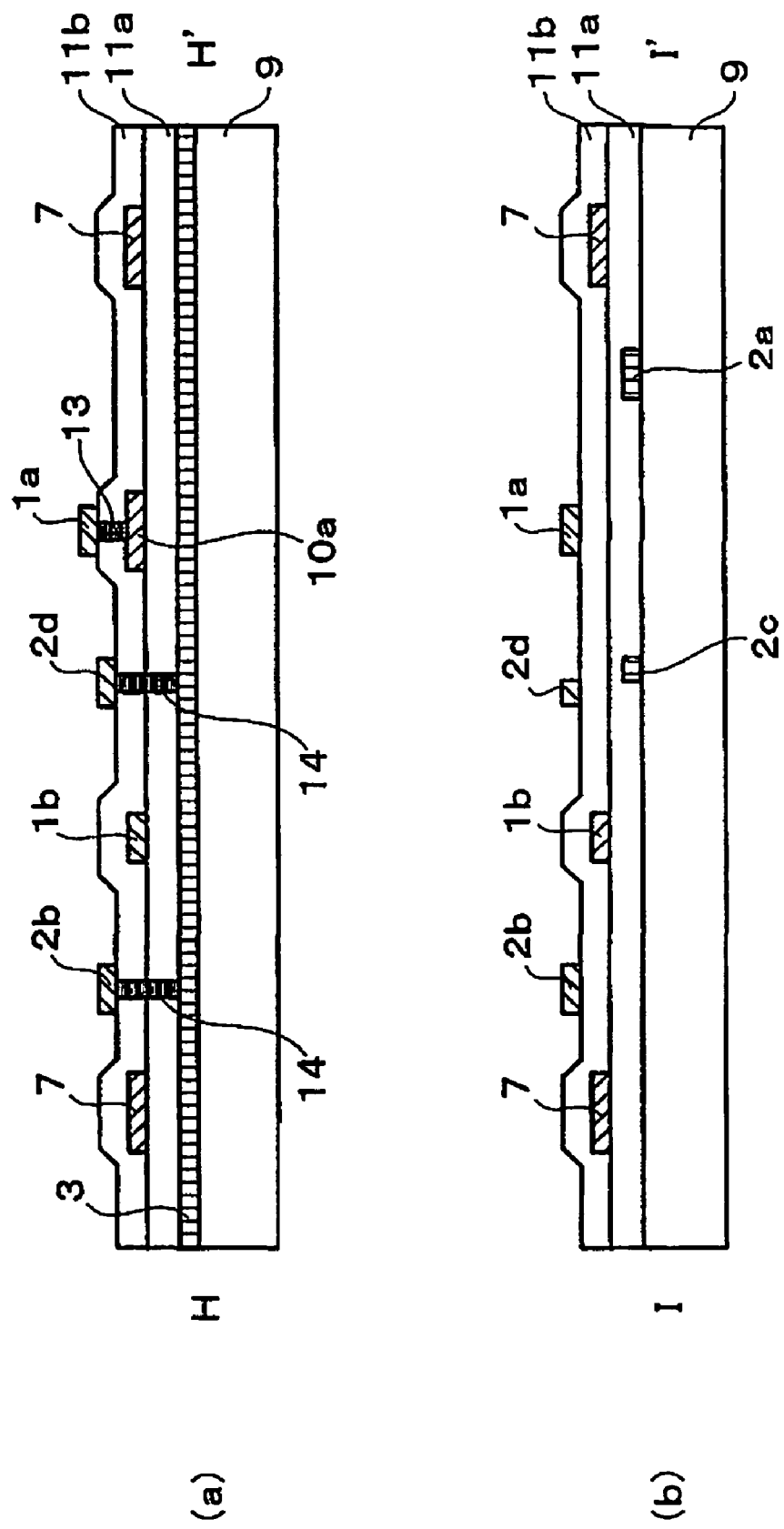
FIGS. 9(a) and 9(b) are sectional views of FIG. 8.

FIG. 8 is a plan view showing the structure of one dot serving as a minimal display unit of an array substrate in a display device according to Embodiment 4 of the invention. FIGS. 9(*a*) and 9(*b*) are sectional views of FIG. 8 taken along the lines H-H' and I-I'. In FIGS. 8, 9(*a*) and 9(*b*), those elements which are identical to the elements of Embodiment 1 shown in FIGS. 1, 2(*a*), 2(*b*), and 2(*c*) are identified with the same numerical symbols, and repetitious explanation will be omitted.

A display device according to the present embodiment is designed so that the inside of a dot is divided into right and left halves and flicker is canceled between the two (left and right) regions.

The right region comprises a first pixel electrode 1*a* made of a transparent electric conductor and a first opposing electrode 2*a* made of a metal material. The left region comprises a second pixel electrode 1*b* made of a metal material and a second opposing electrode 2*b* made of a transparent electric conductor. In the center of the dot, with the boundary line of the left and right regions in between, a first central opposing electrode 2*c* made of a metal material is formed on the right side and a second central opposing electrode 2*d* made of a transparent electric conductor is formed on the left side. A common wiring 3 is disposed above the center of the dot.

As shown in FIGS. 8, 9(*a*) and 9(*b*), on an array substrate 9, a gate wiring 4, the first opposing electrode 2*a*, the common wiring 3 and the first central opposing electrode 2*c* are formed out of a first metal layer. There upon, with an insulating layer 11*a* in between, a source wiring 7, a drain electrode 6, the second pixel electrode 1*b* and a storage capacitor electrode 10 are formed out of a second metal layer. Above the second metal layer, with an insulating layer 11b in between, the first pixel electrode 1a, the second opposing electrode 2b and the second central opposing electrode 2d are formed out of a transparent electric conductor layer. The first pixel electrode 1a is connected to the storage capacitor electrode 10 through a contact hole 13, and the second opposing electrode 2b and the second central opposing electrode 2d are connected to the common wiring 3 through a contact hole 14.

The display device having the above structure is advantageous in that it prevents flicker and readily obtains high definition images owing to a reduced number of contact holes. Furthermore, it can enhance the manufacturing yield since the ratio of defects caused by poor contact between the constituent elements is lowered. The common wiring 3 can also be disposed below the center of the dot.

Embodiment 5

Figure 10:
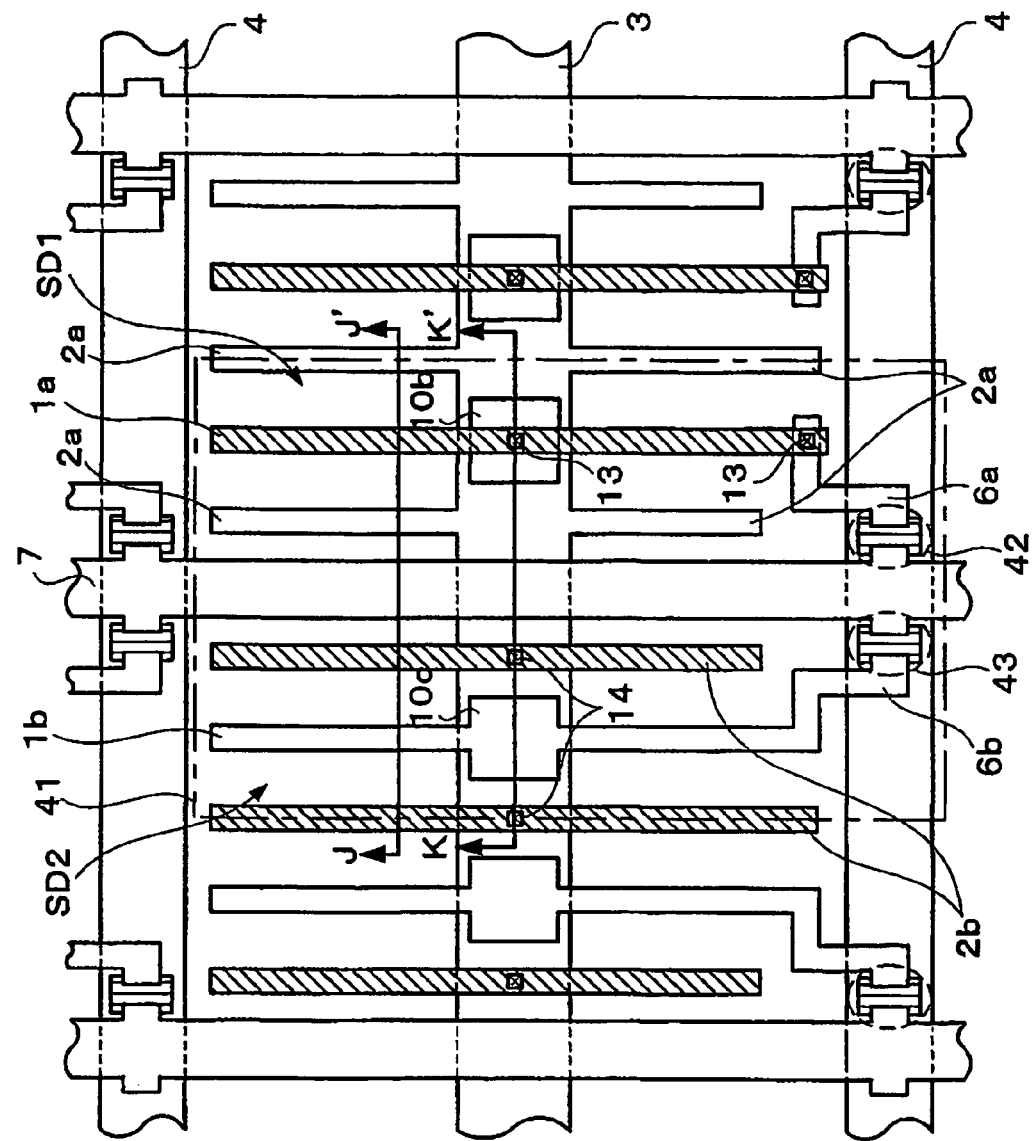
FIG. 10 is a plan view showing a structure of one dot serving as a minimal display unit of an array substrate in a display device according to Embodiment 5 of the invention.
Figure 11:
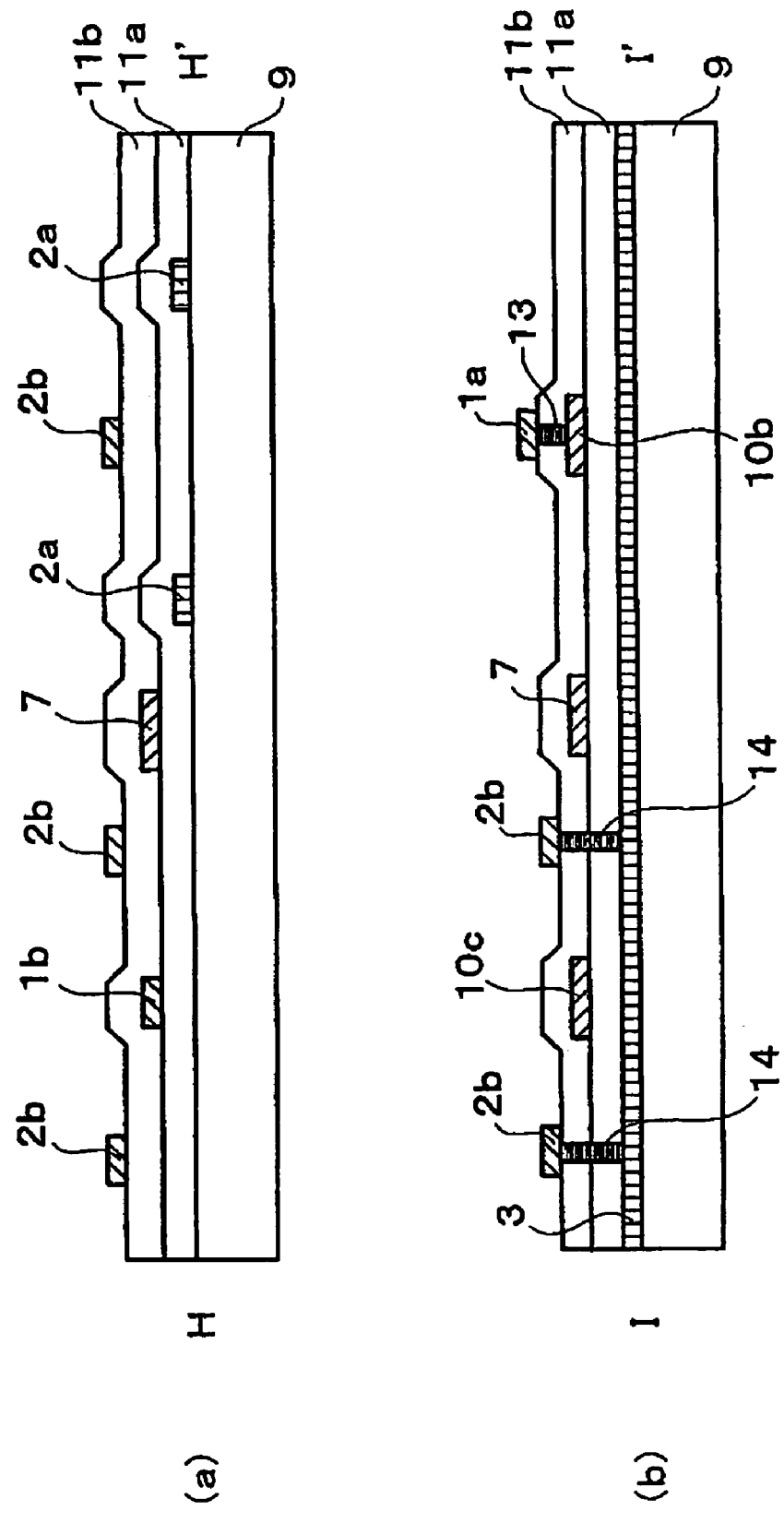
FIGS. 11(a) and 11(b) are sectional views of FIG. 10.

FIG. 10 is a plan view showing the structure of one dot serving as a minimal display unit of an array substrate in a display device according to Embodiment 5 of the invention. FIGS. 11(a) and 11(b) are sectional views of FIG. 10 taken along the lines J-J' and K-K'. In FIGS. 10, 11(a) and 11(b), those elements which are identical to the elements of Embodiment 1 shown in FIGS. 1, 2(a), 2(b), and 2(c) are identified with the same numerical symbols, and repetitious explanation will be omitted.

In FIG. 10, the region 41, whose outline is shown by the broken line, indicates a region of one dot. In the present embodiment, the dot is divided into two subdots SD1 and SD2 having opposite flicker polarities (light or dark polarity) and the flicker polarities are canceled within the dot.

The two subdots SD1 and SD2 are formed by dividing the dot into left and right portions with the center at a source wiring 7. The portions receive signals from the same gate wiring 4 and source wiring 7. The right subdot SD1 comprises a first pixel electrode 1a made of a transparent electric conductor and a first opposing electrode 2a made of a metal material. In contrast to SD1, the left subdot SD2 comprises a second pixel electrode 1b made of a metal material and a second opposing electrode 2b made of a transparent electric conductor. The first pixel electrode 1a and the second pixel electrode 1b are connected to the same source wiring 7 through TFTs 42, 43, respectively. Storage capacitor electrodes 10b, 10c are formed on a common wiring 3 and connected to the first pixel electrode 1a and the second pixel electrode 1b, respectively.

As shown in FIGS. 10, 11(a) and 11(b), on an array substrate 9, the gate wiring 4, the first opposing electrode 2a and the common wiring 3 are formed out of a first metal layer. There upon, with an insulating layer 11a in between, the source wiring 7, drain electrodes 6a, 6b, the second pixel electrode 1b and the storage capacitor electrodes 10b, 10c are formed out of a second metal layer. There upon, with an insulating layer 11b in between, the first pixel electrode 1a and the second opposing electrode 2b are formed out of a transparent electric conductor layer. The first pixel electrode 1a is connected to the storage capacitor electrode 10b through the contact hole 13, and the second opposing electrode 2b is connected to the common wiring 3 through the contact hole 14.

This structure achieves a display which is free from flicker, since the difference in brightness attributable to the flexoelectric effect or a peripheral electric potential is offset between the left and right subdots.

In the display device of the present embodiment, each dot is divided into two subdots SD1 and SD2, and the TFTs 42, 43 are provided in the subdots SD1 and SD2, respectively. Therefore, even when a defect arises in one of the TFTs 42, 43, the subdot having the other TFT operates normally. Therefore, the display device has the advantage that there is a low possibility of having a non-lighting dot caused by an entire dot being defective.

Furthermore, the two subdots SD1 and SD2 are arranged so as to hold the source wiring 7 in between. Since both subdots SD1 and SD2 use the same source wiring 7, there is no need to increase the number of source wirings 7.

As shown in FIG. 10, the electrodes 1a and 2b extend upward and downward from the contact holes 13, 14. Therefore, the number of contact holes can be reduced in the present embodiment compared to the structure in Embodiments 1 and 2 in which the electrodes extend in only one direction from the contact holes. This makes it possible to readily provide high definition images and enhance the manufacturing yield since the probability of a defect caused by poor contact between the constituent elements is lowered.

In order to further enhance the flicker reducing effect, bringing the flicker polarities of the two dots into balance is desirable. For that purpose, it is desirable that the capacities of the two storage capacitor electrodes 10b, 10c be made equal and it is advantageous that the two storage capacitor electrodes 10b, 10c be designed to be formed of the same material, thereby making the areas of the two storage capacitor electrodes equal. For that purpose, in the right subdot SD1 of the present embodiment, the transparent first pixel electrode 1a makes a connection between layers and the storage capacitor electrode 10b is made out of a metal layer. As a result, the design period of the TFT array is shortened without adversely affecting the design, enhancing the manufacturing yield by using a design having a high tolerance for the errors introduced by the manufacturing process.

Next, examples of the repeated patterns of dots in the entire array substrate and desirable combinations with driving methods will be explained. FIGS. 12(a) and 12(b) show repeated patterns of the subdots SD1 and SD2 shown in FIG. 10, wherein the left subdot SD2 (the pixel electrode is made out of a metal layer) is defined as P and the right subdot SD1 (the pixel electrode is made out of a transparent electrode layer) is defined as Q. As shown in FIG. 10, between each pair of dots, there is either a first opposing electrode 2a or a second opposing electrode 2b. With respect to the pattern design, the structure in which the left and right dots share the first opposing electrode 2a or the second opposing electrode 2b is preferable to enhance the aperture ratio. Therefore, in the dot array arranged along the gate wiring 4, on the right side of a dot having the two subdots arranged in the order of PQ, it is preferable to place a dot having the two subdots arranged in the order of QP. In other words, for any two horizontally adjacent dots, it is preferable that the arrangement of the subdots thereof be reversed.

On the other hand, regarding vertically adjacent dots, it is preferable that the arrangement cycle of the subdots differ from the inversion cycle of the driving voltages. If the two cycles are coincident with each other, the effect of inversion is offset and vertical lines may arise because dots having the same flicker polarity are arranged along the source wiring 7.

Desirable subdot patterns are explained below with reference to concrete examples. Regarding the subdot arrangement of vertically adjacent dots, the following two patterns are better suited for practical use in view of the layout design. In the first pattern, as shown in FIG. 12(a), the arrangement of the right and left subdots is reversed between any two vertically adjacent dots, and in the other, as shown in FIG. 12(b), the arrangement of the right and left subdots is kept the same without reversing.

Figure 13:
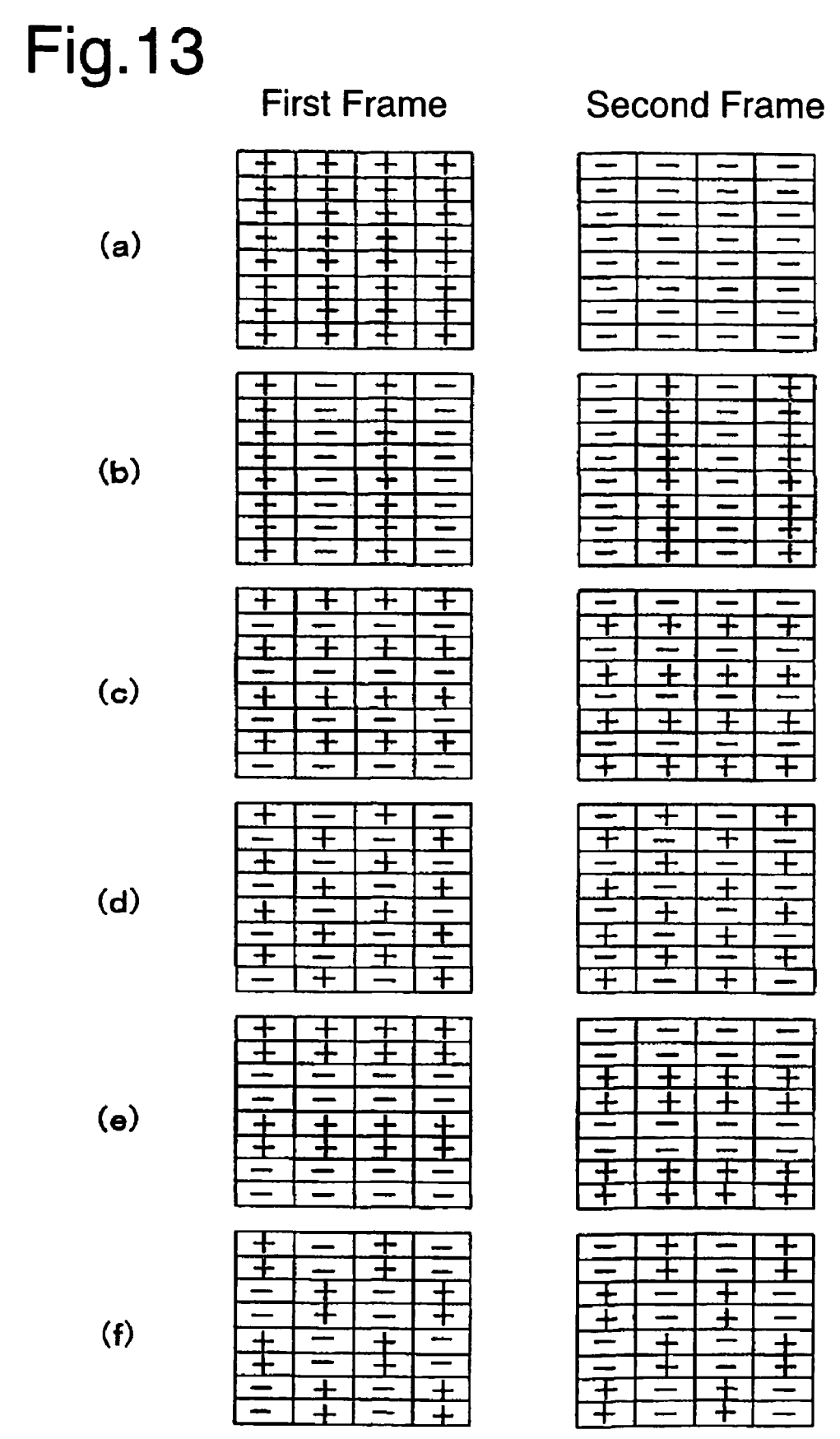

FIGS. 13(a) to 13(f) illustrate conditions in which the polarities of the voltage applied to each dot are inverted between the two frames, showing several polarity driving voltage inversion methods. Among the figures, FIG. 13(a) shows the frame-inversion drive method and FIG. 13(b) shows the column-inversion drive method. In both methods, a voltage is applied in such a manner that dots aligned in the vertical direction have the same polarity. It is desirable that these driving methods be used with the subdot arrangement pattern shown in FIG. 12(a). This is because, in vertically adjacent rows, subdot arrays are inverted and the polarity of the voltage applied to the pixel electrodes is the same, making flicker more indistinctive as subdots having the same flicker polarities are not continuously aligned in the vertical direction.

Among the polarity inversion methods shown in FIGS. 13(a) to 13(f), it is preferable that the line-inversion drive method (row-inversion drive method) shown in FIG. 13(c) and the dot-inversion drive method shown in FIG. 13(d) be used with the subdot arrangement pattern shown in FIG. 12(b). This is because, in vertically adjacent rows, subdot arrays have the same polarity pattern and the polarity of the voltage applied to the pixel electrodes is inverted, making flicker more indistinctive as subdots having the same flicker polarities are not continuously aligned in the vertical direction.

In the polarity inversion methods used to drive the liquid crystal, there are several ways in which inversion is performed every n lines instead of every line as shown in FIGS. 13(c) and 13(d). The two-line inversion drive method shown in FIG. 13(e) (inversion is performed every two lines) and the two-line-dot inversion drive method shown in FIG. 13(f) are the examples of the case when n is 2. When inversion drive is performed every n lines, a display free from severe problems in visibility can be achieved if the subdot array is inverted every n lines and the array cycle differs from the inversion cycle of the driving voltage.

When combined with the subdot arrangement shown in FIG. 12(a), the flicker polarities of vertically adjacent subdots are repeatedly inverted for n lines and a portion appears every n lines where vertically adjacent subdots have the same flicker polarities. On the other hand, when combined with the subdot arrangement shown in FIG. 12(b), vertically adjacent subdots have the same flicker polarities for n lines and a portion appears every n lines where the flicker polarities of vertically adjacent subdots are inverted. Therefore, when n is 2, and either the subdot arrangement shown in FIG. 12(a) or that of 12(b) is adopted, two lines of subdots having the same flicker polarities are continuously arranged in the vertical direction and then inverted, obtaining a desirable display. When n is 3 or greater, combination with the subdot arrangement shown in FIG. 12(a) results in an increased number of inversions of flicker polarity, and is thus desirable.

Embodiment 6

Figure 14:
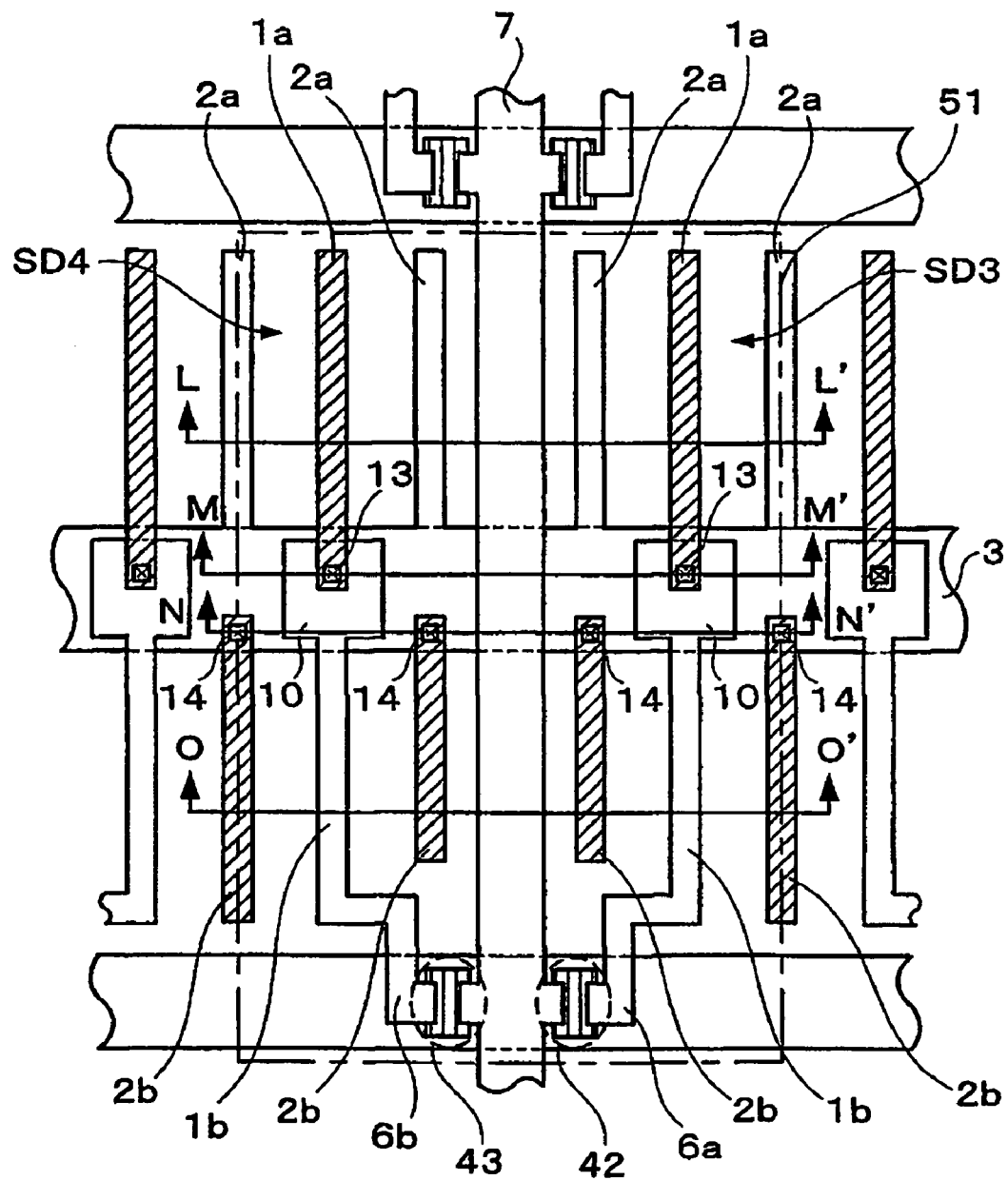
FIG. 14 is a plan view showing a structure of one dot serving as a minimal display unit of an array substrate in a display device according to Embodiment 6 of the invention.
Figure 15:
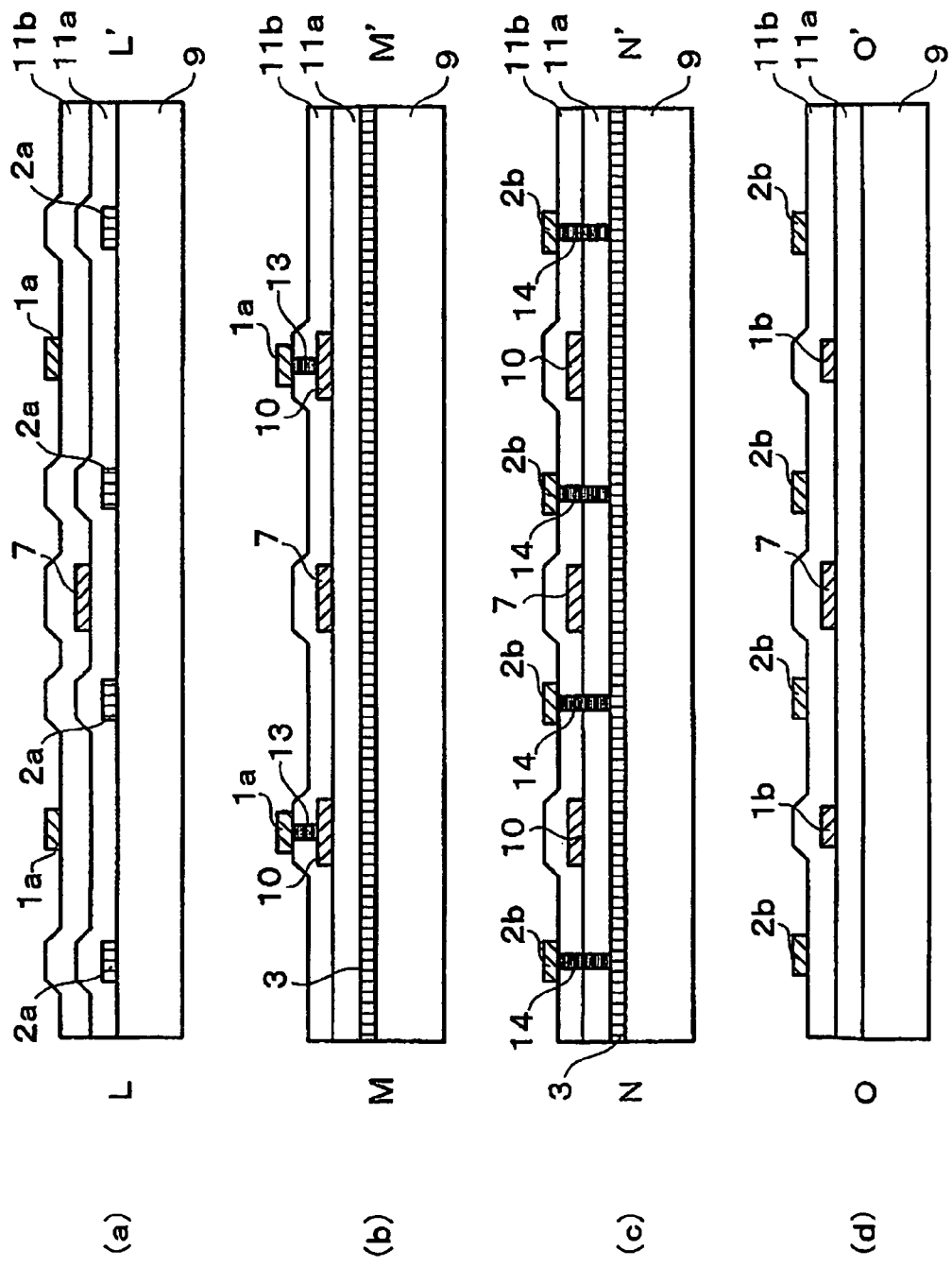
FIGS. 15(a), 15(b) and 15(c) are sectional views of FIG. 14.

FIG. 14 is a plan view showing the structure of one dot serving as a minimal display unit of an array substrate in a display device according to Embodiment 6 of the invention and FIGS. 15(a), 15(b), 15(c) and 15(d) are sectional views of FIG. 14 taken along the lines L-L', M-M', N-N' and O-O'. The present embodiment is a combination of Embodiments 2 and 5, and therefore those elements which are identical to the elements of Embodiments 2 and 5 are identified with the same numerical symbols, and repetitious explanation will be omitted.

In a display device of the present embodiment, the dot 51, whose outline is shown by the broken line in FIG. 14, is divided into two subdots SD3 and SD4. The flicker polarities are canceled between the upper and lower halves of the subdots SD3 and SD4.

The two subdots SD3 and SD4 are formed by dividing the dot into left and right portions with the center at a source wiring 7. The portions receive signals from the same gate wiring 4 and source wiring 7. The upper portions of the right subdot SD3 and the left subdot SD4 comprise a first pixel electrode 1a made of a transparent electric conductor and a first opposing electrode 2a made of a metal material. The lower portions of the right subdot SD3 and the left subdot SD4 subdot comprise a second pixel electrode 1b made of a metal material and a second opposing electrode 2b made of a transparent electric conductor. The second pixel electrodes 1b in the subdots SD3 and SD4 are connected to the same source wiring 7 through TFTs 42, 43, respectively. Storage capacitor electrodes 10 are formed on the common wiring 3 in the subdots SD3 and SD4 and connected to the first pixel electrode 1a and the second pixel electrode 1b, respectively.

As shown in FIGS. 14, 15(a), 15(b), 15(c) and 15(d) on an array substrate 9, the gate wiring 4, the first opposing electrode 2a and the common wiring 3 are formed out of a first metal layer. There upon, with an insulating layer 11a in between, the source wiring 7, drain electrodes 6a, 6b, the second pixel electrode 1b and the storage capacitor electrode 10 are formed out of a second metal layer. There upon, with an insulating layer 11b in between, the first pixel electrode 1a and the second opposing electrode 2b are formed out of a transparent electric conductor layer. The first pixel electrode 1a is connected to the storage capacitor electrode 10 through the contact hole 13, and the second opposing electrode 2b is connected to the common wiring 3 through the contact hole 14.

In the display device of the present embodiment, as in Embodiment 5, each dot is divided into two subdots SD3 and SD4, and the TFTs 42, 43 are provided in the subdots SD3 and SD4, respectively. Therefore, even when a defect arises in one of the TFTs 42, 43, the subdot having the other TFT operates normally. Therefore, the display device has the advantage that there is a low possibility of having a non-lighting dot caused by an entire dot being defective.

Furthermore, as in Embodiment 5, the two subdots SD3 and SD4 are arranged so as to hold the source wiring 7 in between. Since both subdots SD3 and SD4 use the same source wiring 7, there is no need to increase the number of source wirings 7.

A distinctive advantage of the present embodiment is that it can obtain excellent flicker polarities despite its driving method, since the two subdots SD3 and SD4 are symmetrically shaped.

Embodiment 7

Figure 16:
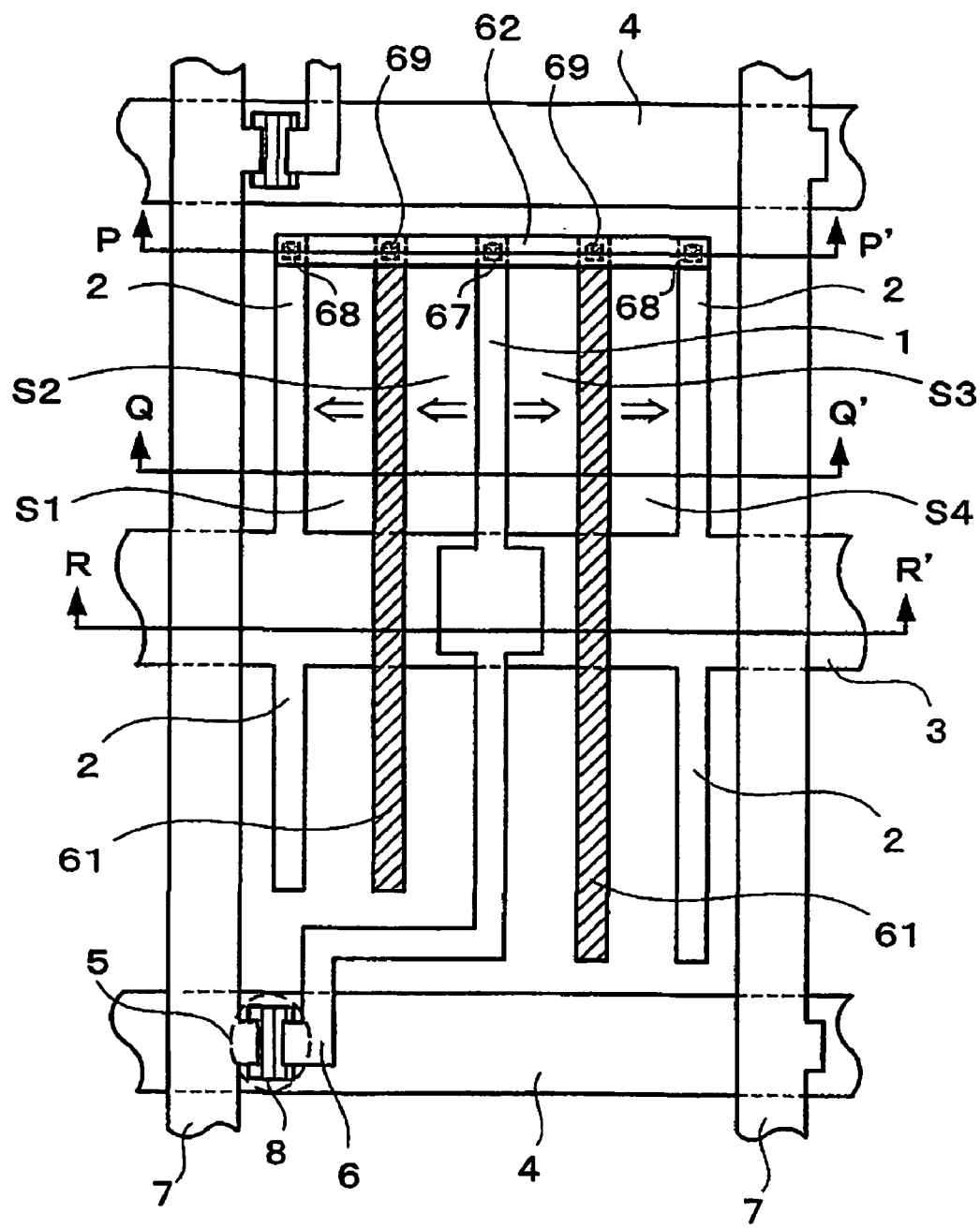
FIG. 16 is a plan view showing a structure of one dot serving as a minimal display unit of an array substrate in a display device according to Embodiment 7 of the invention.
Figure 17:
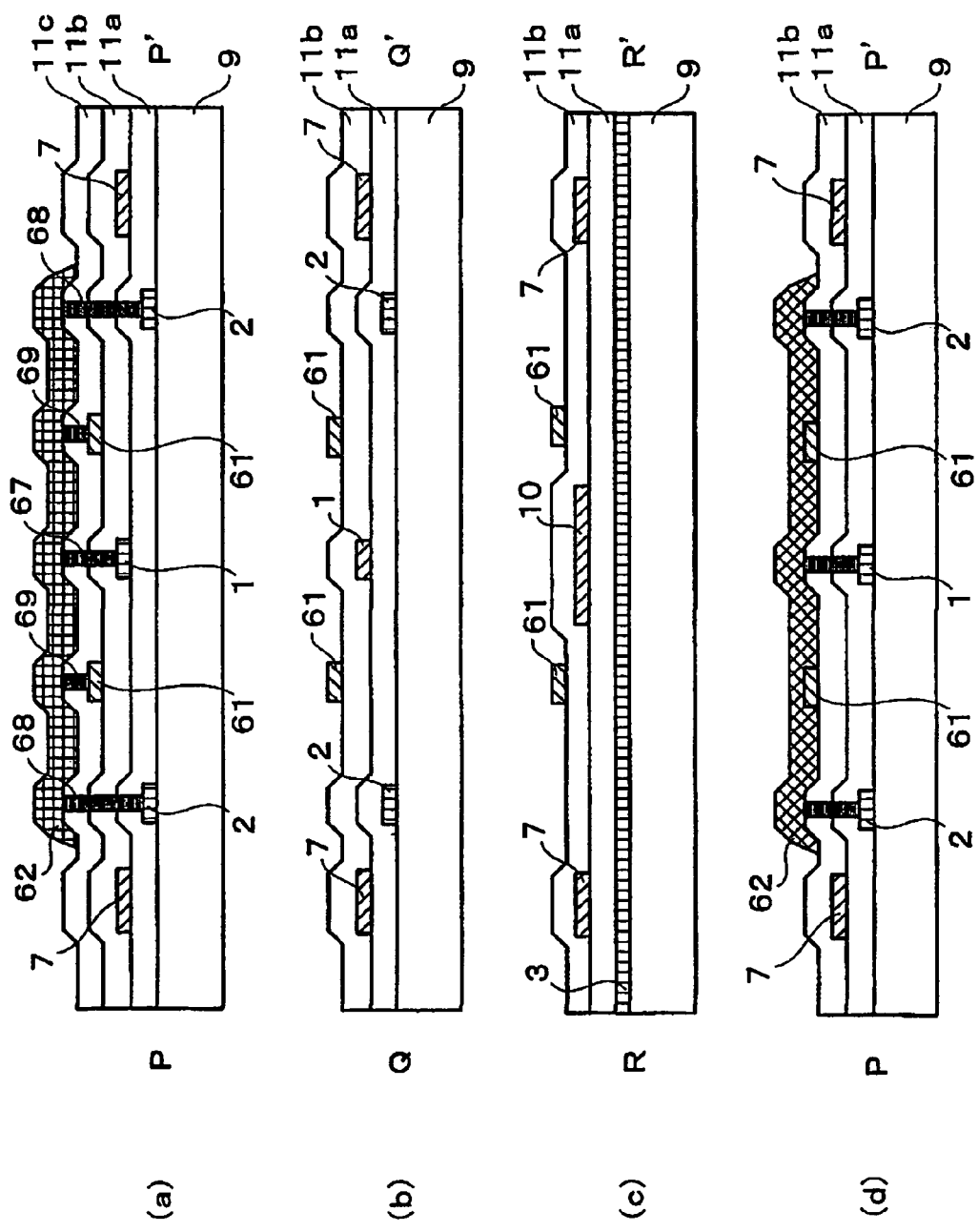
FIGS. 17(a), 17(b), 17(c) and 17(d) are sectional views of FIG. 16.

FIG. 16 is a plan view showing the structure of one dot serving as a minimal display unit of an array substrate in a display device according to Embodiment 7 of the invention and FIGS. 17(a), 17(b) and 17(c) are sectional views of FIG. 14 taken along the lines P-P', Q-Q' and R-R'. In FIGS. 16, 17(a), 17(b), 17(c) and 17(d), those elements which are identical to the elements of Embodiment 1 shown in FIGS. 1, 2(a), 2(b), and 2(c) are identified with the same numerical symbols, and repetitious explanation will be omitted.

According to a display device of the present embodiment, a pixel electrode 1 and an opposing electrode 2 are formed out of a metal layer and an intermediate electrode 61 made of a transparent conductive layer is formed between the two electrodes. The widths of the spaces between the opposing electrode 2 and the intermediate electrode 61 and between the intermediate electrode 61 and the pixel electrode 1 are made approximately equal. The pixel electrode 1, the intermediate electrode 61 and the opposing electrode 2 are electrically connected to each other by a resistor 62 having belt-shaped ends.

As shown in FIGS. 16, 17(a), 17(b) and 17(c), on an array substrate 9, a gate wiring 4, the opposing electrode 2 and a common wiring 3 are formed out of a first metal layer. There upon, with an insulating layer 11a in between, a source wiring 7, a drain electrode 6, the pixel electrode 1 and a storage capacitor electrode 10 are formed out of a second metal layer. There upon, with an insulating layer 11b in between, the intermediate electrode 61 is formed out of a transparent electric conductor layer. On the intermediate electrode 61, with an insulating layer 11c in between, a resistor 62 is formed out of a metal-oxide layer or a semiconductor layer. High-resistance ITO, tin oxide or the like can be used to obtain a metal-oxide layer. An example of a semiconductor layer include an amorphous silicon layer.

The pixel electrode 1 is connected to the resistor 62 through a contact hole 67 formed in the insulating layers 11b, 11c. The opposing electrode 2 is connected to the resistor 62 through a contact hole 68 formed in the insulating layers 11a, 11b, 11c. The intermediate electrode 61 is connected to the resistor 62 through a contact hole 69 formed in the insulating layer 11c.

Figure 18:
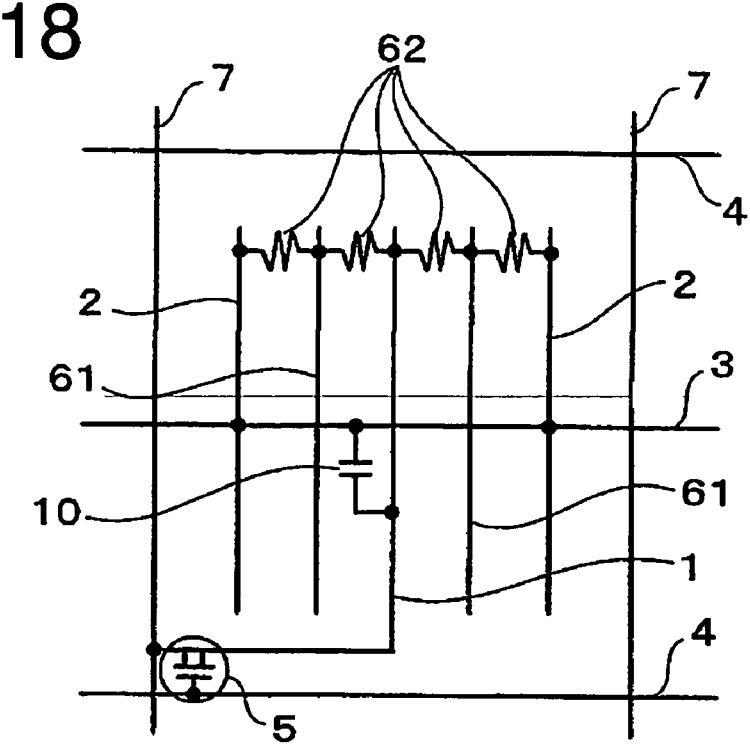
FIG. 18 shows the equivalent circuit of the structure shown in FIG. 16.

FIG. 18 is an equivalent circuit diagram of the array substrate described above. In this figure, the opposing electrode 2 is assumed to have a ground potential through the common wiring 3 and a signal electric potential (Va) applied to the pixel electrode 1 is assumed to be positive. In this case, by making the resistances of each resistor 62 approximately the same, the electric potential of the intermediate electrode 61 becomes the average value (Va/2) of the electric potentials of the pixel electrode 1 and the opposing electrode 2.

In FIG. 16, the distances between the opposing electrode 2 and the intermediate electrode 61 and between the intermediate electrode 61 and the pixel electrode 1 are assumed to be substantially the same, and therefore the strengths of the electric fields generated in spaces S1, S2, S3 and S4 which are formed between the electrodes become the same and their directions are as shown by the arrows in the figure. In this case, in the left intermediate electrode 61, the left half serves as a positive electrode relative to space S1 and the right half serves as a negative electrode relative to space S2. On the other hand, in the right intermediate electrode 61, the left half serves as a negative electrode relative to space S3 and the right half serves as a positive electrode relative to space S4. Therefore, between the left side and the right side of the intermediate electrode 61 made of a transparent electric conductor, differences in brightness caused by the flexoelectric effect or a peripheral electric potential can be cancelled.

When a negative signal voltage is applied to the next frame, the directions of the electric fields and operations of each space serving as a positive or a negative electrode are reversed; however, as explained above, differences in brightness can be cancelled between the right and the left sides of the intermediate electrode 61. Therefore, the brightness of the positive and the negative frames becomes the same in the dot as a whole, eliminating flicker.

The intermediate electrode 61 is resistively connected to the electrodes to which an electric potential is applied (the pixel electrode 1 and the opposing electrode 2), and therefore its electric potential is stable without floating. This makes it possible to display stable images.

In the present embodiment, the intermediate electrode 61 is resistively connected to the pixel electrode 1 and the opposing electrode 2; however, it can also be arranged so that an external electric potential is applied to the intermediate electrode 61 to stabilize the electric potential of the intermediate electrode 61.

In the present embodiment, the intermediate electrode 61 is made of a transparent electric conductor and the pixel electrode 1 and the opposing electrode 2 are formed out of a metal layer; however, by making a connection between layers by forming a contact hole, etc., it is also possible to form the pixel electrode 1 and the opposing electrode 2 of a transparent electric conductor and the intermediate electrode 61 out of a metal layer. This arrangement increases the number of electrodes made of a transparent electric conductor, obtaining brighter images.

It is preferable that the electric potential of the intermediate electrode 61 be the average of the electric potentials of the pixel electrode 1 and the opposing electrode 2 as in the present embodiment; however, setting the electric potential of the intermediate electrode 61 anywhere between those of the pixel electrode 1 and the electric potential also achieves a flicker reduction.

According to the present embodiment, the resistor 62 is formed on the intermediate electrode 61 with the insulating layer 11c in between; however, it is not necessary to protect the intermediate electrode 61 by the insulating layer 11c, if it is free from damage while the resistor 62 is being subjected to patterning. Therefore, as shown in FIG. 17(d), it is also possible to form the portion taken along the line P-P' in FIG. 16 without having the insulating layer 11c. This allows a reduction of the manufacturing processes and production costs.

In this case, a concrete example of a way to obtain the resistor 62 is as follows. A resin-based resistance-material layer is formed on the intermediate electrode 61 made of ITO and etched using a photoresist having a predetermined pattern. It is also possible to use a photosensitive material as a resin material and directly conduct patterning by exposure to light. As another example, it is also possible to apply a resistor to only a prescribed area by mask deposition.

Embodiment 8

Figure 19:
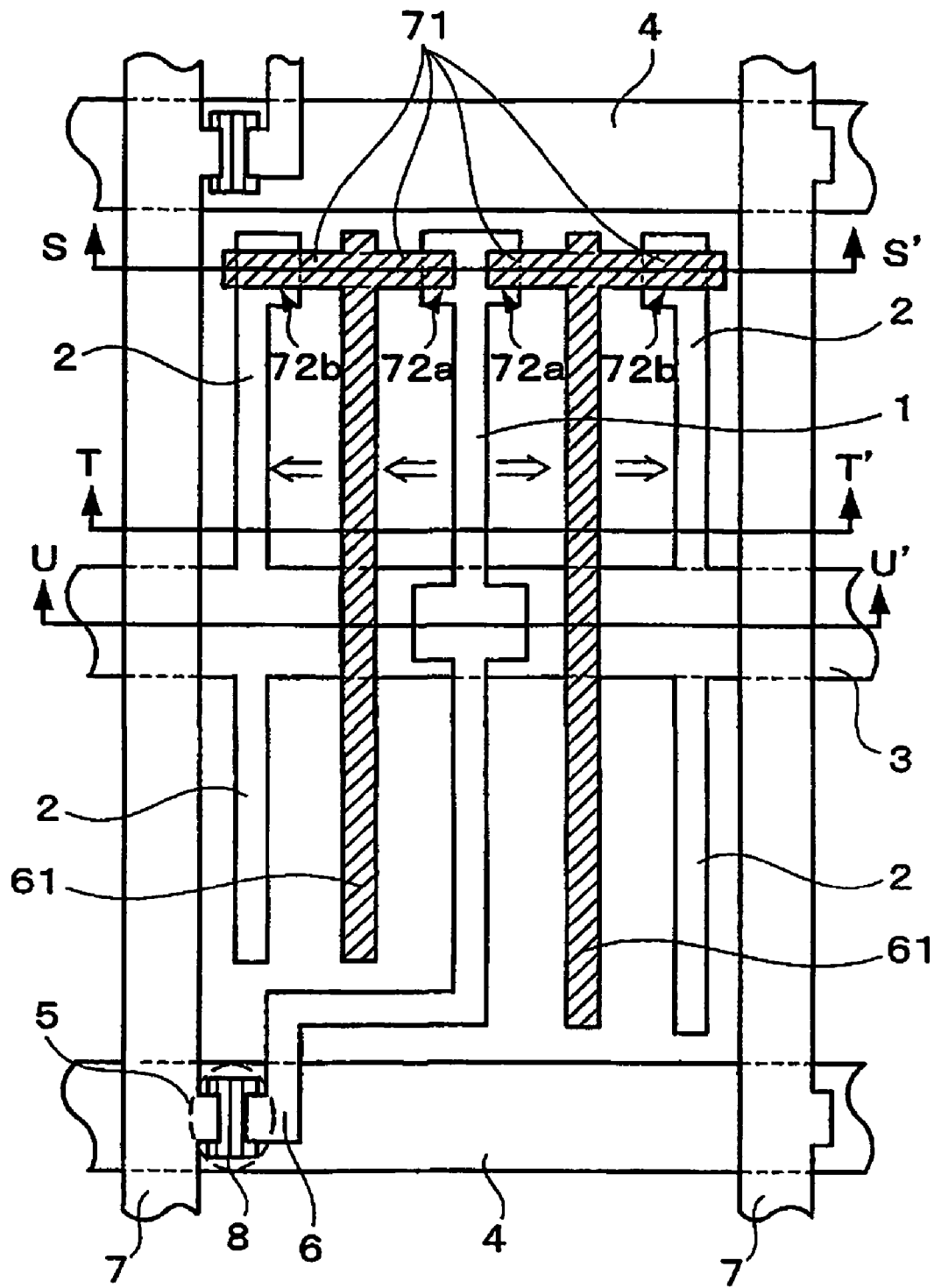
FIG. 19 is a plan view showing a structure of one dot serving as a minimal display unit of an array substrate in a display device according to Embodiment 8 of the invention.

FIG. 19 is a plan view showing the structure of one dot serving as a minimal display unit of an array substrate in a display device according to Embodiment 8 of the invention and FIGS. 20(a), 20(b) and 20(c) are sectional views of FIG. 19 taken along the lines S-S', T-T' and U-U'. In the present embodiment, instead of connecting the pixel electrode 1, the intermediate electrode 61 and the opposing electrode 2 by a resistive element, capacitive coupling is used. In other respects, the construction thereof is the same as that of Embodiment 5. Therefore, in the present embodiment, those elements which are identical to the elements of Embodiment 5 are identified with the same numerical symbols, and repetitious explanation will be omitted.

As shown in FIG. 19, according to the present embodiment, extensions 71 projecting into the left and the right sides from the top end of the intermediate electrode 61 are formed instead of forming the resistor 62 shown in FIG. 16. By placing the extension 71 on top of the pixel electrode 1 and the opposing electrode 2, coupling capacity regions 72a, 72b are formed.

As shown in FIGS. 19 and 20(a), the extension 71 extending from the intermediate electrode 61 is formed on the insulating layer 11b. A coupling capacity region 72a is formed between the extension 71 and the pixel electrode 1 with an insulating layer 11a in between. A coupling capacity region 72b is formed between the extension 71 and the opposing electrode 2 with the insulating layers 11a, 11b in between.

Figure 21:
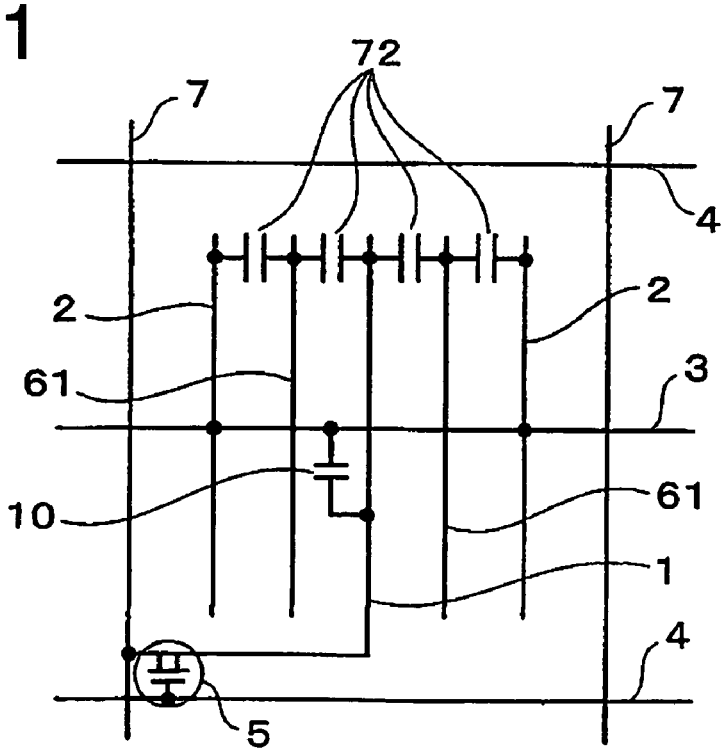
FIG. 21 shows the equivalent circuit of the structure shown in FIG. 19.

FIG. 21 shows an equivalent circuit of the array substrate described above. Like in Embodiment 7, it is assumed that the opposing electrode 2 has a ground potential through the common wiring 3 and that a positive signal electric potential (Va) is applied to the pixel electrode 1. In this case, by making the capacitances of the coupling capacity regions 72a, 72b approximately equal, the electric potential of the intermediate electrode 61 becomes the average value (Va/2) of the electric potentials of the pixel electrode 1 and the opposing electrode 2.

Like in Embodiment 7, In FIG. 19, the distances between the opposing electrode 2 and the intermediate electrode 61 and between the intermediate electrode 61 and the pixel electrode 1 are assumed to be substantially the same, and therefore the strengths of the electric fields generated in spaces S1, S2, S3 and S4 formed between the electrodes become the same and their directions are as shown by the arrows in the figure. Therefore, as in Embodiment 7, between the left side and the right side of the intermediate electrode 61 made of a transparent electric conductor, differences in brightness caused by the flexoelectric effect or a peripheral electric potential can be cancelled.

When a negative signal voltage is applied to the next frame, the directions of the electric fields and the operation of each space serving as a positive or a negative electrode are reversed; however, as explained above, differences in brightness can be cancelled between the right and the left sides of the intermediate electrode 61. Therefore, the brightness of the positive and the negative frames become the same in the dot as a whole, eliminating flicker.

A display device according to the present embodiment can reduce fraction defectives and production costs compared to that of Embodiment 7, since formation of a resistor and a coupling part (contact hole) connecting the resistor to each electrode becomes unnecessary.

In the present embodiment, as in Embodiment 7, by making connections with different layers by forming a contact hole, etc., it is also possible to form the pixel electrode 1 and the opposing electrode 2 of a transparent electric conductor and the intermediate electrode 61 out of a metal layer. This arrangement increases the number of electrodes made of a transparent electric conductor, obtaining brighter images.

It is preferable that the electric potential of the intermediate electrode 61 be the average of the electric potentials of the pixel electrode 1 and the opposing electrode 2; however, setting the electric potential of the intermediate electrode 61 anywhere between those of the pixel electrode 1 and the electric potential also achieves a flicker reduction.

Taking the difference in the thickness of the insulating layers in the coupling capacity regions 72a, 72b into consideration, in order to make the capacities of the coupling capacity regions 72a, 72b equal, it is preferable to adjust the opposing area of the electrodes in the coupling capacity regions 72a, 72b. For example, this can be done by varying the widths of the pixel electrode 1 and the opposing electrode 2 in the portions where the coupling capacity regions 72a, 72b are formed.

Figure 22:
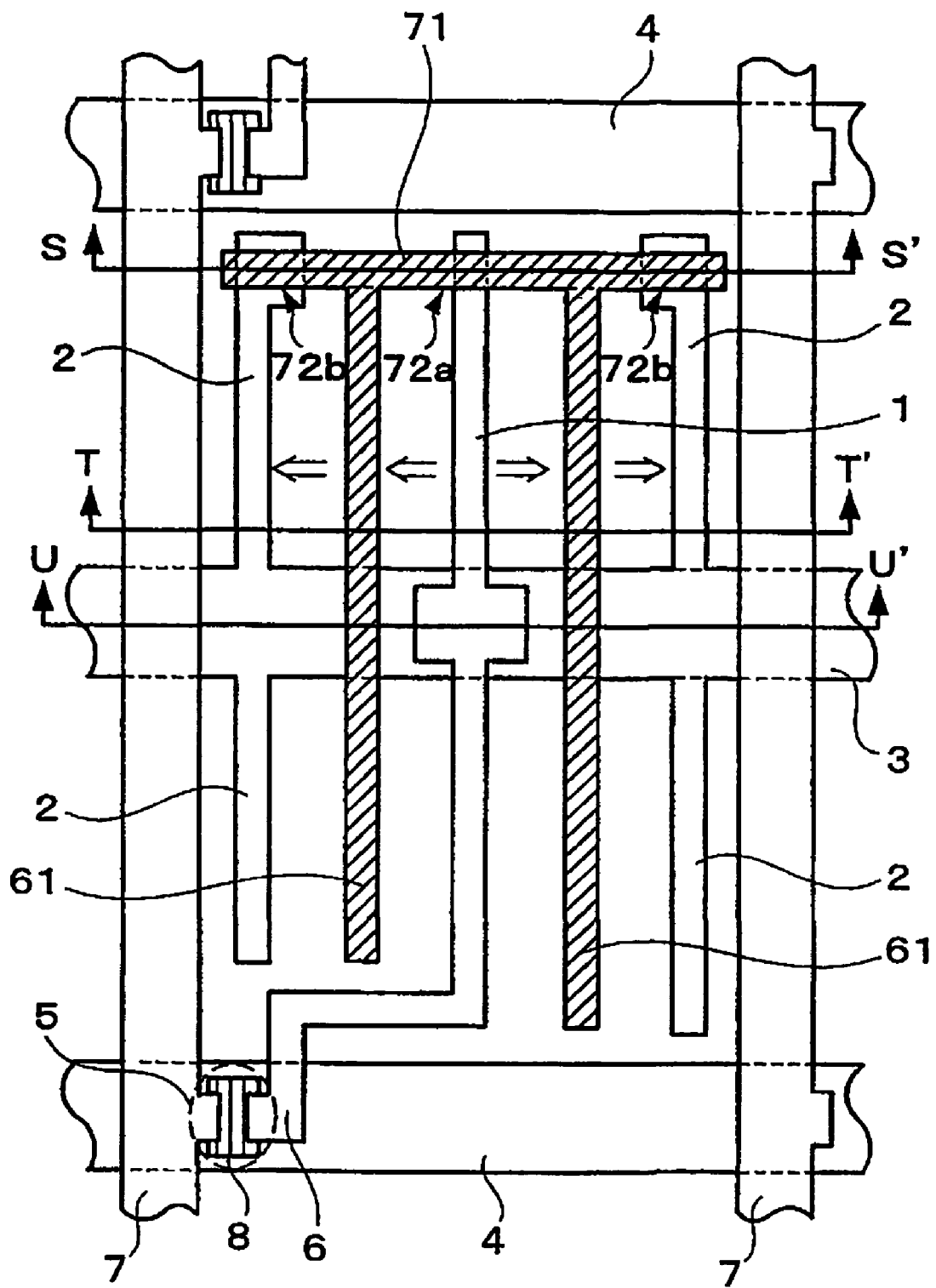
FIG. 22 is a plan view showing a modification of the structure shown in FIG. 19.

In the present embodiment, two intermediate electrodes 61 are separately arranged; however, as shown in FIG. 22, it is also possible to connect the two intermediate electrodes 61 by the extension 71. This arrangement reliably makes the electric potentials of the two intermediate electrodes 61 equal. FIG. 20(d) shows the sectional view taken along the line S-S' in FIG. 22. In this figure, the left and right coupling capacity regions 72b, 72b are in parallel, and therefore it is desirable that the total capacity of the two regions 72b, 72b be equal to that of the coupling capacity region 72a. Specifically, this is achieved by varying the widths of the pixel electrode 1 and the opposing electrode 2 as described above.

Embodiment 9

Figure 23:
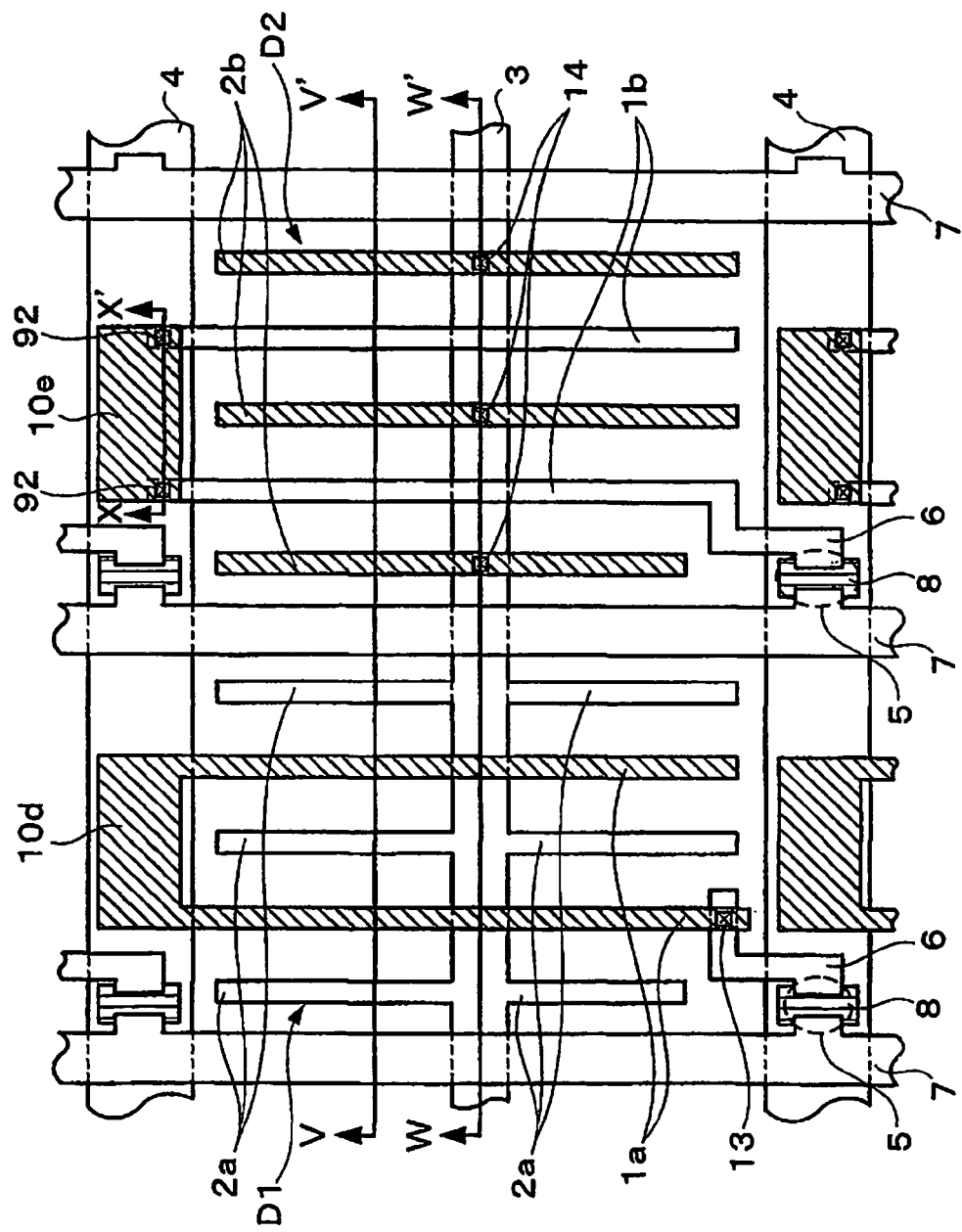
FIG. 23 is a plan view showing the structures of two adjacent dots on an array substrate in a display device according to Embodiment 9 of the invention.
Figure 24:
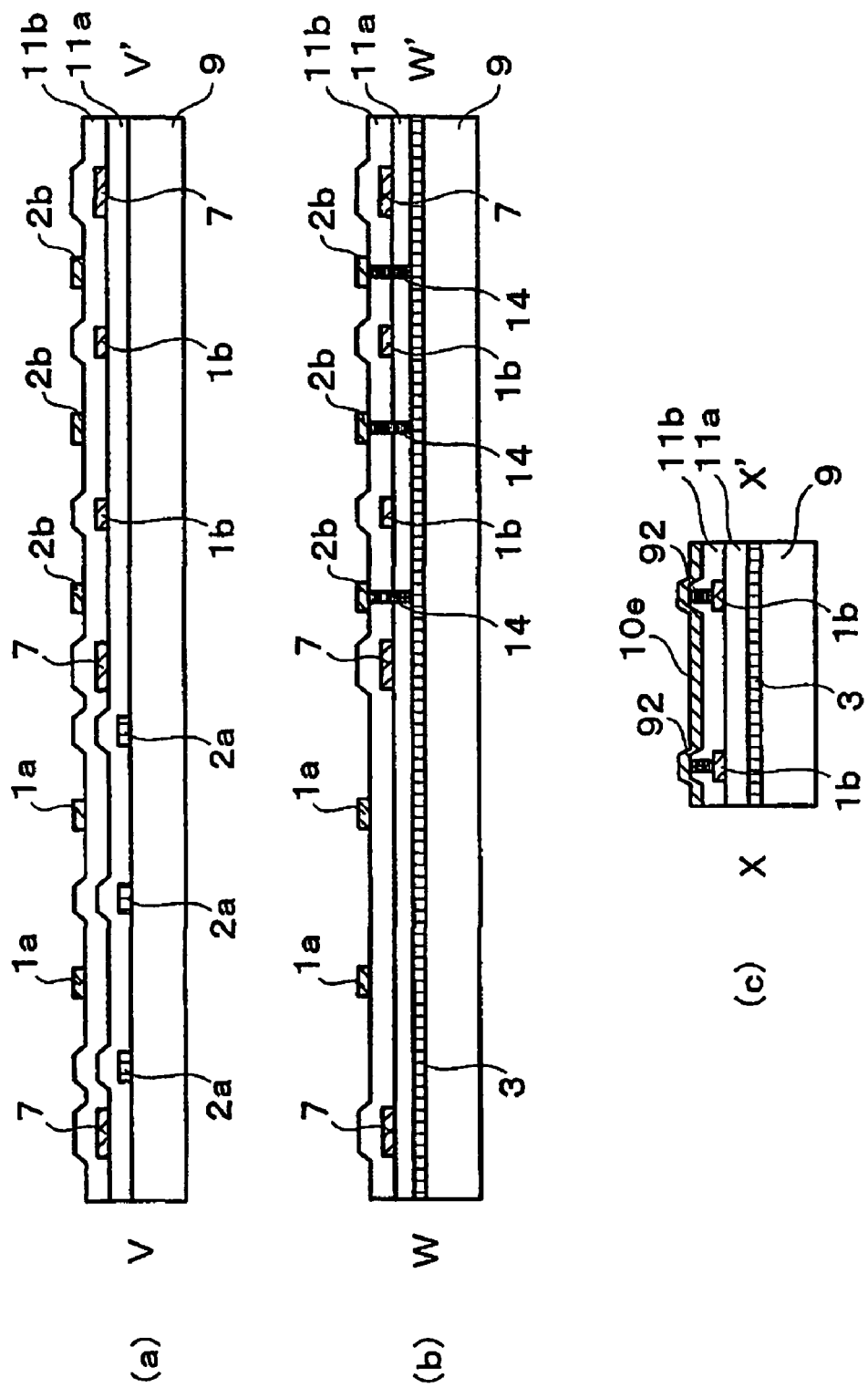
FIGS. 24(a), 24(b) and 24(c) are sectional views of FIG. 23.

FIG. 23 is a plan view showing the structures of two adjacent dots on an array substrate in a display device according to Embodiment 9 of the invention. FIGS. 24(a), 24(b) and 24(c) are sectional views taken along the lines V-V', W-W' and X-X' of FIG. 23.

In the display device according to Embodiment 5 shown in FIGS. 10, 11(a) and 11(b), flicker polarities are cancelled in a dot by dividing the dot into two subdots and making the flicker polarities different in each subdot. On the other hand, in the display device according to the present embodiment, two adjacent dots D1 and D2 are structured so that the flicker polarities are cancelled between the dots when a signal voltage having the same polarity is applied to the two dots D1 and D2. In FIGS. 23, 24(a), 24(b) and 24(c), those elements which are identical to the elements of Embodiment 5 are identified with the same numerical symbols, and repetitious explanation will be omitted.

As shown in FIG. 23, the left dot D1 comprises a first pixel electrode 1a and a first opposing electrode 2a. The first pixel electrode 1a is made of a transparent electric conductor and the first opposing electrode 2a is formed out of a metal layer. The right dot D2 comprises a second pixel electrode 1b and a second opposing electrode 2b. The second pixel electrode 1b is formed out of a metal layer and the second opposing electrode 2b is made of a transparent electric conductor. The first pixel electrode 1a and the second pixel electrode 1b are connected to separate source wirings 7 via separate TFTs 5. The structure of the TFT 5 of the present embodiment is the same as that of Embodiment 1. On a gate wiring 4, storage capacitor electrodes 10d, 10e are formed and connected to the first pixel electrode 1a and the second pixel electrode 1b, respectively.

As shown in FIGS. 23, 24(a), 24(b) and 24(c), on an array substrate 9, the gate wiring 4, the first opposing electrode 2a and a common wiring 3 are formed out of a first metal layer. There upon, with an insulating layer 11a in between, the source wiring 7, a drain electrode 6 and the second pixel electrode 1b are formed out of a second metal layer. There upon, with an insulating layer 11b in between, the first pixel electrode 1a, the second opposing electrode 2b and the storage capacitor electrodes 10d, 10e are formed of a transparent electric conductor layer. The first pixel electrode 1a is connected to the drain electrode 6 through a contact hole 13. The second opposing electrode 2b is connected to the common wiring 3 through a contact hole 14.

In this structure, when a positive voltage is applied to dots D1 and D2, in the left dot D1, the transparent first pixel electrode 1a has a relatively positive electric potential, and, in the right dot D2, the transparent second opposing electrode 2b has a relatively negative electric potential. When a negative voltage is applied to dots D1 and D2, in the left dot D1, the transparent first pixel electrode 1a has a relatively negative electric potential, and, in the right dot D2, the transparent second opposing electrode 2b has a relatively positive electric potential. Thereby, the flicker polarities are cancelled between the two dots D1 and D2.

In the display device of the present embodiment, in order to further enhance the flicker reduction effect, bringing the flicker polarities of the two dots D1 and D2 into balance is desirable. For that purpose, it is desirable that the capacities of the two storage capacitor electrodes 10d, 10e be made equal and it is advantageous that the two storage capacitor electrodes 10d, 10e be designed to be formed out of the same material, thereby making the areas of the two storage capacitor electrodes equal. In the right subdot SD2 of the present embodiment, as shown in FIG. 24(c), the transparent second pixel electrode 1b makes a connection between layers and the storage capacitor electrode 10e is made of a transparent electric conductor. As a result, the design period of the TFT array is shortened without adversely affecting the design, enhancing the manufacturing yield by using a design having a high tolerance for the errors introduced by the manufacturing process. As in Embodiment 5, storage capacitor electrodes 10d, 10e can also be formed on the gate wiring 4 out of a metal layer.

Embodiment 10

Figure 25:
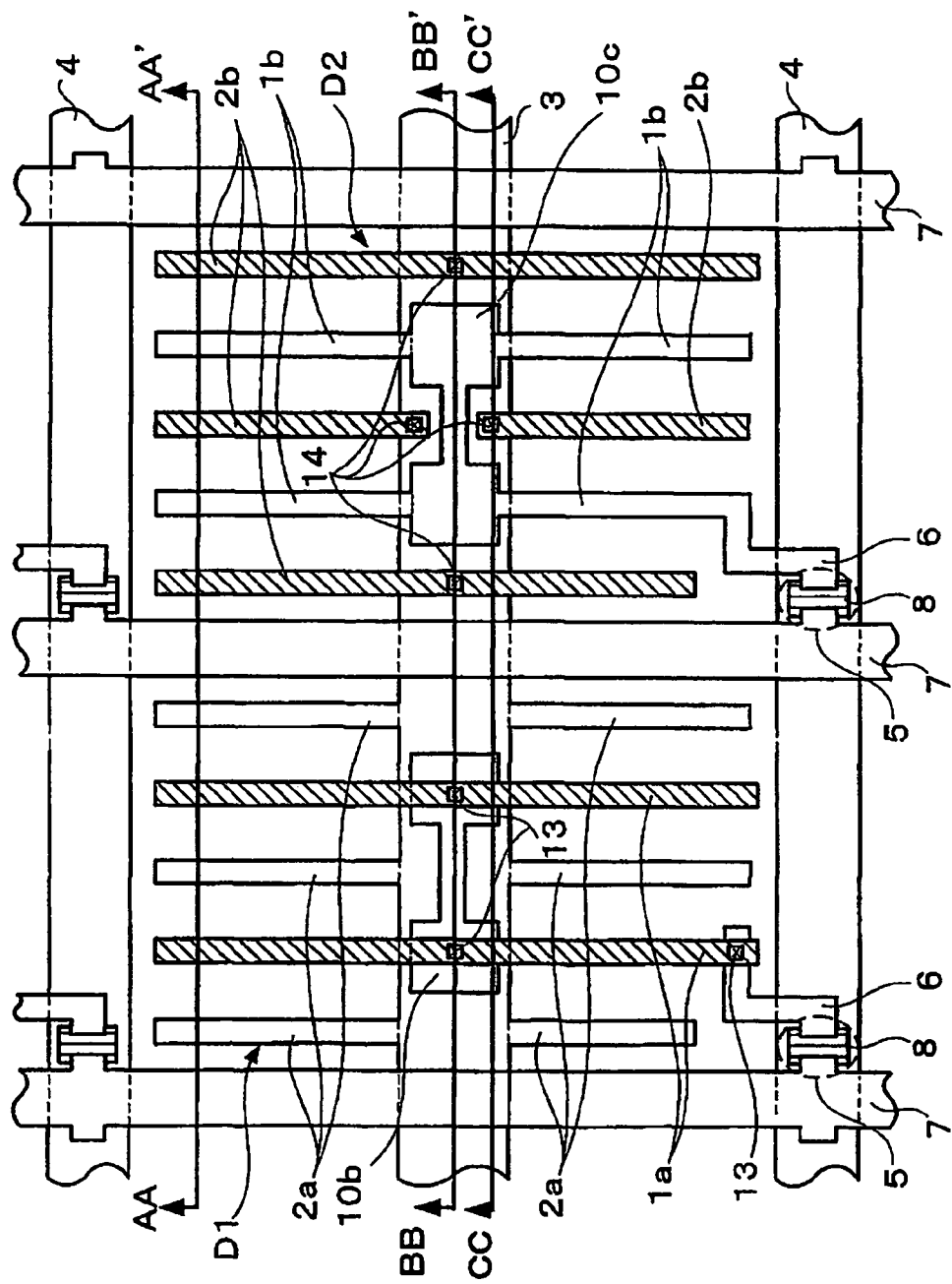
FIG. 25 is a plan view showing the structures of two adjacent dots on an array substrate in a display device according to Embodiment 10 of the invention.
Figure 26:
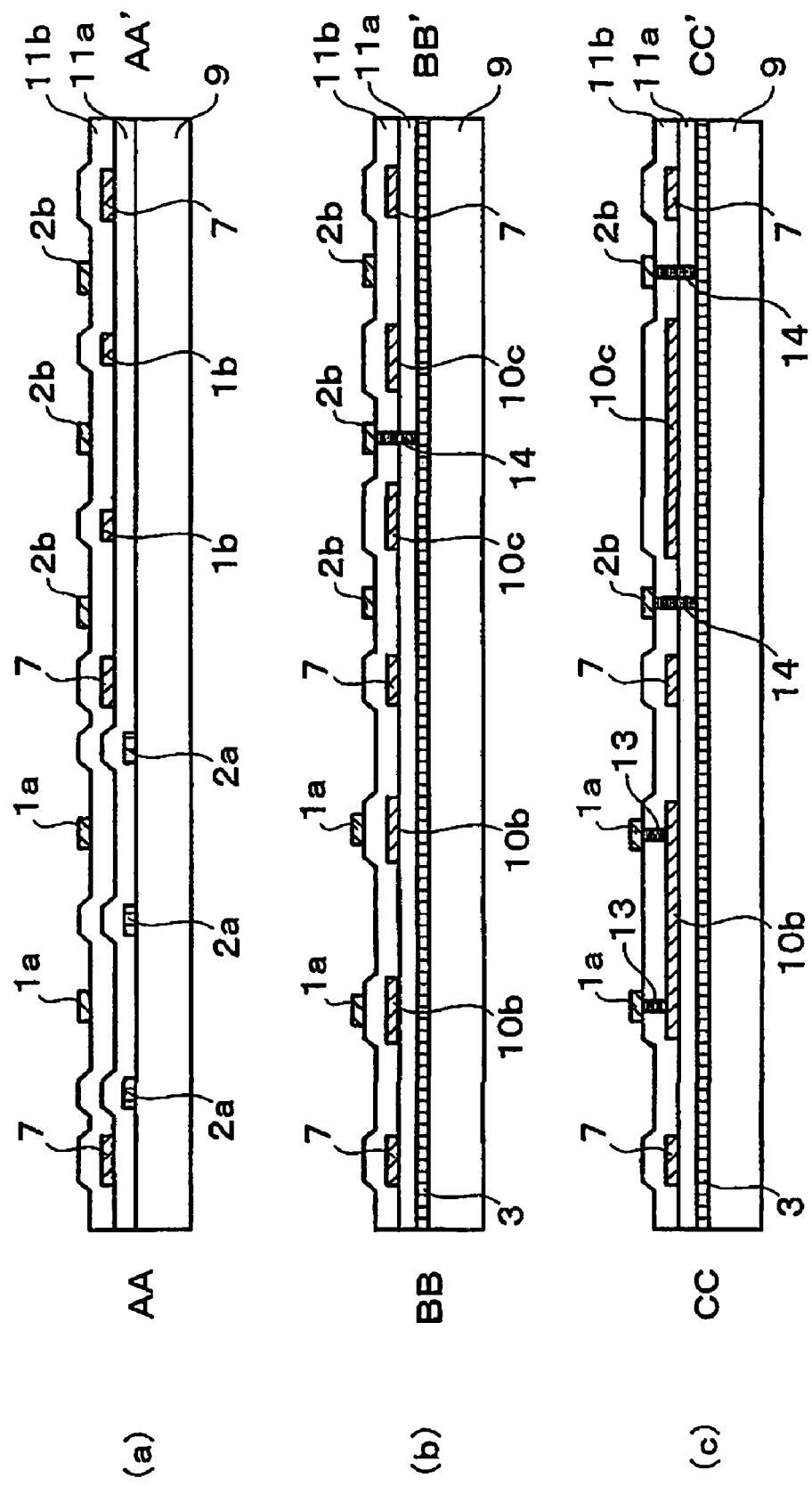
FIGS. 26(a), 26(b) and 26(c) are sectional views of FIG. 25.

FIG. 25 is a plan view showing the structures of two adjacent dots on an array substrate in a display device according to Embodiment 10 of the invention. FIGS. 26(a), 26(b) and 26(c) are sectional views of FIG. 25 taken along the lines AA-AA', BB-BB' and CC-CC'.

In the display device of Embodiment 9, the storage capacitor electrodes 10d, 10e are formed on the gate wiring 4. On the other hand, in the display device of the present embodiment, storage capacitor electrodes 10b, 10c are formed on a common wiring 3. In FIGS. 25, 26(a), 26(b) and 26(c), those elements which are identical to the elements of Embodiment 9 are identified with the same numerical symbols, and repetitious explanation will be omitted.

As shown in FIGS. 25, 26(a), 26(b) and 26(c), on an array substrate 9, a gate wiring 4, a first opposing electrode 2a and a common wiring 3 are formed out of a first metal layer. There upon, with an insulating layer 11a in between, a source wiring 7, a drain electrode 6, a second pixel electrode 1b and storage capacitor electrodes 10b, 10c are formed out of a second metal layer. There upon, with an insulating layer 11b. in between, a first pixel electrode 1a and a second opposing electrode 2b are formed of a transparent electric conductor layer. The first pixel electrode 1a is connected to the storage capacitor electrode 10b through a contact hole 13. The second opposing electrode 2b is connected to the common wiring 3 through a contact hole 14.

Like that in Embodiment 9, in the display device of the present embodiment, flicker polarities are cancelled between the two adjacent dots D1 and D2. The present embodiment has a distinctive feature in that an uniform display with a reduced distortion of scanning voltage can be obtained even on a wide screen because its additional capacitance of the gate wiring 4 is reduced.

Like in Embodiment 9, in the display device of the present embodiment, in order to further enhance the flicker reduction effect, bringing the flicker polarities of the two dots D1, D2 into balance is desirable. For that purpose, it is desirable that the capacities of the two storage capacitor electrodes 10b, 10c be made equal and it is advantageous that the two storage capacitor electrodes 10b, 10c be designed to be formed of the same material, thereby making the areas of the two storage capacitor electrodes equal. In the left D1 of the present embodiment, the transparent first pixel electrode 1a makes a connection between layers and the storage capacitor electrode 10b is formed out of a metal layer. As a result, the design period of the TFT array is shortened without adversely affecting the design, enhancing the manufacturing yield by using a design having a high tolerance for the errors introduced by the manufacturing process. Like in Embodiment 9, the storage capacitor electrodes 10b, 10c can also be formed on the common wiring 3 out of a transparent electric conductor layer.

Embodiment 11

The present embodiment relates to color display devices with structures as describe in the above embodiments of the present invention. In a color display device having dots arranged in a matrix, a black matrix and a color filter are generally formed in an opposing substrate facing an array substrate. The color filter is formed on an aperture of the black matrix, and each pixel thereof has a color layer of red, green or blue so that, in the display device as a whole, these three colors are repeated in an array. In other words, as shown in the area enclosed by the bold line in FIG. 27, it is common that one pixel 91 is formed out of three dots each having one of three primary colors, i.e, red (R), green (G) and blue (B).

Figure 27:
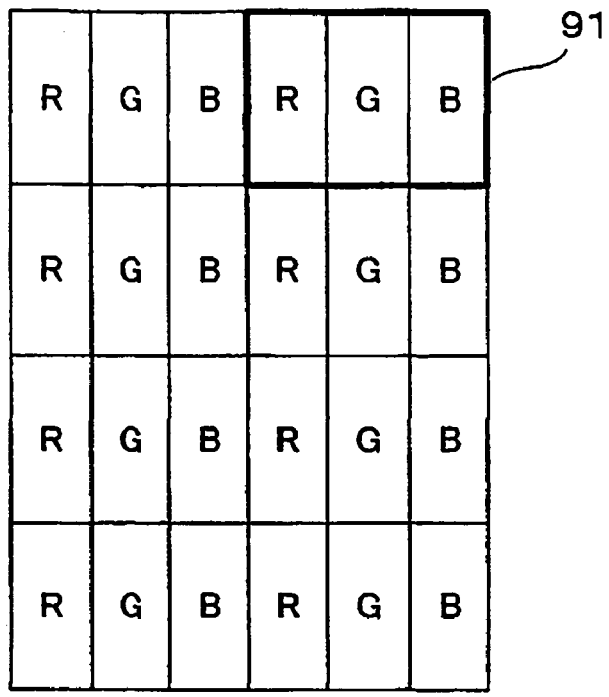
FIG. 27 schematically shows an array of dots in a pixel of a color display device.
Figure 28:
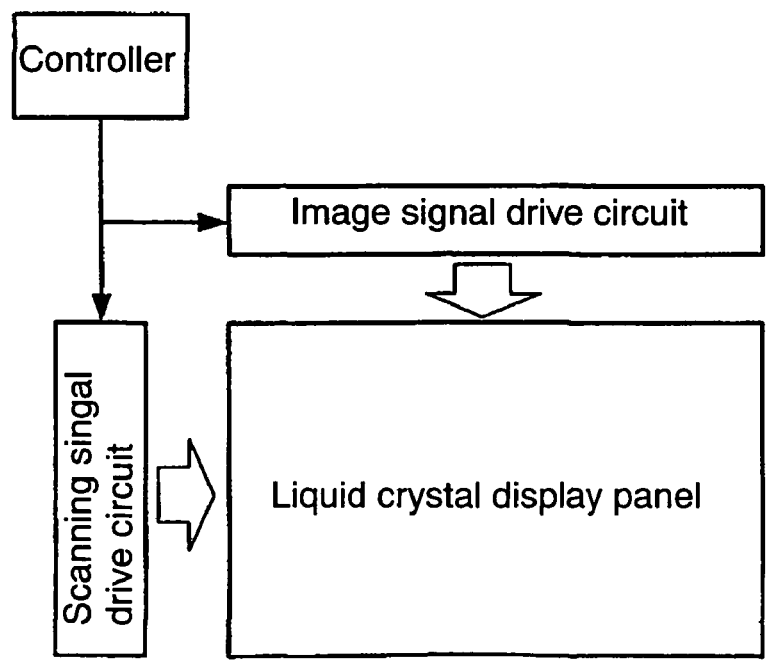
FIG. 28 shows schematic structure of a display device according to Embodiment 11 of the invention.

As shown in FIG. 28, this color display device comprises a scanning signal driver M1 supplying a scanning signal by applying a prescribed voltage to a gate wiring 4 and an image signal driver M2 supplying an image signal by applying a prescribed voltage to a source wiring 7. These drivers M1, M2 are controlled by a controller C. In the color display device having such structure, a bright image with a wide viewing angle and reduced flicker can be obtained by arranging each dot shown in FIG. 27 so as to have a structure as described in the above embodiments of the invention.

Embodiment 12

Figure 29:
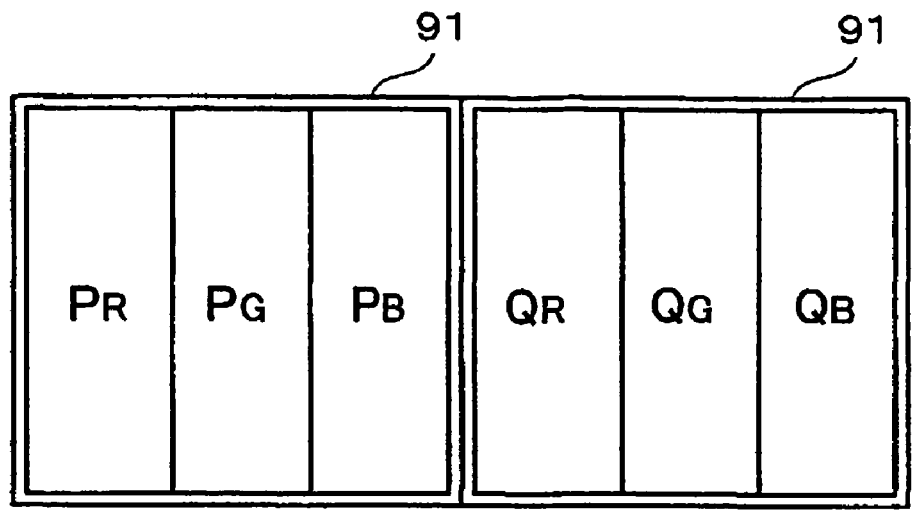
FIG. 29 schematically shows arrases of dots in two adjacent pixels of a display device according to Embodiment 12 of the invention.

The present embodiment relates to a color display device in which, in the dot array on an array substrate shown in FIG. 27, three dots (RGB) in one pixel are structured so as to have the same structure and flicker polarities are cancelled between any two adjacent pixels. FIG. 29 shows dot arrays in the two adjacent pixels.

In FIG. 29, dots P and Q are structured so that they have flicker polarities opposite of each other relative to the same drive voltage. For example, the structure of dot D1 in Embodiments 9 and 10 corresponds to that of P and the structure of dot D2 corresponds to that of Q. The subscripts R, G and B express the colors of each dot. According to the present embodiment, as shown in the figure, in the two adjacent pixels 91, 91, the structure of the dots is the same within a pixel and different from that of the dots in the adjacent pixel. This makes it possible to readily cancel flicker polarities between any two adjacent pixels. Furthermore, since the dots within a pixel have the same properties, this arrangement has an advantage that color distortion can be prevented even in halftone display which tends to be adversely affected by the difference between the brightness and voltage properties.

Embodiment 13

Figure 30:
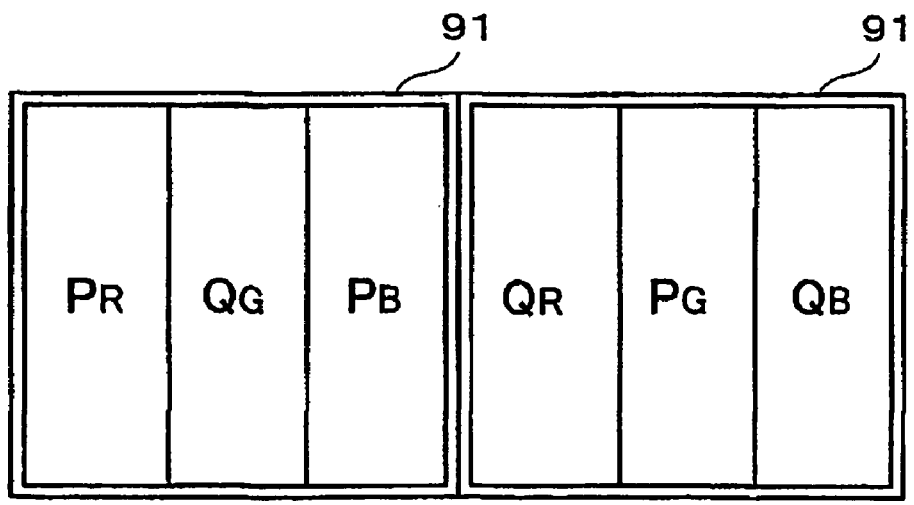
FIG. 30 schematically shows arrays of dots in two adjacent pixels of a display device according to Embodiment 13 of the invention.

In the color display device of Embodiment 12, the dots have the same structure within a pixel. On the other hand, as shown in FIG. 30, in a color display device according to the present embodiment, any two adjacent dots are arranged so as to have different structures. Thereby, flicker polarities can be cancelled between more subdivided regions.

Embodiment 14

The present embodiment relates to a color display device having the dot array as shown in FIG. 29 which employs a drive method further enhancing the flicker reduction effect.

In order to reduce flicker, it is preferable that the arrangement cycle of the regions showing the same flicker polarity relative to a same voltage differ from the inversion cycle of a driving voltage. If the two cycles are coincident with each other, the effect of inversion is offset, adversely affecting the flicker reduction effect.

Figure 31:
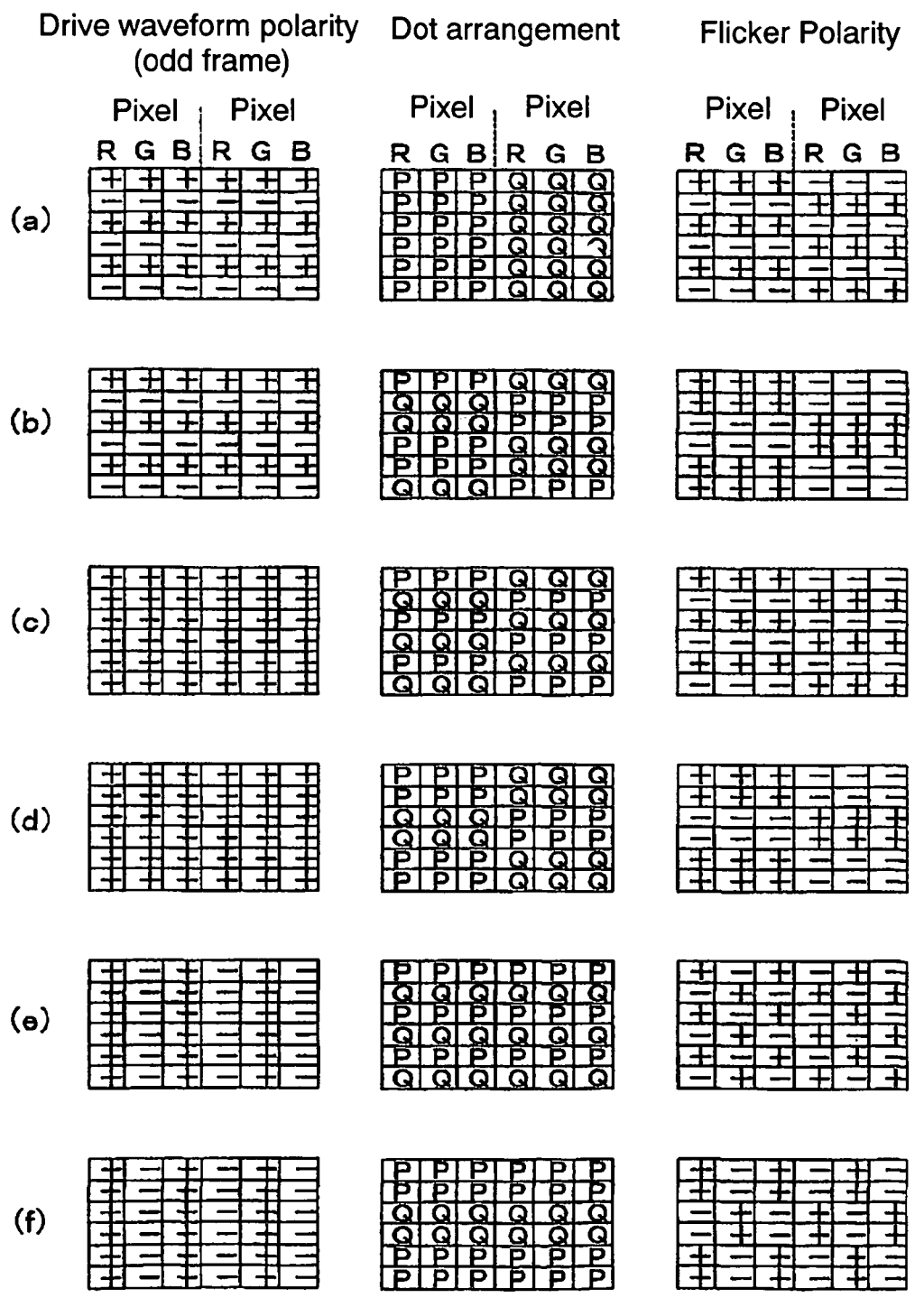

Next, examples of the repeated patterns of dots (array of P and Q in FIG. 29) and desirable combinations with the inversion methods of a drive voltage will be explained. FIGS. 31(*a*) to 31(*f*) show, when it is assumed, as shown in FIG. 29, that the dots within a pixel 91 have the same structure as in, the polarities of the drive wave in an odd frame, the dot structure and the patterns of flicker polarity (odd frame) defined by their combination. Although not shown in the figures, an even frame has a pattern of drive wave polarity inverted from that of an odd frame, resulting in a pattern of flicker polarity opposite to that of an odd frame.

An enhanced flicker reduction effect can be obtained in an arrangement in which the distribution of flicker polarity of pixels or dots is inverted every line.

Specific examples of such combinations are as follows:

FIG. 31(*a*): Combination of a line-inversion (row-inversion) drive and a line-non-inversion (row-non-inversion) dot array;

FIG. 31(*c*): Combination of a frame-inversion drive and a line-inversion (row-inversion) dot array; and FIG. 31(*e*): Combination of a column-inversion drive and a line-inversion (row-inversion) dot array.

On the other hand, for example, when a checkerboard pattern appears on a computer screen as wallpaper, etc., it is preferable that, between the pixels or dots, flicker polarity be inverted every two lines to prevent interference between the checkerboard pattern and the flicker pattern. Specific examples of such combinations are as follows:

FIG. 31(*b*): Combination of a line-inversion (row-inversion) drive and a two-line-inversion (two-row-inversion) dot array;

FIG. 31(*d*): Combination of a frame-inversion drive and a two-line-inversion (two-row-inversion) dot array; and FIG. 31(*f*): Combination of a column-inversion drive and a two-line-inversion (two-row-inversion) dot array.

Although not shown, as a pattern in which flicker polarity inversion between the pixels or dots is performed every two lines, regarding drive wave polarity and dot structure, it is also possible to switch the pattern of the drive inversion cycle and the dot arrangement cycle shown in FIGS. 31(*b*) and 31(*f*). Specific examples are as follows:

(b'): Combination of a two-line-inversion (two-row-inversion) drive and a line-inversion (row-inversion) dot array; and (f'): Combination of a two-line-inversion (two-row-inversion) drive and a column-inversion dot array.

Likewise, when n is 3 or greater, it is possible to invert flicker polarities between pixels and dots every n lines. When n is 10 or smaller (preferably 5 or smaller), interference with checkerboard patterns can be prevented while reducing flicker, obtaining the same effect achieved by inverting flicker polarity distribution every two lines

Embodiment 15

The present embodiment relates to a color display device having the dot array shown in FIG. 30 in which employs a drive method further enhancing the flicker reduction effect.

In order to reduce flicker, like in Embodiment 14, it is preferable that the arrangement cycle of the regions showing the same flicker polarity relative to a same voltage differ from the inversion cycle of a driving voltage.

Figure 32:
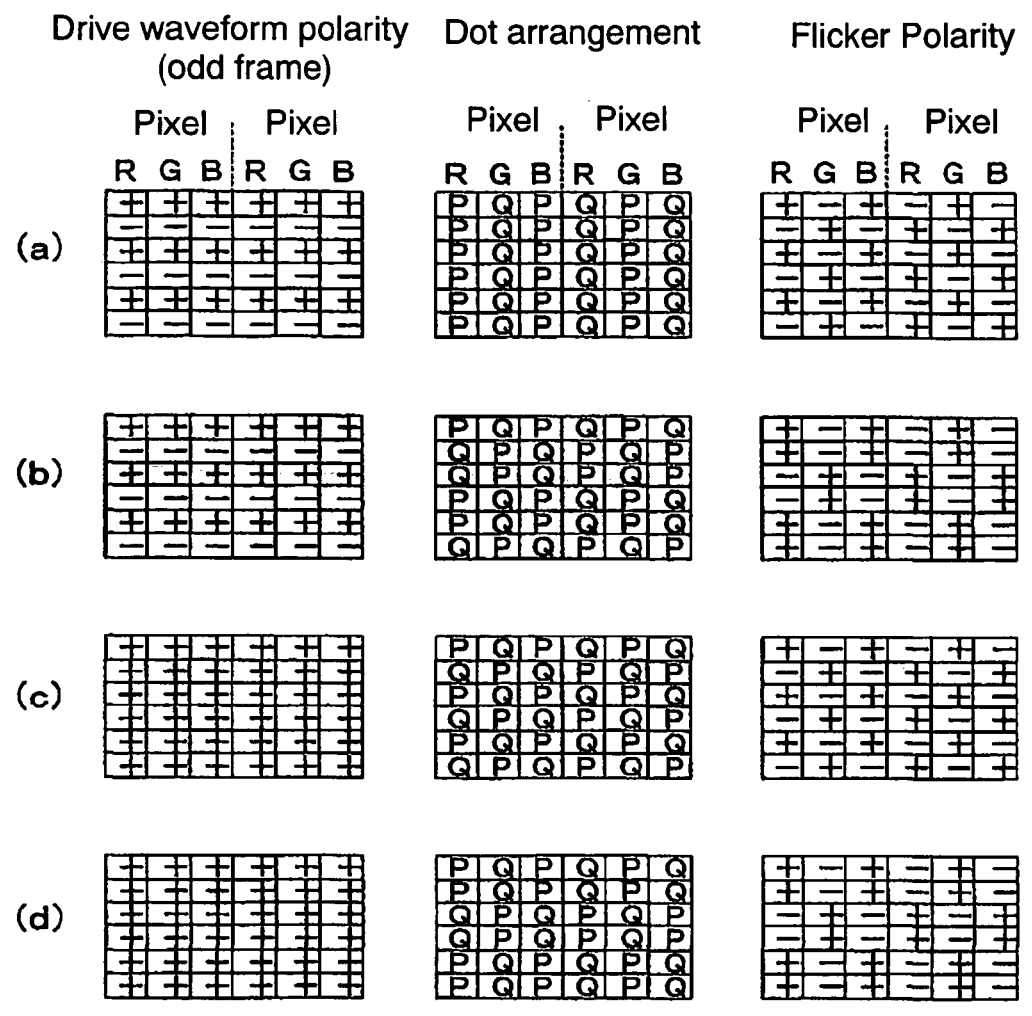

Next, examples of the repeated patterns of dots (array of P and Q in FIG. 30) and desirable combinations with the inversion methods of a drive voltage will be explained. FIGS. 32(*a*) to 32(*d*) show, when assumed the two adjacent dots have the different structures in within pixel 91 as shown in FIG. 30, polarities of drive wave in an odd frame, the dot array and patterns of flicker polarity (odd frame) defined by their combination. Although not shown in the figure, an even frame has a pattern of drive wave polarity inverted to that of an odd frame, resulting in having a pattern of flicker polarity inverted to that of an odd frame.

Like in Embodiment 14, an enhanced flicker reduction effect can be obtained in an arrangement in which the distribution of flicker polarity of pixels or dots is inverted every line.

Specific examples of such combinations are as follows:

FIG. 32(*a*): Combination of a line-inversion (row-inversion) drive and a line-non-inversion (row-non-inversion) dot array; and FIG. 32(*c*): Combination of a frame-inversion drive and a line-inversion (row-inversion) dot array.

On the other hand, for example, when a checkerboard pattern appears on a computer screen as a wallpaper, etc., it is preferable that, between the pixels or dots, flicker polarity be inverted every two lines to prevent interference between the a checkerboard pattern and the flicker pattern. Specific examples of such combinations are as follows:

FIG. 32(*b*): Combination of a line-inversion (row-inversion) drive and a two-line-inversion (two-row-inversion) dot array; and FIG. 32(*d*): Combination of a frame-inversion drive and a two-line-inversion (two-row-inversion) dot array.

Although not shown, as a pattern in which flicker polarity inversion between the pixels or dots is performed every two lines, regarding drive wave polarity and dot structure, it is also possible to switch the pattern of the drive inversion cycle and the dot arrangement cycle in FIG. 32(*b*). Specific examples are as follows:

(b'): Combination of a two-line-inversion (two-row-inversion) drive and a line-inversion (row-inversion) dot array.

Likewise, when n is 3 or greater, it is possible to invert flicker polarities between pixels and dots every n lines. When n is 10 or smaller (preferably 5 or smaller), interference with checkered patterns can be prevented while reducing flicker, obtaining the same effect achieved by inverting flicker polarity distribution every two lines.

The display devices according to Embodiments 14 and 15 can be operated in the same manner as shown in FIG. 28 described above. This allows a display of bright images with wide viewing angles and reduced flicker, when considering the entire screen or the regions comprising a plurality of dots as a whole.

In Embodiments 14 and 15, the relationship between the drive wave polarity and the dot array are explained with a dot taken as the unit; however, the preferable combinations of the drive wave polarity and the dot array described in the embodiments can also achieve the same effects when a pixel is assumed to be the unit. Furthermore, it is also possible to consider the drive wave polarity or the dot array with a dot as the unit and the other with a pixel as the unit.

Embodiment 16

FIG. 33(a) is a sectional view of the display device according to Embodiment 16 and FIG. 33(b) is a plan view showing the structure of one dot of the array substrate. FIG. 33(a) is a view taken along the line DD-DD' in FIG. 33(b).

Figure 34:
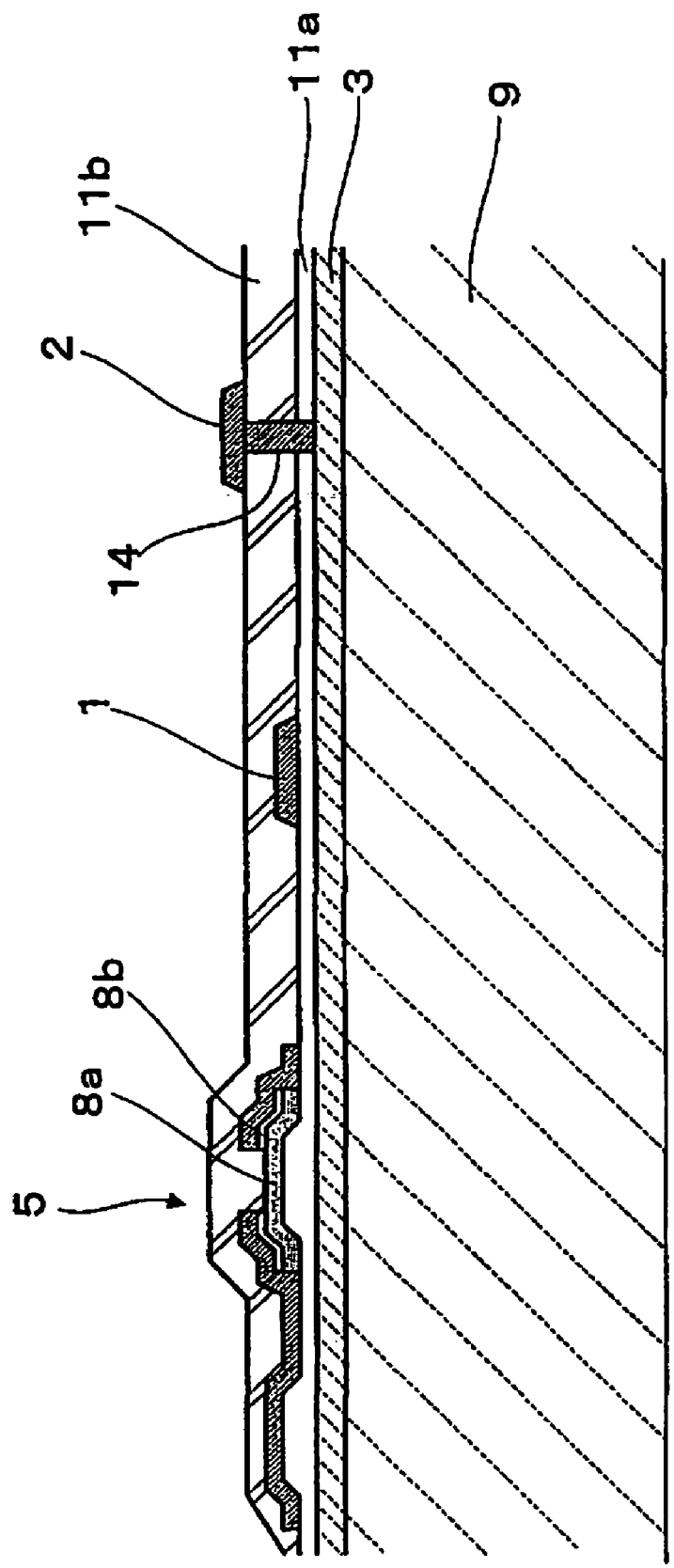
FIG. 34 is an expanded sectional view showing the structure around a switching element of a display device according to Embodiment 16 of the invention.

FIG. 34 is an expanded sectional view showing the structure around a switching element of a display device according to the present embodiment.

FIG. 35(a) is a plan view showing a 4×4 dot section of pixels and FIGS. 35(b) and 35(c) are schematic diagrams showing the polarities created in the pixels. In FIG. 35(a), S1, S2, etc. indicate image signals supplied to each pixel and G1, G2, etc. indicate scanning signals supplied to each pixel.

In FIG. 33, 201 represents an opposing substrate, 202 represents liquid crystal, 209a represents an oriented film formed inside of the array substrate 9, 209b represents an oriented film formed inside of the opposing substrate 201, and 210a, 210b and 210c represent color filter materials. Other elements which are identical to the elements of Embodiment 1 are identified with the same numerical symbols, and repetitious explanation will be omitted. In the present embodiment, a pixel electrode 1 is formed out of a metal material and an opposing electrode 2 is formed of a transparent electric conductor.

In FIG. 34, 8a represents an a-Si layer, 8b represents an n+ type a-Si layer and 14 represents a contact hole formed in insulating layers 11a, 11b.

The display device of the present embodiment is formed in the manner described below. On the array substrate 9, a first metal layer is formed of an opaque electric conductor made of Al, Ti or the like. The first metal layer is patterned into predetermined shapes to obtain a common wiring 3 and a gate wiring 4. On the thus obtained layer, the insulating layer 11a is formed, and then, a semiconductor switching element 5 is formed out of the a-Si layer 8a and the n+ type a-Si layer 8b on the predetermined area of the insulating layer 11a. Thereafter, on the predetermined areas of the insulating layer 11a and the semiconductor switching element 5, a second metal layer is formed out of an opaque electric conductor made of Al, Ti or the like, and then the second metal layer is patterned into predetermined shapes to obtain a source wiring 7, a drain electrode 6 and a pixel electrode 1. On the thus obtained layer, the insulating layer 11b made of SiNx or the like is formed. The insulating layer 11b also serves as an overcoat protecting the semiconductor switching element 5.

Thereafter, the opposing electrode 2 is formed out of an ITO film, which is a transparent electric conductor. In order to make the common wiring 3 made of an opaque electric conductor and the opposing electrode 2 made of a transparent electric conductor electrically conductive, a contact hole 14 is formed in the insulating layers 11a, 11b.

Then, on the array substrate 9 and the opposing substrate 201, oriented films 209a, 209b made of polyimide or the like are formed to align molecules of liquid crystal 202.

The opposing substrate 201 is arranged so as to face the array substrate 9. On the opposing substrate 201, the red color filter material 210a, the green color filter material 210b, the blue color filter material 210c and a black matrix 211 are formed so as to have a predetermined pattern.

The thus obtained array substrate 9 and opposing substrate 201 have their orientation directions formed in predetermined directions. The substrates are bonded together on the edges by a sealer, and liquid crystal 202 is sealed therein.

Operation of the display device is described below. The semiconductor switching element 5 has its on-and-off status controlled by drive signals supplied from the gate wiring 4. Then, an electric field is generated by a liquid crystal drive voltage applied between the pixel electrode 1 and the opposing electrode 2; which are both connected to the semiconductor switching element 5. By varying the orientation directions of the liquid crystal 202, the brightness (light transmittance) of each pixel is controlled to achieve image formation.

In FIG. 33, d represents the cell gap, w1 represents the wiring width of the opposing electrode 2, w2 represents the wiring width of the pixel electrode 1 and l represents the distance between the opposing electrode 2 and the pixel electrode 1.

In the present embodiment, as shown in FIG. 33, it is assumed that the wiring width of the opposing electrode 2 is 5 μm (w1=5 μm), the wiring width of the pixel electrode 1 is 4 μm (w2=4 μm), the cell gap is 4 μm (d=4 μm) and the distance between the electrodes is 10 μm (l=10 μm). In other words, it is designed so that the wiring widths of the opposing electrode 2 and the pixel electrode 1 (w1, w2) become approximately the same as the distance between the array substrate 9 and the opposing substrate 201, i.e., d (cell gap).

Regarding the shape of the electrode, for example, as shown in FIG. 33(b), preferable is a comb-like electrode in which the opposing electrode 2 and the pixel electrode 1 are alternately arranged with a lateral electric field generated between the opposing electrode 2 and the pixel electrode 1. By employing the above described electrode arrangement, in addition to the lateral electric field, the peripheral electric fields of the individual electrodes 1, 2 enhance the electric field strength on the electrodes, rotating the liquid crystal. In the present embodiment, by forming the pixel electrode 2 out of a transparent conductive material, the electrode transmits light.

According to such an electrode structure, for example, by employing the liquid crystal 202 described below, it is possible to supply sufficient electric field strength and drive the liquid crystal using a generally applied liquid crystal drive voltage (around 5V).

Specifically, as a liquid crystal material 202, a cyano-based liquid crystal material containing a cyano-based compound in the range from about 10% to about 20% is used. Here, the optical-path difference $\Delta n \times d$ (multiply the cell gap d by the difference in the refractive index $\Delta n$) is assumed to be around 350 nm. It is also assumed that the liquid crystal material used in the liquid crystal layer 2 have a splay elastic constant K11 of 12 pN (K11=12 pN), a twist elastic constant K22 of 7 pN (K22=7 pN), a bend elastic constant K33 of 18 pN (K33=18 pN) and a dielectric constant anisotropy $\Delta e$ of +8 ($\Delta e$=+8). The dielectric constant anisotropy $\Delta e$ and the bend elastic constant K33 are important factors in selecting the drive voltage applied to the liquid crystal. To lower the voltage, it is preferable that the dielectric constant anisotropy $\Delta e$ be +8 or greater and the bend elastic constant K33 be 18 pN or smaller. Cyano-based compounds are useful to prevent the localized accumulation of electric charge in the liquid crystal; however, having a concentration thereof exceeding 35% may lower the reliability of the device because the ionicity is too strong.

Furthermore, since the pixel electrode 1 and the opposing electrode 2 are crooked, the liquid crystal molecules rotate in two directions. Therefore, differences in color observed from different viewing angles can be eliminated, obtaining a panel structure exhibiting little variance in color when seen from variable directions. Not shown in the figure, however, if the source wiring 7 and the black matrix 211 are formed into crooked shapes having the same crooking angles as the opposing electrode 2 and the pixel electrode 1, the increase in area which blocks light caused by the crooked shapes of the electrodes 1, 2 can be offset, obtaining a liquid crystal display device exhibiting a further enhanced aperture ratio.

The advantages achieved by the display device of the present embodiment will be described below. FIGS. 36(a) and 36(b) show the light transmittance properties of a pixel portion in a display device according to the present embodiment. In this figure, the pixel electrodes (opaque) 1, 1, the opposing electrode (transparent) 2 and the relative brightness distribution (transmittance distribution) in the aperture are shown. FIG. 36(a) shows the case where a positive image signal is applied to the pixel electrode 1 and FIG. 36(b) shows the case where a negative image signal is applied to the pixel electrode 1. From the figures, it is understood that the light transmittance properties are changed by the polarities of the liquid crystal drive voltage, causing flicker polarity (light or dark polarity). As described above, the light transmittance properties are changed by the polarities of the liquid crystal drive voltage, and therefore the frame-inversion drive whereby the polarity is inverted every frame causes flicker. In the H-line inversion drive in which a drive voltage polarity is inverted every line or the V-line inversion drive in which a drive voltage polarity is inverted every column, when a specific pattern such as a vertical line or a horizontal line is displayed, it appears on the screen as vertical stripes or horizontal stripes.

Therefore, the drive method employed in the liquid crystal display device of the present embodiment is the 1H/1V line-inversion drive (also referred to as the dot inversion drive) in which the polarity inversion of the pixel voltage is performed every line and every column as shown in FIG. 35(b). As an alternative, the 2H/1V line-inversion drive as shown in FIG. 35(c) in which polarity inversion of the pixel voltage is performed every two lines and every column can be employed.

In the 1H/1V line-inversion drive shown in FIG. 35(b), when a pattern of vertical lines or horizontal lines are displayed, the brightness difference between the positive and negative polarities are cancelled between two adjacent pixels, and thereby apparent flicker can be cancelled. On the other hand, when a checkerboard patter is displayed, the 2H/1V line-inversion drive shown in FIG. 35(c) is preferable. According to this method, even in a checkerboard pattern, the brightness difference between the positive and negative polarities can be cancelled, and thereby flicker does not appear on the screen. The same effect can be achieved by employing the 1H/2V line-inversion drive.

In the present embodiment, inversion of drive voltage polarity is performed with the dot taken as the unit; however, it is also possible to perform inversion of the pixel voltage polarity in the manner as shown in FIG. 35(b) or FIG. 35(c) when a pixel composed of red, green and blue dots is assumed to be the unit. This arrangement is advantageous in that color distortion can be prevented even in halftone display which tends to be adversely affected by the difference between the properties of brightness and voltage, since the properties of each dot in a pixel can readily be balanced.

The conventional drive frequency for a frame is 30 Hz; however, apparent flicker can be cancelled by applying a frequency of 60 Hz, since even if the brightness differences caused by polarities are generated, the human eye cannot recognize them at a frequency this high. This is also true in other embodiments.

Embodiment 17

Figure 37:
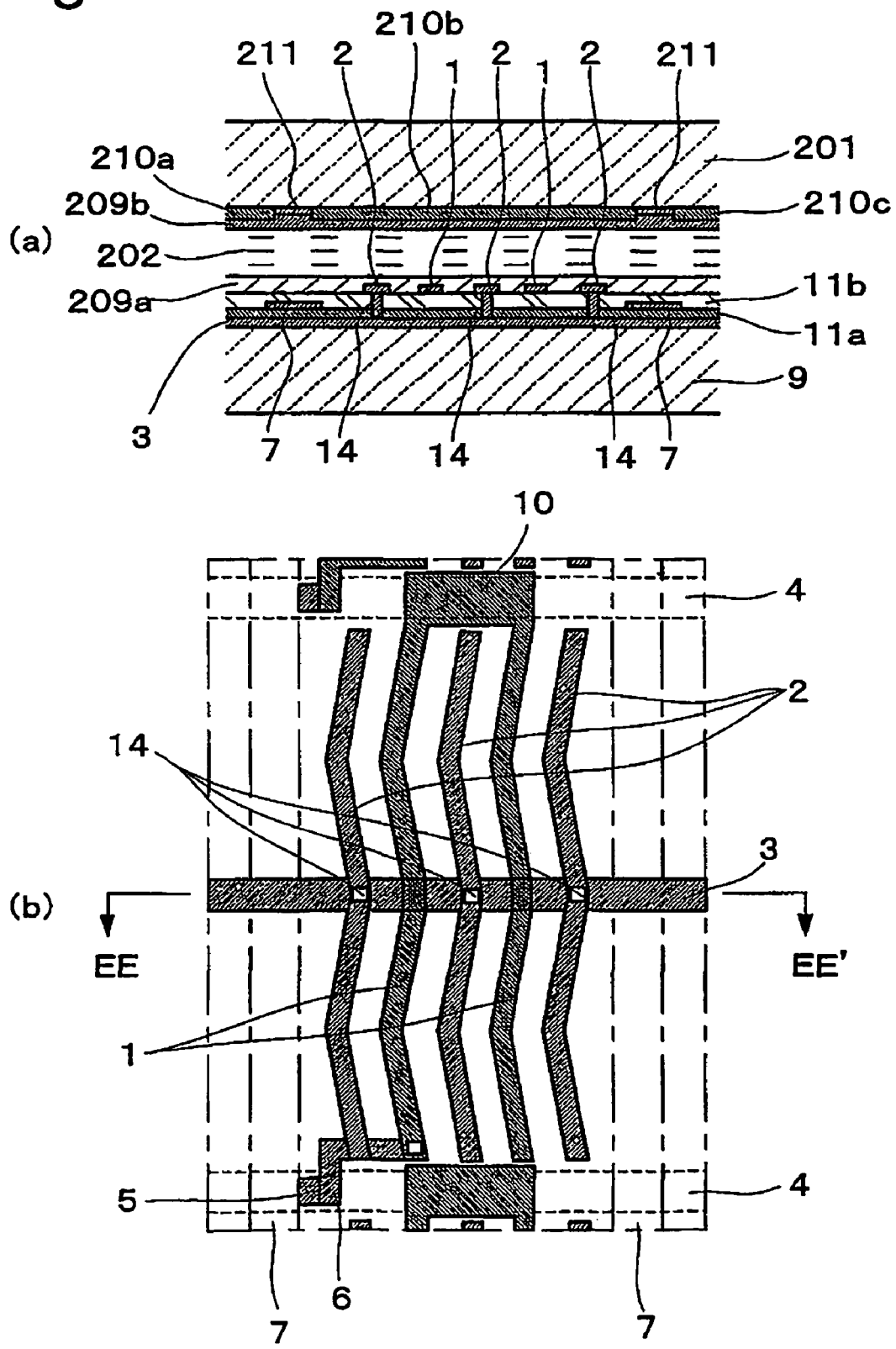
FIGS. 37(a) and 37(b) are sectional view and plan view of a display device according to Embodiment 17 of the invention.

FIG. 37(a) is a sectional view of the display device according to Embodiment 17. FIG. 33(b) is a plan view showing the structure of one dot of the array substrate. FIG. 37(a) is a view taken along the line EE-EE' in FIG. 37(b).

Figure 38:
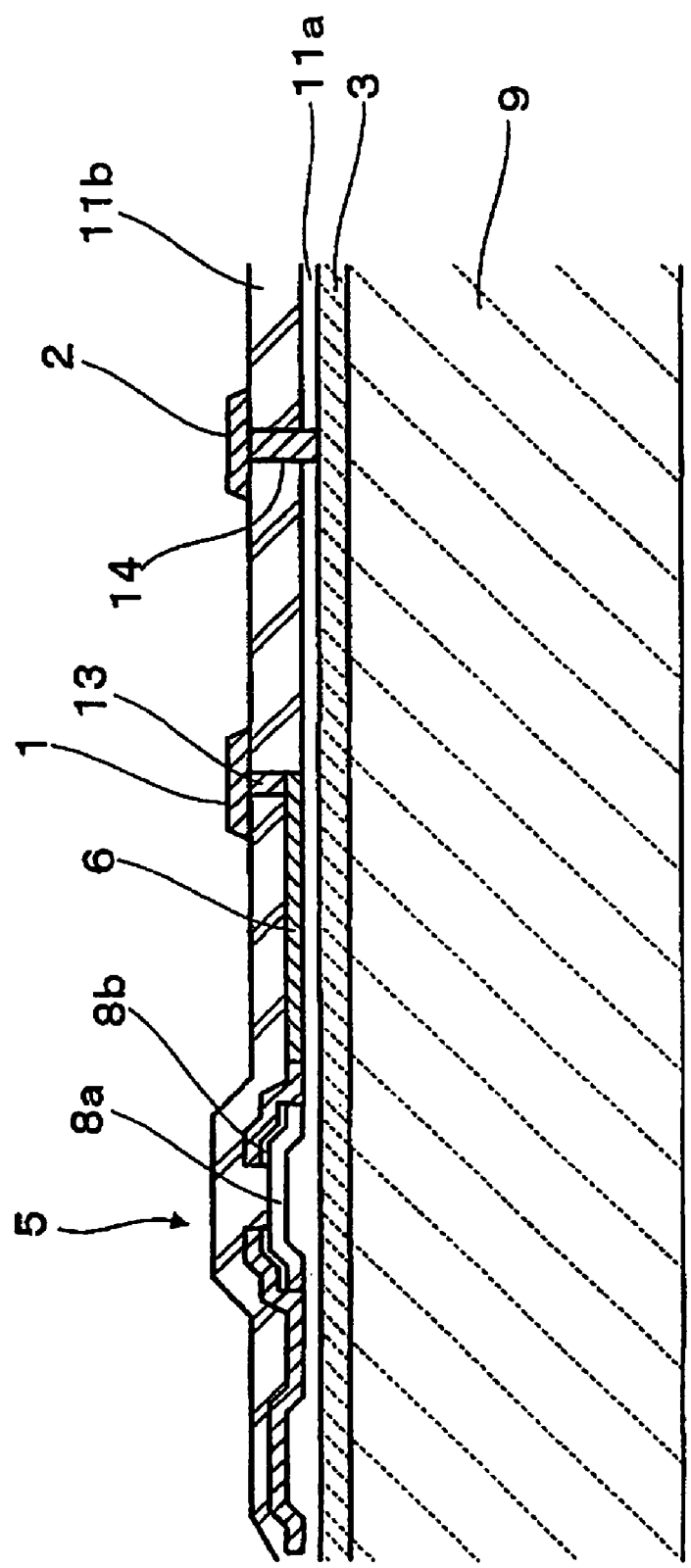
FIG. 38 is an expanded sectional view showing the structure around a switching element of a display device according to Embodiment 17 of the invention.

FIG. 38 is an expanded sectional view showing the structure around a switching element of a display device according to the present embodiment.

FIG. 39(a) is a plan view showing a 4×4 dot section of pixels and FIG. 39(b) is a schematic diagram showing the waveform of image signal applied to each pixel shown in FIG. 39(a). In FIG. 39(a), S1, S2, . . . indicate image signals supplied to each pixel, S1', S2', . . . indicate compensated image signals supplied to each pixel and G1, G2, . . . indicate scanning signals supplied to each pixel.

In the present embodiment, both the pixel electrode 1 and the opposing electrode 2 are made of transparent electric conductors. In other respects, the configuration thereof is the same as that of the Embodiment 16. Therefore, the elements which are identical to the elements of Embodiment 16 are identified with the same numerical symbols, and repetitious explanation will be omitted.

The display device of the present embodiment is formed in a manner as described below. On the array substrate 9, a first metal layer is formed out of an opaque electric conductor made of Al, Ti or the like, and the first metal layer is patterned into predetermined shapes to obtain a common wiring 3 and a gate wiring 4. On the thus obtained layer, the insulating layer 11a is formed and a semiconductor switching element 5 formed out of an a-Si layer 8a and an n+ type a-Si layer 8b is obtained on the predetermined area of the insulating layer 11a. Thereafter, on the predetermined areas of the insulating layer 11a and the semiconductor switching element 5, a second metal layer is formed out of an opaque electric conductor made of Al, Ti or the like, and then the second metal layer is patterned into predetermined shapes to obtain a source wiring 7, a drain electrode 6 and a pixel electrode 1. On the thus obtained layer, the insulating layer 11b made of SiNx or the like is formed. The insulating layer 11b also serves as an overcoat protecting the semiconductor switching element 5.

Thereafter, on the insulating layer 11b, the pixel electrode 1 and the opposing electrode 2 are formed out of an ITO film, which is a transparent electric conductor. The opposing electrode 2 is connected to the common wiring 3 through a contact hole 14 formed in the insulating layers 11a, 11b. The pixel electrode 1 is connected to the drain electrode 6 through a contact hole 13 formed in the insulating layer 11b. Instead of forming the pixel electrode 1 and the opposing electrode 2 on the same layer as in the present embodiment, it is also possible to provide another layer and form the electrodes on separate layers.

Then subsequent production steps are the same as those of Embodiment 16. In the thus obtained display device of the present embodiment, both the pixel electrode 1 and the opposing electrode 2 are transparent, realizing a display device with an enhanced actual aperture ratio compared to that of Embodiment 16.

The advantages achieved by the display device of the present embodiment will be described below. FIGS. 40(a) and 40(b) show light transmittance properties of a pixel portion in a display device according to the present embodiment. In this figure, the pixel electrodes (transparent) 1, 1, the opposing electrode (transparent) 2 and the relative brightness distribution (transmittance distribution) in the aperture are shown. FIG. 40(a) shows the case where a positive image signal is applied to the pixel electrode 1 and FIG. 40(b) shows the case where a negative image signal is applied to the pixel electrode 1. From the figures, it is understood that the light transmittance properties are changed by the polarities of the liquid crystal drive voltage, causing flicker polarity (light or dark polarity). In FIG. 40, there are two pixel electrodes 1 and one opposing electrode 2. Therefore, even if both electrodes are transparent, the displayed images become brighter in the case (b) where the pixel electrode 1 has a relatively negative voltage. This phenomenon occurs because of the difference in numbers and areas between the pixel electrode 1 and the opposing electrode 2.

Figure 39:
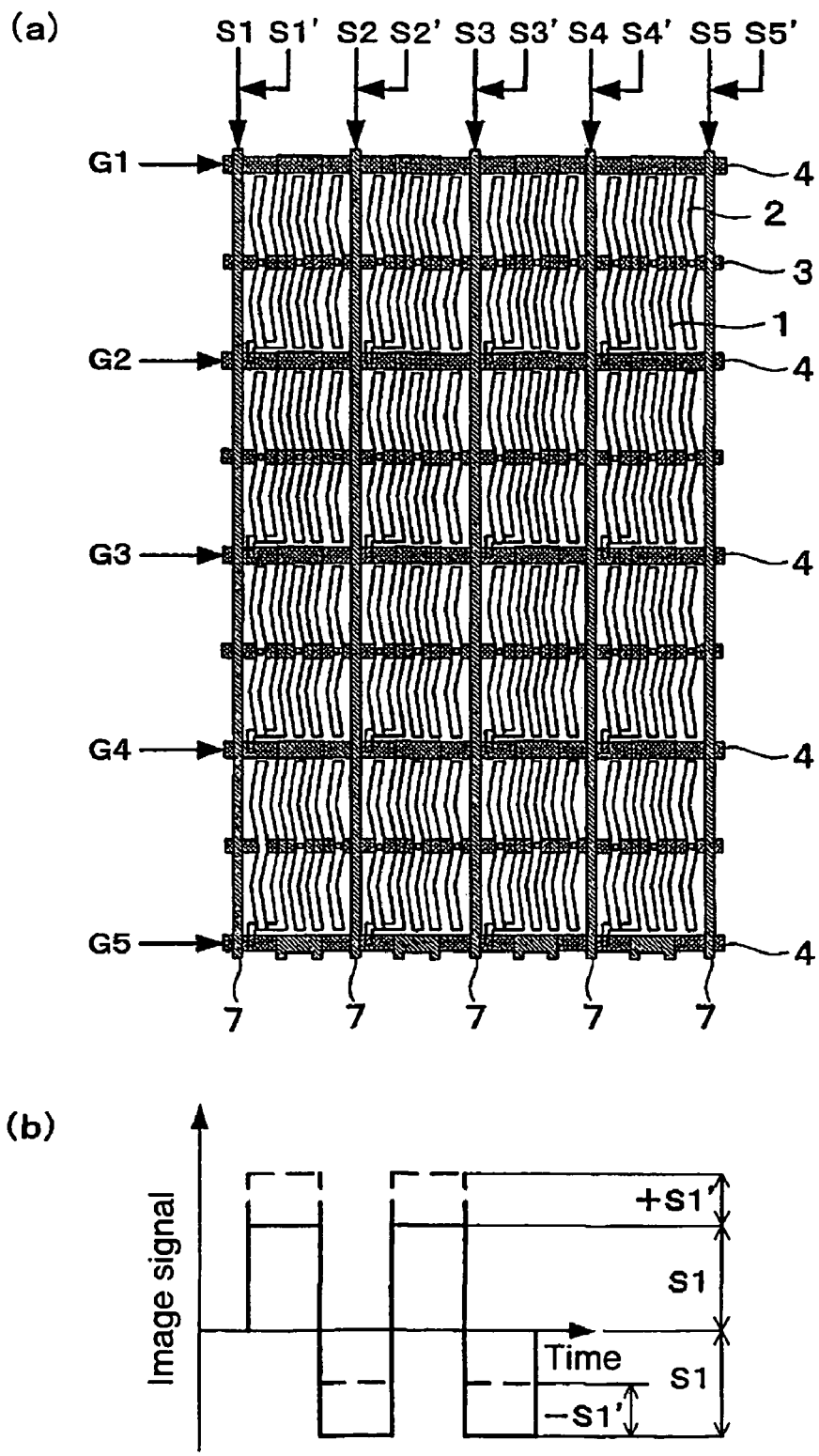
FIG. 39(a) is a plan view showing a 4×4 dot section of pixels of a display device according to Embodiment 17 of the invention.
FIG. 39(b) is a schematic diagram showing the waveform applied to each of the pixels.

In the present embodiment, as shown in FIG. 39, the difference in brightness between the positive and negative polarities can be cancelled by supplying brightness compensation signals S1', S2', . . . in addition to general image signals S1, S2, . . . . Specifically, when a positive liquid crystal drive voltage is applied to the pixel electrodes 1, 1, as shown in FIG. 39(b), compensation for the image signal is performed by adding brightness compensation signals +S1', +S2' . . . to image signal S1. Thereby, the variance in the electric potential of a liquid crystal drive voltage is increased and the displayed image becomes brighter. As a result, as shown in FIG. 40(a), the light transmittance property changes from the condition without brightness compensation signal, represented by the solid line, to the condition with brightness compensation signal, represented by the broken line.

On the other hand, when a negative liquid crystal drive voltage is applied to the pixel electrodes 1, 1, as shown in FIG. 39(b), compensation for image signal is performed by adding brightness compensation signals −S1', −S2' . . . to image signal S1. Thereby, the variance in the electric potential of a liquid crystal drive voltage is decreased and the displayed image becomes darker. As a result, as shown in FIG. 40(b), the light transmittance property changes from the condition without brightness compensation signal represented by the solid line to the condition with brightness compensation signal represented by the broken line.

By increasing or decreasing the transmittance properties by supplying brightness compensation signals, the variances in brightness when a positive liquid crystal drive voltage is applied and when a negative liquid crystal drive voltage is applied can be made approximately the same.

It is preferable that the brightness compensation signals S1', S2' . . . be controlled so that an appropriate voltage is supplied based on the ratio of the area of between the pixel electrode 1 and the opposing electrode 2, which are both formed out of transparent conductive layers. Specifically, the variance in brightness caused by the polarity of a liquid crystal drive voltage can be cancelled if the area SA of the transparent pixel electrode and the area SB of the transparent opposing electrode 2 are the same. When SA and SB are different, the variance in brightness caused by polarity remains. The more the ratio of SA to SB moves away from 1, the greater the variance in brightness is. Therefore, it is preferable that the variance in brightness be cancelled by supplying an appropriate compensation voltage obtained based on a calculation of how far away the area ratio is from 1. Having this arrangement allows a flicker reduction by canceling the variance in brightness caused by polarities regardless of the number of electrodes.

In the present embodiment, both the pixel electrode 1 and the opposing electrode 2 are transparent; however, even if only the opposing electrode 2 is formed out of a transparent conductive layer like in Embodiment 16, the same effect can be achieved by adding brightness compensation signals.

It is also true that in the present embodiment, like in Embodiment 16, the flicker reduction effect can be enhanced by employing the double-speed drive method which has a drive frequency of 60 Hz or higher.

In Embodiment 16 and the present embodiment, a-Si (amorphous silicon) is used for forming a semiconductor switching element 5; however, use of p-Si (polysilicon) or the other semiconductor layers can also achieve a similar result. This is true also in the other embodiments.

In Embodiment 16 and the present embodiment, there are explanations of cases where the pixel electrode 1 and the opposing electrode 2 are crooked; however, the actual aperture ratio can be enhanced regardless of the electrode shape, allowing use of linear electrodes, U-shape electrodes or others. This is true also in the other embodiments.

Embodiment 18

In the embodiments descried above, a rectangular dot was taken for the example as the display unit, and the cases where the dots are arranged in matrix are explained. However, the advantage of the present invention is satisfactorily achieved even when a display unit is not a rectangular dot or the display units are not arranged in matrix.

Figure 41:
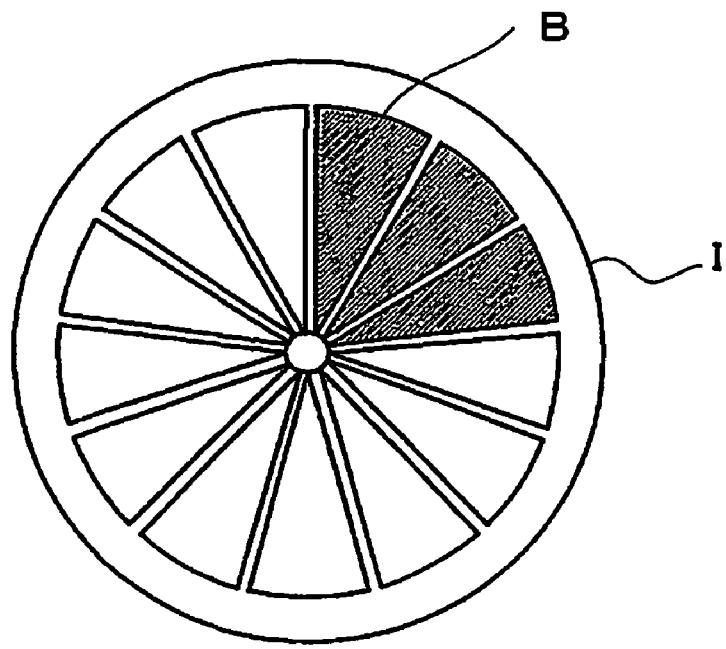
FIG. 41 is a plan view showing a display device according to Embodiment 18 of the invention.
Figure 42:
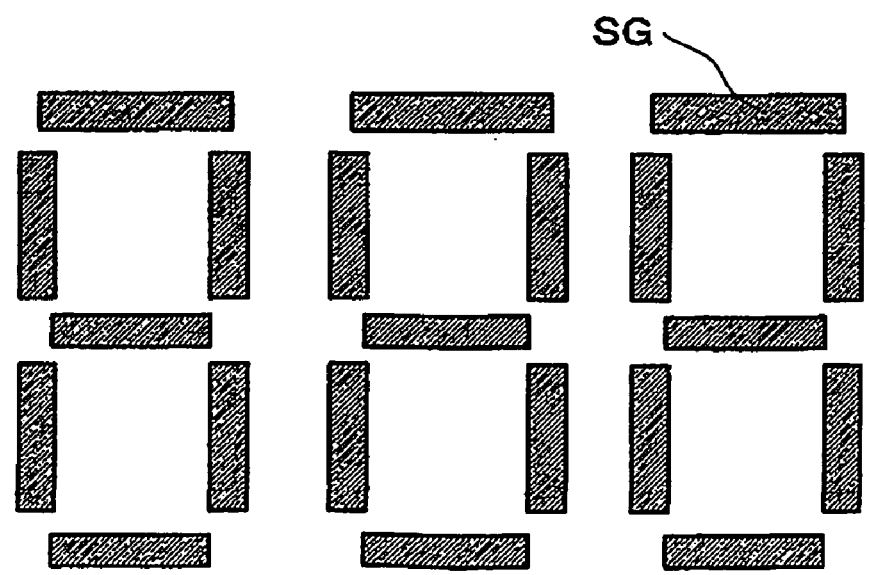
FIG. 42 is a plan view showing another display device according to Embodiment 18 of the invention.
Figure 44:
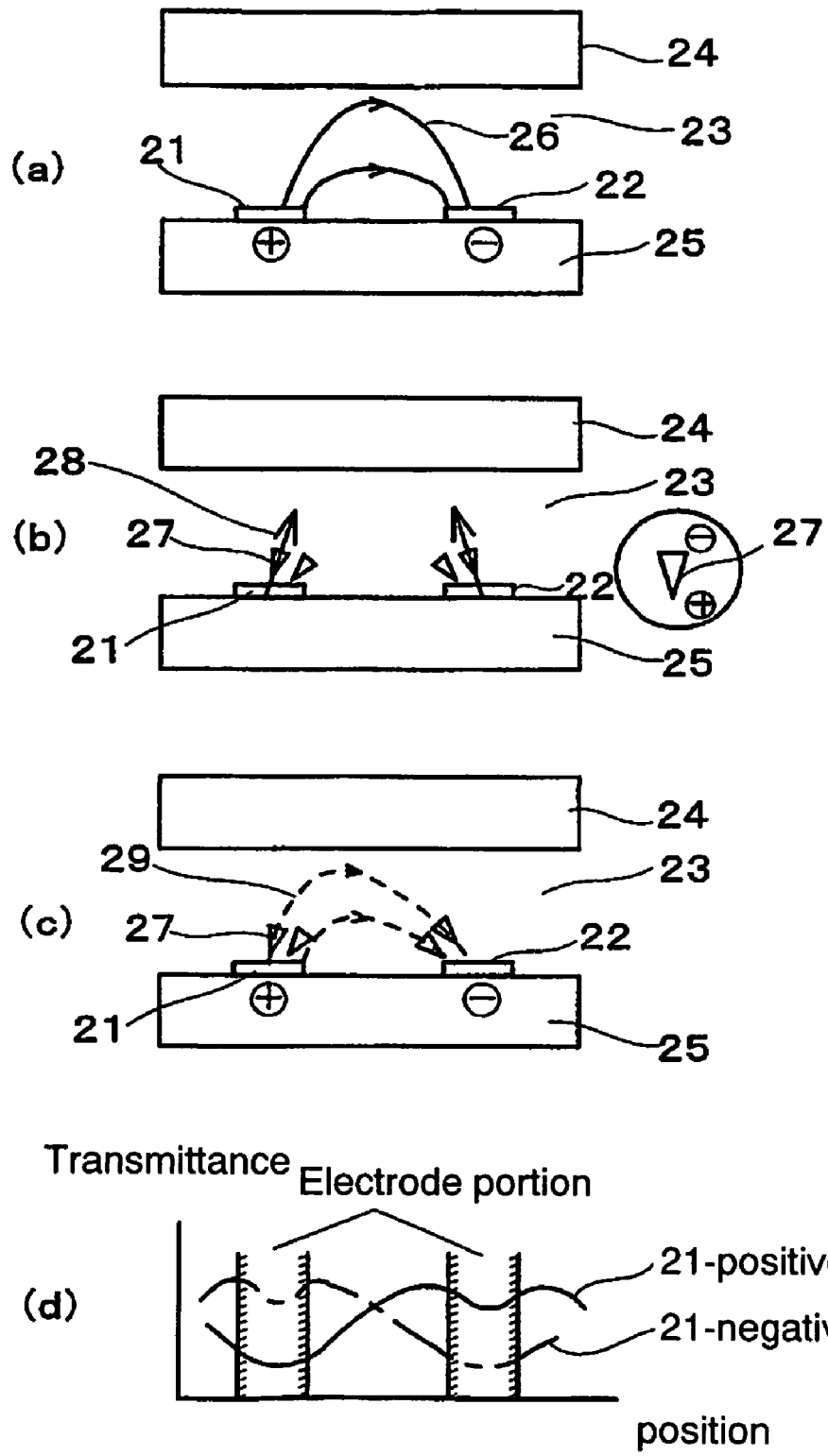
FIGS. 44(a), 44(b), 44(c) and 44(d) illustrate a first factor causing flicker.
Figure 47:
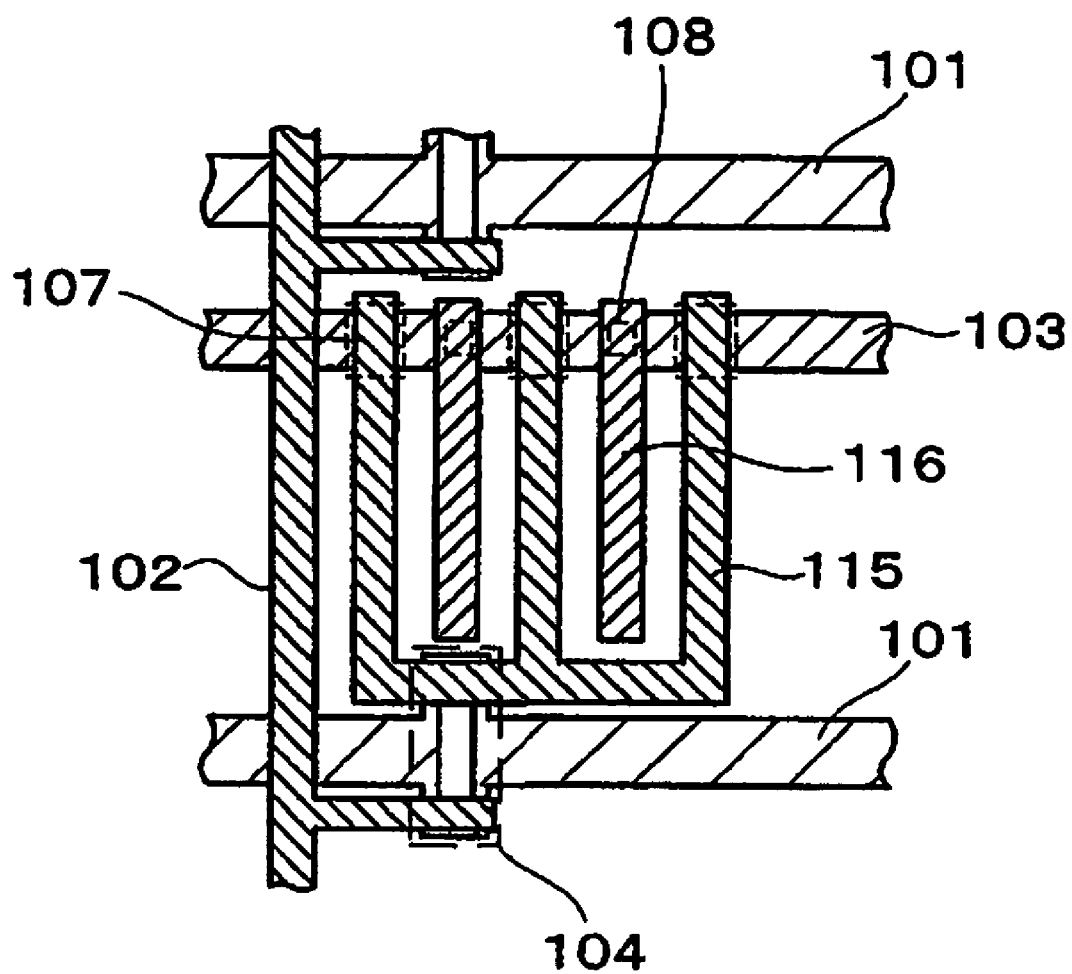
FIG. 47 is a plan view showing a prior art display device.

To be more specific, the present invention can be applied to a structure having elements whose functions are substantially the same as those of a pixel electrode and an opposing electrode even if the elements are not called by such names. Such examples include a circular-graph-shaped indicator I as shown in FIG. 41 for use in several kinds of meters and a segment display as shown in FIG. 42 for use in display of numerical characters or the like. By structuring each display block B and each segment SG based on the schemes described in the embodiments of the invention, it is possible to cancel flicker in the blocks B and the segments SG. As a result, an excellent display with a wide viewing angle, satisfactory brightness and reduced flicker can be obtained.

Also in a liquid crystal display device having a different arrangement, by structuring display units that perform the same kind of display based on the schemes described in the above embodiments, it is possible to cancel flicker within each display unit. Thereby, an excellent display with a wide viewing angle, satisfactory brightness and reduced flicker can be obtained.

Also in the case where the whole surface of a wide image is controlled by a single signal such as in shutters for lighting or blinds for windows, with assuming it to be one display unit, by structuring the display unit so as to have two flicker polarities based on the schemes described in the embodiments of the invention, flicker can be cancelled in each display unit. This achieves light control with reduced flicker and without being affected by a variance in the observation direction.

Other Embodiments

In the display devices according to the embodiments described above, it is preferable that, in one dot, the total number of the pixel electrodes 1 and the opposing electrodes 2 be an odd number and the number of intervals between the pixel electrodes 1 and the opposing electrodes 2 be an even number. For example, in the structure of Embodiment 1 shown in FIG. 1 and that of Embodiment 5 shown in FIG. 5, by arranging the numbers of the electrodes and the intervals therebetween as above, the composition of a dot becomes almost symmetrical in the left and the right halves, the flicker reduction effect can be enhanced. This is also true in the arrangements of Embodiment 9 shown in FIG. 25 and Embodiment 10 shown in FIG. 23.

In the arrangements of Embodiment 5 shown in FIG. 10 and Embodiment 6 shown in FIG. 14, it is preferable that the number of the opposing electrodes disposed between the two source wirings be an odd number so that one of the opposing electrodes is situated in the middle of the two source wirings. Thereby, two dots can be separated by the opposing electrode, enhancing the aperture ratio.

In the arrangements of Embodiment 7 shown in FIG. 16 and Embodiment 8 shown in FIG. 19, it is preferable that the total number of opposing electrodes in the dot be an odd number, and it is more preferable that the number be 5+4n (n is an integer), i.e., 5 or 9, etc. This allows the composition of the dot to become almost symmetrical in the left and the right halves, enhancing the flicker reduction effect.

In the embodiments descried above, IPS-style liquid crystal display devices are used; however, as long as they have an arrangement comprising a pixel electrode and an opposing electrode on one substrate, there is no limitation on the style of the liquid crystal display used.

Furthermore, with respect to the materials of the pixel electrode and the opposing electrode, they are not limited to a combination of a transparent conductive layer and a metal layer. For example, a material, even one which is not completely transparent, if it exhibits a transmittance at a certain level, has the effect of improving the brightness of the display device. Therefore, such a material and a metal layer can be used in combination. A combination of two transparent conductive layers having different transmittances is also possible. This arrangement can further enhance the transmittance.

When performing reflective-type display, the present invention can be employed in a display device comprising a combination of two materials having different reflectances or a display device having a reflective electrode as a back side electrode and a transparent electrode as an observer's side electrode.

In a liquid crystal display device, as described above, flicker tends to occur in the case where some portion of an electric field has a splay-shape around an electrode, causing the flexoelectric effect, and the case where electric fields become asymmetric in the left and right electrodes affected by a peripheral electric potential caused by some portion of a display unit having no electrode. The present invention exhibits remarkable advantages compared to display devices having such structures.

An example of a display device having such a structure includes a liquid crystal display device in which liquid crystal is driven by an electric field substantially parallel to a substrate. To be more specific, an IPS-style liquid crystal display device in which liquid crystal molecules respond only in the direction parallel to the substrate, an FFS (Fringe Field Switching) style liquid crystal display device, and an HS (Hybrid Switching) style liquid crystal display device are included. The above-described structures of the embodiments of the invention can be applied to a perpendicular-oriented type liquid crystal display device, in which liquid crystal molecules L are perpendicularly oriented as shown in FIG. 43(a) when a drive voltage is turned off and the orientation angles of the liquid crystal molecules L change along the electric field generated between electrodes 21, 22 as shown in FIG. 43(b) when the drive voltage is turned on.

In an MVA (Multi-domain VA) style liquid crystal device, a splay-shaped electric field is used when the orientation of the liquid crystal is divided by the distortion of the electric field. Therefore, the arrangements of the present invention can be employed in a reflective-type display or the like which uses electrodes having different optical properties.

Rod type low molecular weight compounds are generally used as the liquid crystal materials in each embodiment of the invention. In order to obtain the desired properties, anywhere from a few to several dozen kinds of materials are mixed. There is no limitation on the materials used; however, in order to reduce the flicker polarities, a mixture containing a compound having a wider end directed to the positive electrode side, which prevents the flexoelectric effect, is desirable. The compounds represented by general formulae (A) to (F) below are preferable.

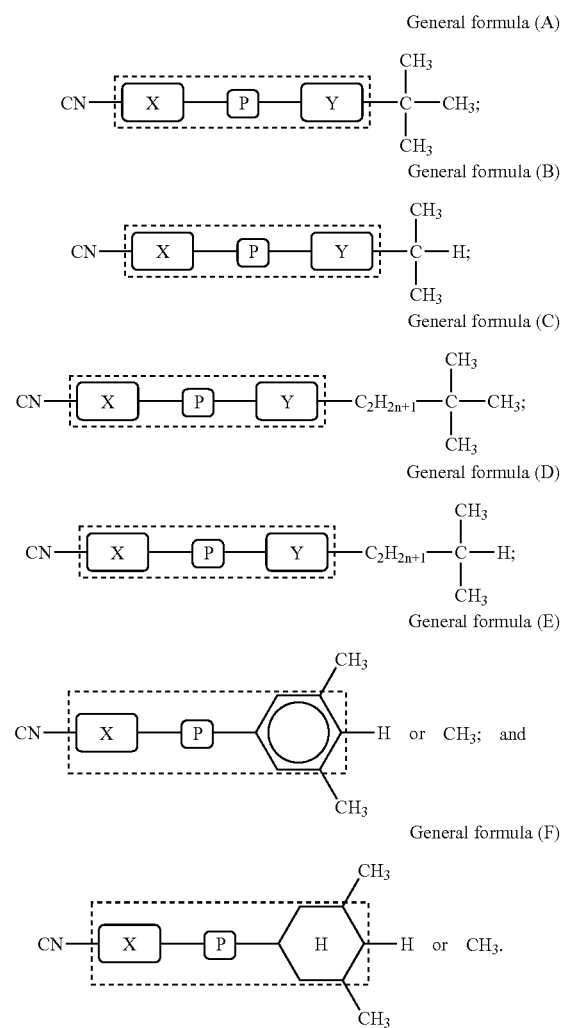

In the above general formulae (A) to (F), X and Y represent cyclic hydrocarbon residues. Specific examples are aromatic hydrocarbon residues (benzene ring), aliphatic hydrocarbon residues (cyclohexane ring), and compounds in which some of the carbon atoms composing aromatic hydrocarbon residues or aliphatic hydrocarbon residues are replaced by hetero atoms such as nitrogen or oxygen.

P represents central groups including ester groups (—COO—), etc. P includes something which directly connects the groups on both sides.

In the end groups, Cn can be F, $CF_3$, $CHF_2$ or $CH_2F$ and $CH_3$ can be $C_nH_{2n+1}$ (n is an integer from 2 to 20). These end groups are responsible for changes in the properties of the liquid crystal such as electric or optical anisotropy and the temperature in which it is a range forming liquid crystal.

The number of the cyclic groups contained in the core section enclosed by the broken line is three or less in practical applications; however, it can be greater than three.

As specific examples of the compounds described above, the compounds represented the formula below are included.

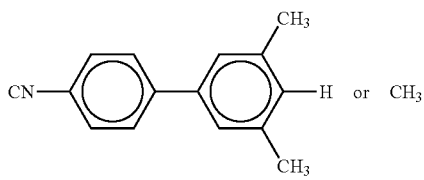

The invention claimed is:

1. A drive method of a display device having:
an array substrate;
an opposing substrate facing the array substrate; and
an electro-optic substance held between the array substrate and the opposing substrate,
the array substrate being provided with:
a plurality of gate wirings and a plurality of source wirings intersecting each other;
a pixel electrode disposed in a region defined by two adjacent gate wirings and two adjacent source wirings;
a switching element for switching a voltage applied to the pixel electrode from the source wiring based on a signal voltage supplied from the gate wiring; and
a common wiring formed between the two adjacent gate wirings; and
an opposing electrode being electrically connected to the common wiring and generating an electric field for driving the electro-optic substance between the opposing electrode and the pixel electrode whereto a voltage is applied,
the pixel electrode and the opposing electrode being made of the materials having different transmittances,
said method comprising the step of adding a prescribed brightness compensation voltage to the voltage applied to the pixel electrode.

2. A drive method of a display device having:
an array substrate;
an opposing substrate facing the array substrate; and
an electro-optic substance held between the array substrate and the opposing substrate,
the array substrate being provided with:
a plurality of gate wirings and a plurality of source wirings intersecting each other;
a pixel electrode disposed in a region defined by two adjacent gate wirings and two adjacent source wirings;
a switching element for switching a voltage applied to the pixel electrode from the source wiring based on a signal voltage supplied from the gate wiring;
a common wiring formed between the two adjacent gate wirings; and
an opposing electrode being electrically connected to the common wiring and generating an electric field for driving the electro-optic substance between the opposing electrode and the pixel electrode whereto a voltage is applied,
the pixel electrode and the opposing electrode being made of transparent electric conductors,
the total area of the pixel electrode and the total area of the opposing electrode occupying the transparent portions in the regions being different from each other,
said method comprising the step of adding a prescribed brightness compensation voltage to the voltage applied to the pixel electrode.

* * * * *

UNITED STATES PATENT AND TRADEMARK OFFICE
CERTIFICATE OF CORRECTION

PATENT NO.        : 7,499,115 B2                                        Page 1 of 1
APPLICATION NO.   : 10/398385
DATED             : March 3, 2009
INVENTOR(S)       : Katsuhiko Kumagawa et al.

It is certified that error appears in the above-identified patent and that said Letters Patent is hereby corrected as shown below:

In Column 35, Line 29 (Claim 1), change "gate wiring; and" to --gate wiring;--.

Signed and Sealed this

Second Day of June, 2009

JOHN DOLL
*Acting Director of the United States Patent and Trademark Office*